US012210707B2

(12) United States Patent
Wells et al.

(10) Patent No.: US 12,210,707 B2
(45) Date of Patent: Jan. 28, 2025

(54) TOYS WITH CONNECTED PLAY

(71) Applicant: KIDS II HAPE JOINT VENTURE LIMITED, Kowloon (HK)

(72) Inventors: Scott V. Wells, Atlanta, GA (US); Barry Leitch, Bryan, OH (US); Adam Shillito, Dagang Industrial (CN)

(73) Assignee: KIDS II HAPE JOINT VENTURE LIMITED, Kowloon (HK)

( * ) Notice: Subject to any disclaimer, the term of this patent is extended or adjusted under 35 U.S.C. 154(b) by 289 days.

(21) Appl. No.: 17/752,557

(22) Filed: May 24, 2022

(65) Prior Publication Data

US 2022/0283655 A1    Sep. 8, 2022

Related U.S. Application Data

(63) Continuation-in-part of application No. 17/687,862, filed on Mar. 7, 2022, which is a continuation of
(Continued)

(51) Int. Cl.
*G06F 3/044* (2006.01)
*A63H 5/00* (2006.01)
(Continued)

(52) U.S. Cl.
CPC .............. *G06F 3/044* (2013.01); *A63H 5/00* (2013.01); *A63H 33/22* (2013.01); *A63H 33/26* (2013.01);
(Continued)

(58) Field of Classification Search
CPC .................................. G09B 15/00; G06F 3/044
See application file for complete search history.

(56) References Cited

U.S. PATENT DOCUMENTS

D293,594 S    1/1988 Lenihan
4,801,771 A    1/1989 Mizuguchi et al.
(Continued)

FOREIGN PATENT DOCUMENTS

CA    2484914 A1    12/2003
CN    2136687    6/1993
(Continued)

OTHER PUBLICATIONS

International Search Report and Written Opinion for PCT/IB2022/000284; Nov. 7, 2022; 21 pgs.

*Primary Examiner* — Robert W Horn
(74) *Attorney, Agent, or Firm* — Perilla Knox & Hildebrandt LLP; Stephanie L. Davy-Jow; Bradley K. Groff

(57) ABSTRACT

A wirelessly connected ensemble of children's toys with capacitive touch interactivity. The children's toy generally includes a user input overlay panel and one or more capacitive touch sensors. The overlay panel may be formed from a capacitive touch conductive natural organic material such as wood. The toy can be shaped and ornamented to resemble a musical instrument, and configured to play music in response to user input applied to the user input overlay panel and sensed by the capacitive touch sensors. The children's toys are configured for individual and connected play modes. In the connected play mode, the children's toys produce synchronized and/or harmonized sounds and/or melodies.

20 Claims, 26 Drawing Sheets

Related U.S. Application Data application No. 17/504,757, filed on Oct. 19, 2021, now Pat. No. 11,853,513, and a continuation-in-part of application No. 17/106,899, filed on Nov. 30, 2020, now Pat. No. 11,726,619, application No. 17/752,557 is a continuation of application No. 17/106,899, filed on Nov. 30, 2020, now Pat. No. 11,726,619, said application No. 17/504,757 is a continuation of application No. 16/906,485, filed on Jun. 19, 2020, now Pat. No. 11,182,030, and a continuation-in-part of application No. 16/241,601, filed on Jan. 7, 2019, now Pat. No. 10,901,560, said application No. 17/106,899 is a continuation of application No. 16/241,601, filed on Jan. 7, 2019, now Pat. No. 10,901,560, said application No. 16/906,485 is a continuation-in-part of application No. 16/241,601, filed on Jan. 7, 2019, now Pat. No. 10,901,560.

(60) Provisional application No. 63/192,224, filed on May 24, 2021, provisional application No. 62/864,985, filed on Jun. 21, 2019, provisional application No. 62/722,082, filed on Aug. 23, 2018, provisional application No. 62/614,683, filed on Jan. 8, 2018.

(51) Int. Cl.
| | |
|---|---|
| *A63H 33/22* | (2006.01) |
| *A63H 33/26* | (2006.01) |
| *G06F 3/02* | (2006.01) |
| *G06F 3/16* | (2006.01) |
| *G09B 5/06* | (2006.01) |
| *G09B 15/00* | (2006.01) |

(52) U.S. Cl.
CPC ............ *G06F 3/0202* (2013.01); *G06F 3/165* (2013.01); *G09B 5/06* (2013.01); *G09B 15/00* (2013.01); *A63H 2200/00* (2013.01); *G10H 2220/165* (2013.01); *G10H 2220/221* (2013.01)

(56) References Cited

U.S. PATENT DOCUMENTS

| | | | |
|---|---|---|---|
| 4,892,023 A | 1/1990 | Takeuchi et al. | |
| 4,899,631 A | 2/1990 | Baker | |
| 4,911,053 A | 3/1990 | Kashio et al. | |
| D315,744 S | 3/1991 | Lerch | |
| D316,722 S | 5/1991 | Lerch | |
| D321,728 S | 11/1991 | Wehmeyer | |
| D321,729 S | 11/1991 | Maple | |
| 5,135,426 A | 8/1992 | Lin | |
| 5,145,447 A | 9/1992 | Goldfarb | |
| 5,248,843 A | 9/1993 | Billings | |
| 5,254,007 A | 10/1993 | Eagan | |
| 5,496,179 A | 3/1996 | Hoffman | |
| 5,538,430 A | 7/1996 | Smith et al. | |
| 5,545,071 A | 8/1996 | Shiraishi | |
| 5,883,325 A | 3/1999 | Peirce | |
| 6,110,000 A | 8/2000 | Ting | |
| 6,142,849 A | 11/2000 | Horton et al. | |
| 6,274,800 B1 | 8/2001 | Gardner | |
| 6,358,111 B1 | 3/2002 | Fong | |
| 6,443,794 B2 | 9/2002 | Oren et al. | |
| 6,454,625 B1 | 9/2002 | Fong | |
| 6,454,627 B1 | 9/2002 | Mak | |
| 6,497,604 B2 | 12/2002 | Fong | |
| 6,497,606 B2 | 12/2002 | Fong | |
| 6,586,666 B2 | 7/2003 | Abe | |
| 6,716,031 B2 | 4/2004 | Wood et al. | |
| 6,955,603 B2 | 10/2005 | Jeffway, Jr. | |
| 6,991,509 B1 | 1/2006 | Carley et al. | |
| 7,059,933 B1 | 6/2006 | Hsiao et al. | |
| 7,244,165 B2 | 7/2007 | Gubitosi et al. | |
| 7,252,510 B1 | 8/2007 | Basu et al. | |
| 7,568,963 B1 | 8/2009 | Atsmon et al. | |
| 7,728,209 B1 | 6/2010 | Arnold | |
| 7,874,927 B2 | 1/2011 | Godiska | |
| 8,003,877 B2 | 8/2011 | Elion | |
| 8,008,563 B1 * | 8/2011 | Hastings ................ G09B 15/08 84/479 A |
| 8,062,090 B2 | 11/2011 | Atsmon et al. | |
| 8,093,482 B1 | 1/2012 | Kramer et al. | |
| 8,098,240 B2 | 1/2012 | Zielinski et al. | |
| 8,235,824 B2 | 8/2012 | Kuhn | |
| 8,373,672 B2 * | 2/2013 | Wallace ................ H03K 17/975 200/600 |
| 8,378,203 B2 * | 2/2013 | Wallace .................. G10H 3/10 84/733 |
| 8,395,040 B1 | 3/2013 | Kramer et al. | |
| 8,398,451 B2 * | 3/2013 | Wolfe ...................... A63H 3/28 446/175 |
| 8,400,426 B2 | 3/2013 | Zielinski et al. | |
| 8,425,273 B2 | 4/2013 | Atsmon et al. | |
| 8,471,138 B2 | 6/2013 | Wallace et al. | |
| 8,476,519 B2 | 7/2013 | Liotta | |
| 8,477,506 B2 | 7/2013 | Moncrieff | |
| 8,564,547 B2 | 10/2013 | Amireh et al. | |
| 8,591,282 B2 | 11/2013 | Jang | |
| 8,594,557 B2 | 11/2013 | Taylor et al. | |
| 8,614,389 B2 | 12/2013 | Wallace et al. | |
| 8,729,379 B2 * | 5/2014 | Wallace .................. G10H 1/22 84/733 |
| 8,735,710 B2 | 5/2014 | Yamabata | |
| 8,773,387 B2 | 7/2014 | Wallace et al. | |
| 8,795,022 B2 | 8/2014 | Lipman et al. | |
| 8,816,181 B2 | 8/2014 | Shemesh | |
| 8,827,761 B2 | 9/2014 | Lipman et al. | |
| 8,865,992 B2 | 10/2014 | Shavit | |
| 8,878,042 B2 | 11/2014 | Van Wagoner et al. | |
| 8,912,419 B2 * | 12/2014 | Fong ........................ G10H 1/26 84/602 |
| 9,092,096 B2 | 7/2015 | Li et al. | |
| 9,093,059 B2 | 7/2015 | Dejima et al. | |
| 9,111,516 B1 * | 8/2015 | Saraceni .................. G10H 1/34 |
| 9,259,658 B2 | 2/2016 | Hillis et al. | |
| 9,275,517 B2 | 3/2016 | Cohen et al. | |
| 9,299,330 B2 | 3/2016 | Shi | |
| 9,311,907 B2 * | 4/2016 | Beck ..................... G10H 1/0558 |
| 9,324,310 B2 | 4/2016 | McPherson et al. | |
| 9,378,717 B2 | 6/2016 | Fong | |
| 9,583,087 B2 | 2/2017 | Iwase | |
| 9,607,475 B2 | 3/2017 | Cohen et al. | |
| 9,620,096 B2 | 4/2017 | Ambrosino | |
| 9,628,880 B2 * | 4/2017 | Koss ...................... H03K 17/9622 |
| 9,675,895 B2 | 6/2017 | Judkins et al. | |
| 9,761,210 B2 | 9/2017 | McPherson | |
| 9,773,487 B2 | 9/2017 | Alt et al. | |
| 9,805,705 B2 | 10/2017 | McPherson et al. | |
| 9,830,778 B2 | 11/2017 | Atsmon et al. | |
| 9,836,151 B2 | 12/2017 | McMillen et al. | |
| 9,837,062 B2 | 12/2017 | Wernick et al. | |
| 9,890,778 B2 | 2/2018 | Kusumba et al. | |
| 10,288,507 B2 | 5/2019 | McMillen et al. | |
| 10,288,800 B1 | 5/2019 | Keranen et al. | |
| 10,339,829 B2 | 7/2019 | Grafman | |
| 10,485,094 B1 | 11/2019 | Isohatala et al. | |
| 10,512,850 B2 | 12/2019 | Judkins et al. | |
| 10,561,019 B2 | 2/2020 | Heikkinen et al. | |
| 10,791,826 B2 | 10/2020 | Crowe et al. | |
| 10,804,898 B2 | 10/2020 | Haslette et al. | |
| 10,821,889 B2 | 11/2020 | DeGrote et al. | |
| 2006/0009113 A1 | 1/2006 | Fong | |
| 2007/0084332 A1 | 4/2007 | Blaszczyk | |
| 2007/0186667 A1 | 8/2007 | Deangelis et al. | |
| 2009/0117816 A1 | 5/2009 | Nakamura et al. | |
| 2009/0117819 A1 | 5/2009 | Nakamura | |
| 2009/0139798 A1 | 6/2009 | Bernard | |
| 2009/0260508 A1 | 10/2009 | Elion | |
| 2009/0266218 A1 | 10/2009 | Parienti | |
| 2010/0041304 A1 | 2/2010 | Eisenson | |

(56) References Cited

U.S. PATENT DOCUMENTS

| | | |
|---|---|---|
| 2011/0195392 A1* | 8/2011 | Kim .................. G09B 19/00 434/365 |
| 2011/0239848 A1 | 10/2011 | Beck |
| 2011/0272260 A1* | 11/2011 | Wallace ............ H03K 17/975 200/300 |
| 2012/0024132 A1 | 2/2012 | Wallace et al. |
| 2012/0247308 A1 | 10/2012 | Tsai |
| 2013/0074680 A1 | 3/2013 | Elion |
| 2013/0083946 A1 | 4/2013 | Liu |
| 2013/0303047 A1 | 11/2013 | Albert et al. |
| 2014/0023820 A1 | 1/2014 | Muhlbauer et al. |
| 2015/0140893 A1 | 5/2015 | Lipman et al. |
| 2015/0286294 A1 | 10/2015 | Kopcke et al. |
| 2016/0035240 A1 | 2/2016 | Camp et al. |
| 2016/0109976 A1 | 4/2016 | Nguyen |
| 2017/0040553 A1* | 2/2017 | Watabe ............. H10K 50/121 |
| 2017/0136380 A1 | 5/2017 | Creedican |
| 2017/0157511 A1 | 6/2017 | Feghali |
| 2017/0162070 A1 | 6/2017 | Grafman et al. |
| 2017/0189804 A1 | 7/2017 | Akavia et al. |
| 2017/0225070 A1 | 8/2017 | Baks |
| 2017/0345323 A1* | 11/2017 | Martinez Sanchez ... G09B 5/14 |
| 2018/0033211 A1 | 2/2018 | Berman et al. |
| 2018/0204884 A1 | 7/2018 | Isa |
| 2019/0212843 A1 | 7/2019 | Reese et al. |
| 2019/0304238 A1 | 10/2019 | Ambauen et al. |
| 2020/0316483 A1 | 10/2020 | Reese |
| 2020/0369223 A1 | 11/2020 | Hansen et al. |

FOREIGN PATENT DOCUMENTS

| | | |
|---|---|---|
| CN | 1342275 A | 3/2002 |
| CN | 1876215 A | 12/2006 |
| CN | 201470124 A | 5/2010 |
| CN | 102974107 A | 3/2013 |
| CN | 103908780 A | 7/2014 |
| CN | 203954672 | 11/2014 |
| CN | 105336229 | 2/2016 |
| CN | 105765993 | 7/2016 |
| CN | 205850238 U | 1/2017 |
| CN | 206075588 | 4/2017 |
| CN | 206444195 U | 8/2017 |
| JP | 2015118398 A | 6/2015 |
| WO | 2005053806 A2 | 6/2005 |
| WO | 2007009251 A1 | 1/2007 |
| WO | 2011100441 A1 | 8/2011 |
| WO | 2012024132 A2 | 2/2012 |
| WO | 2020257608 A1 | 12/2020 |

\* cited by examiner

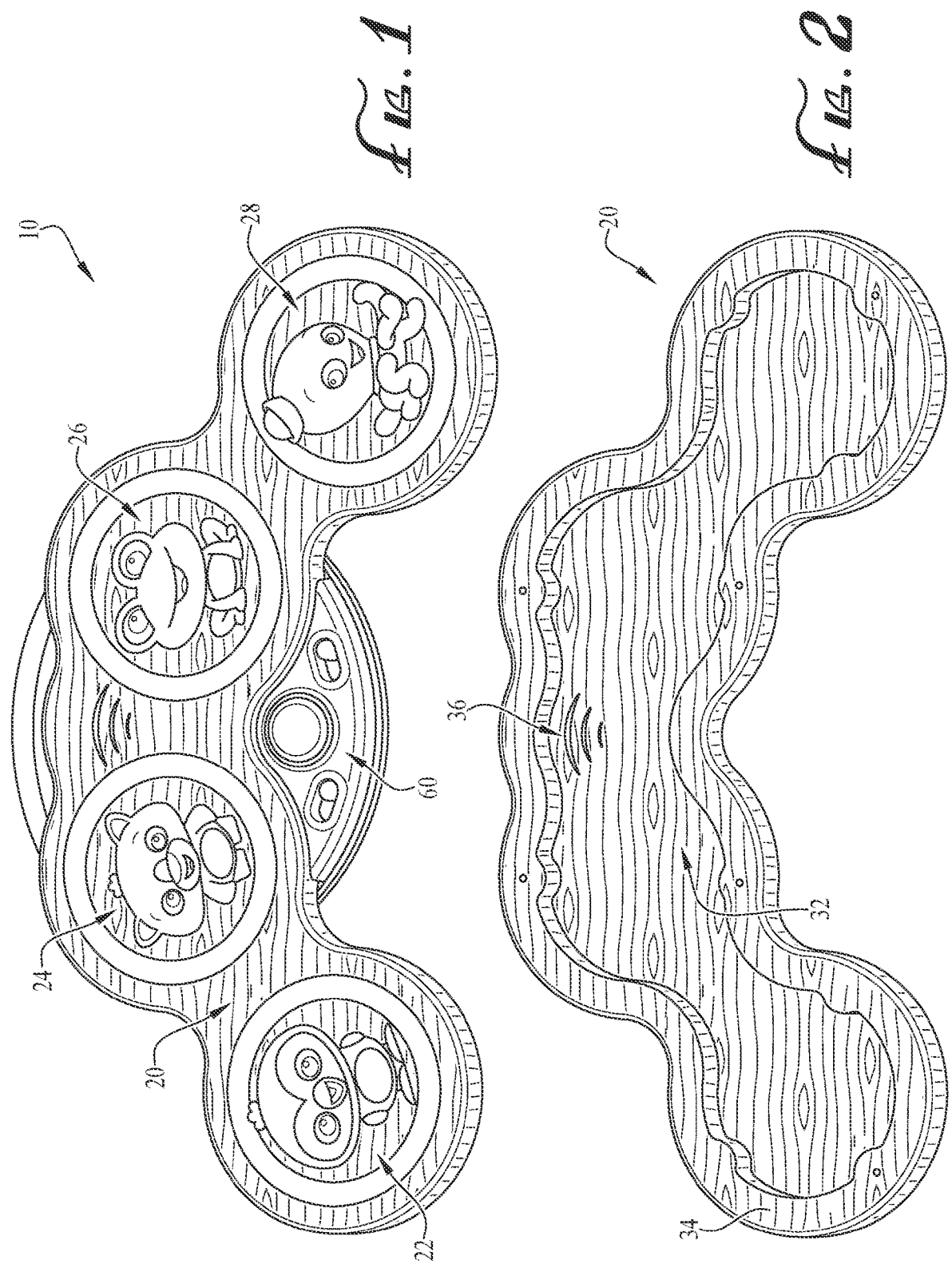

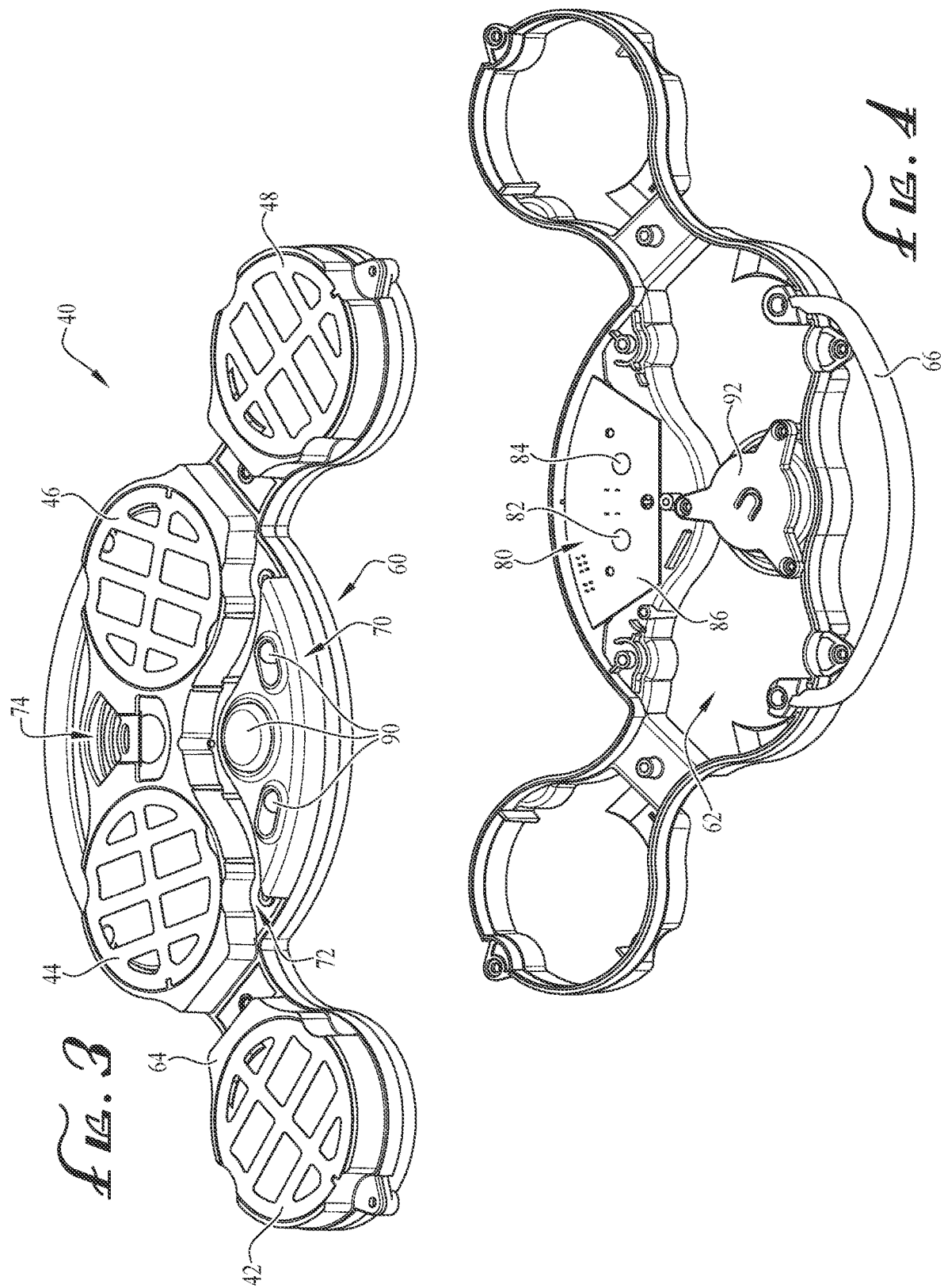

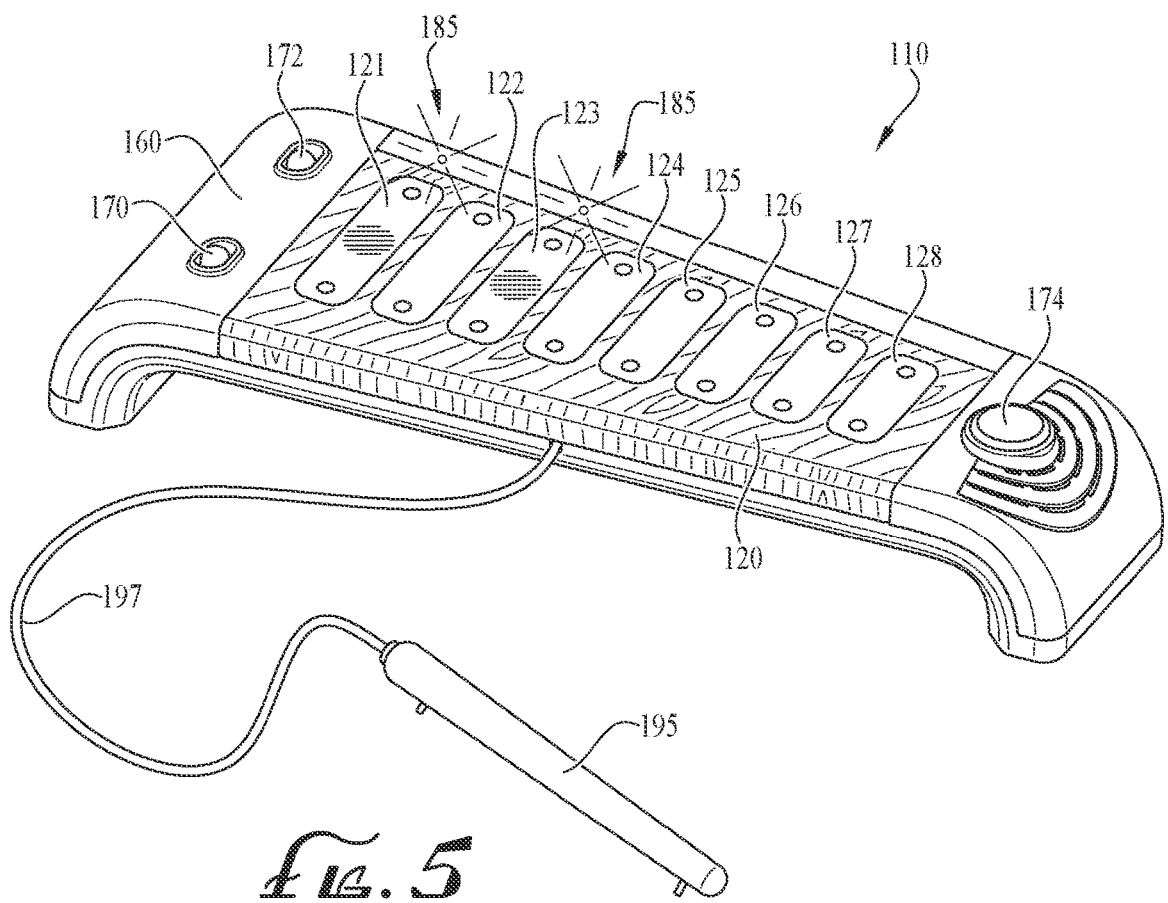
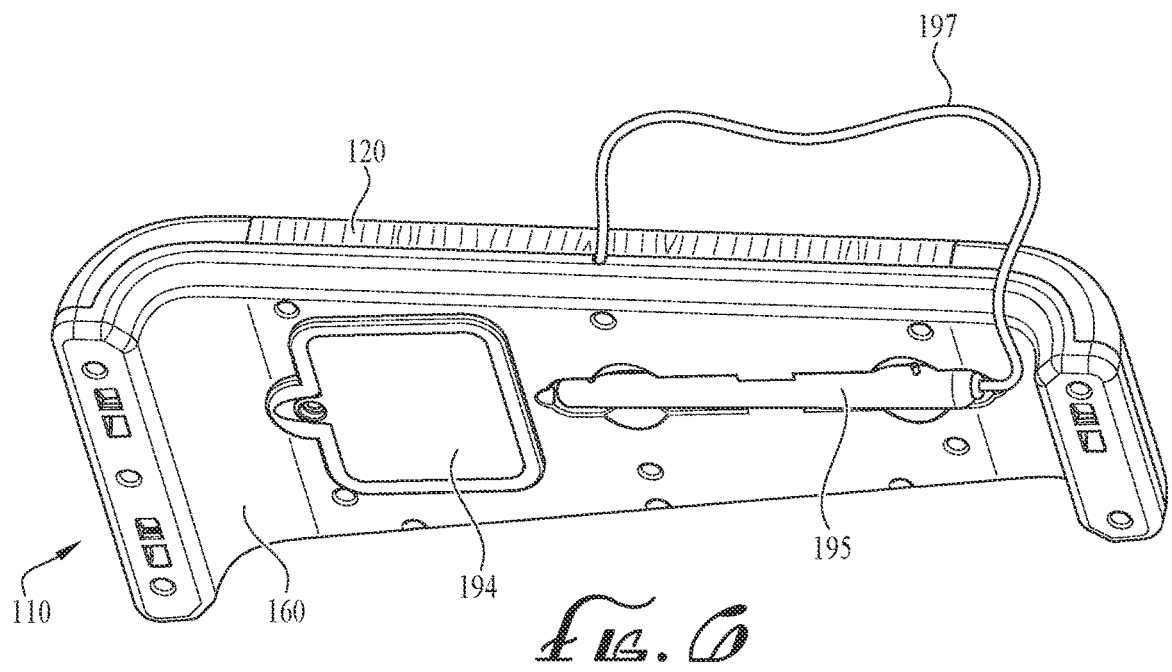

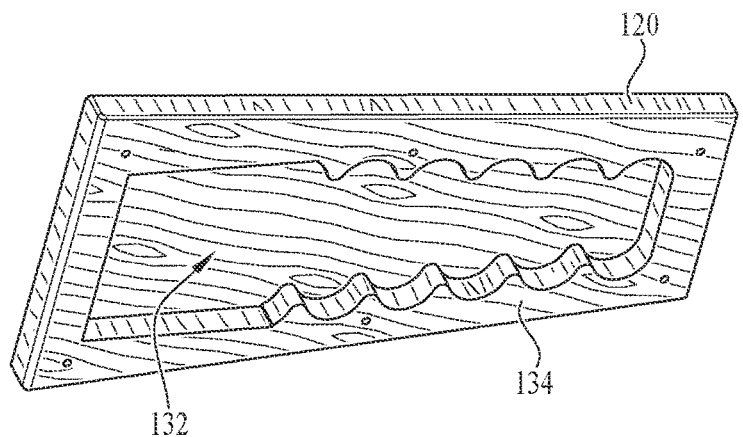
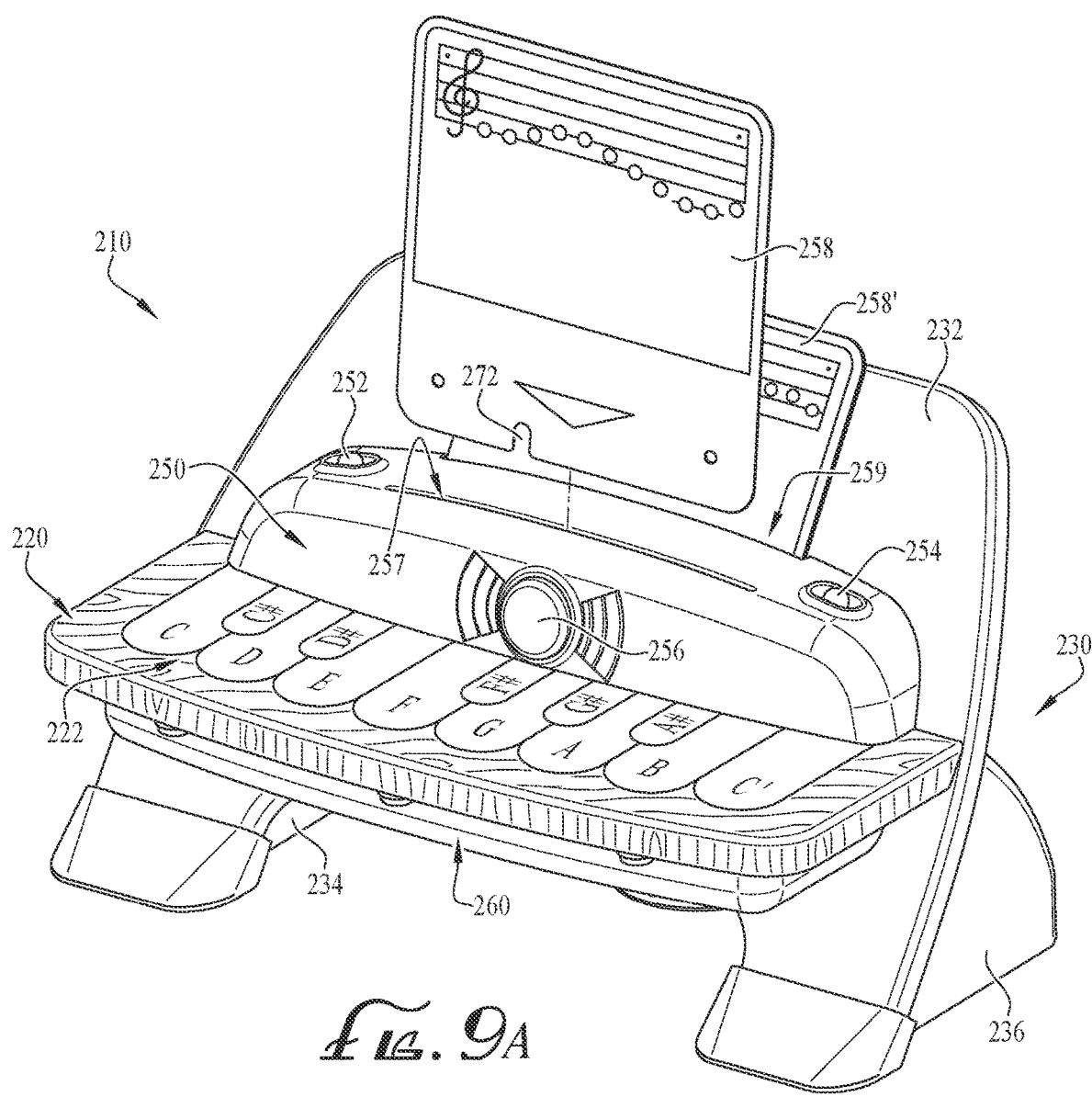

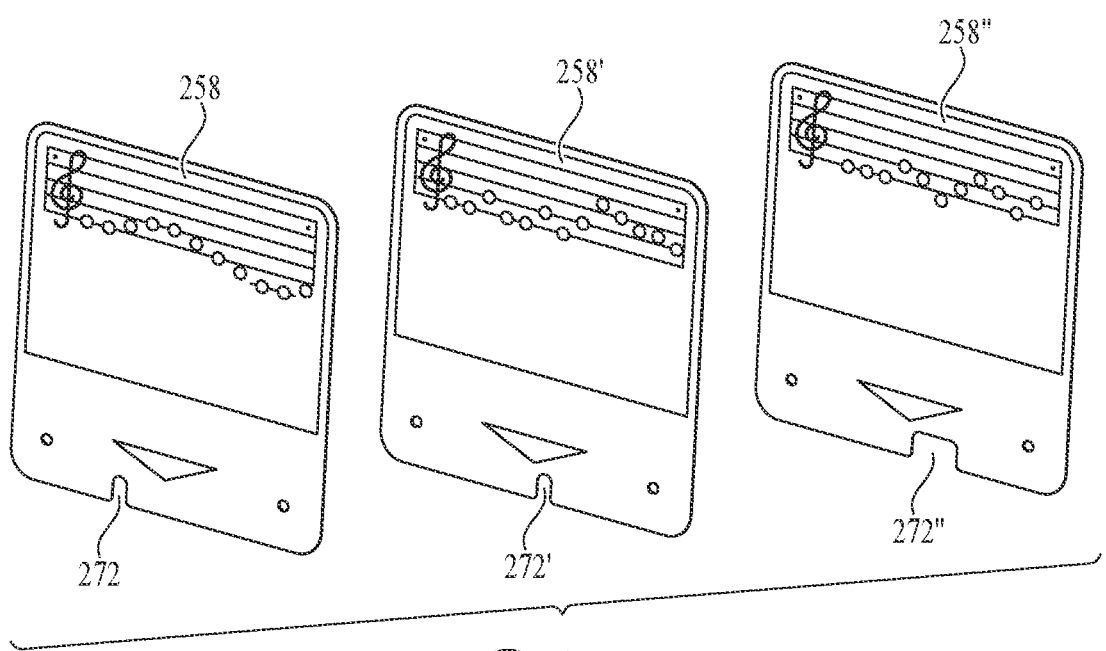
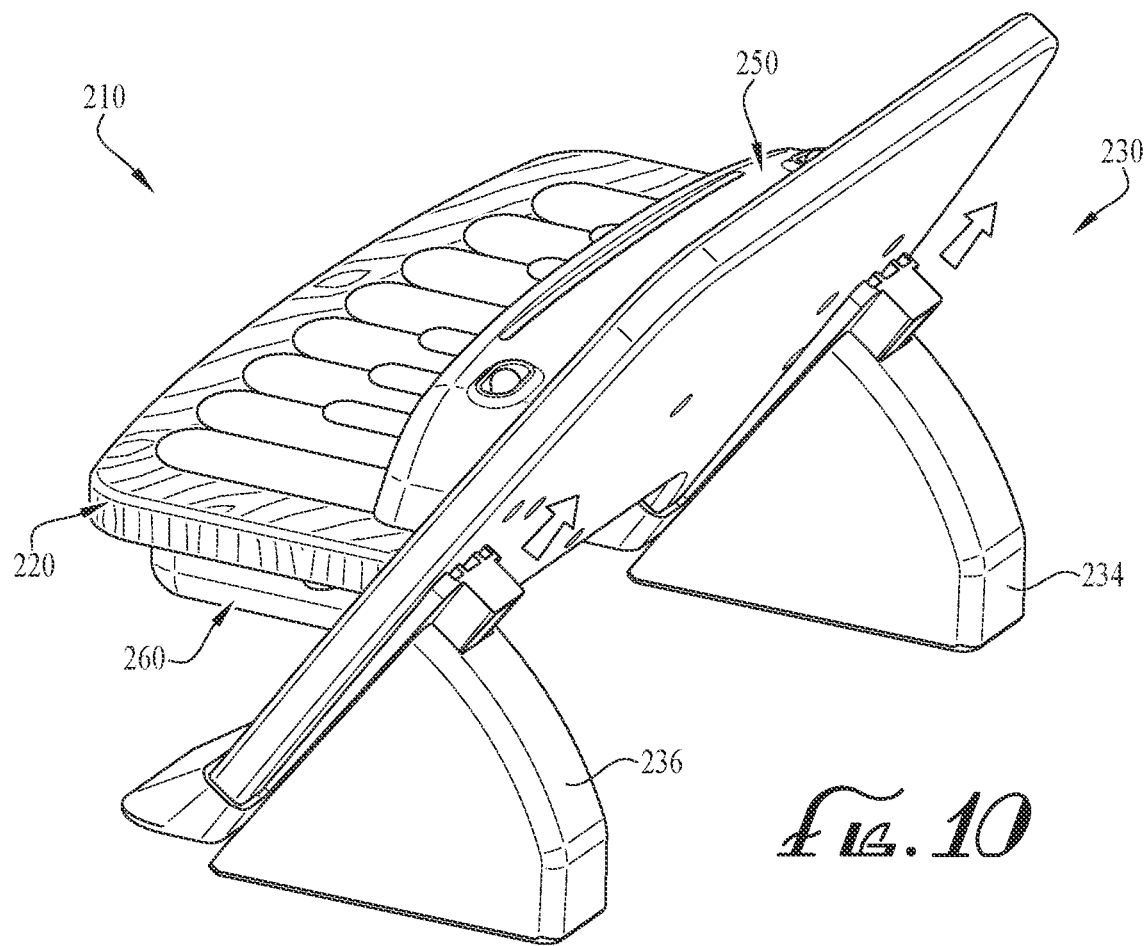

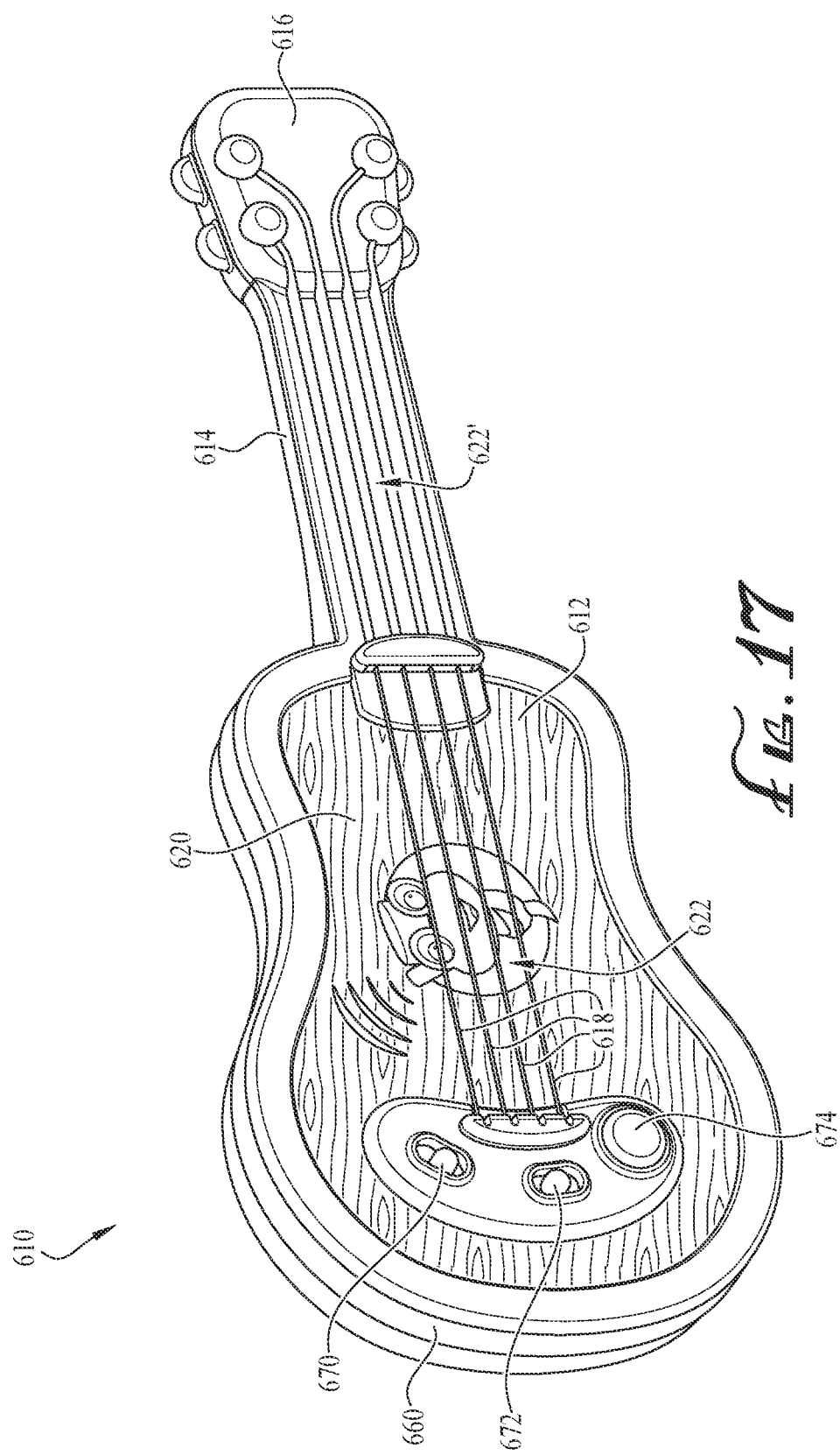

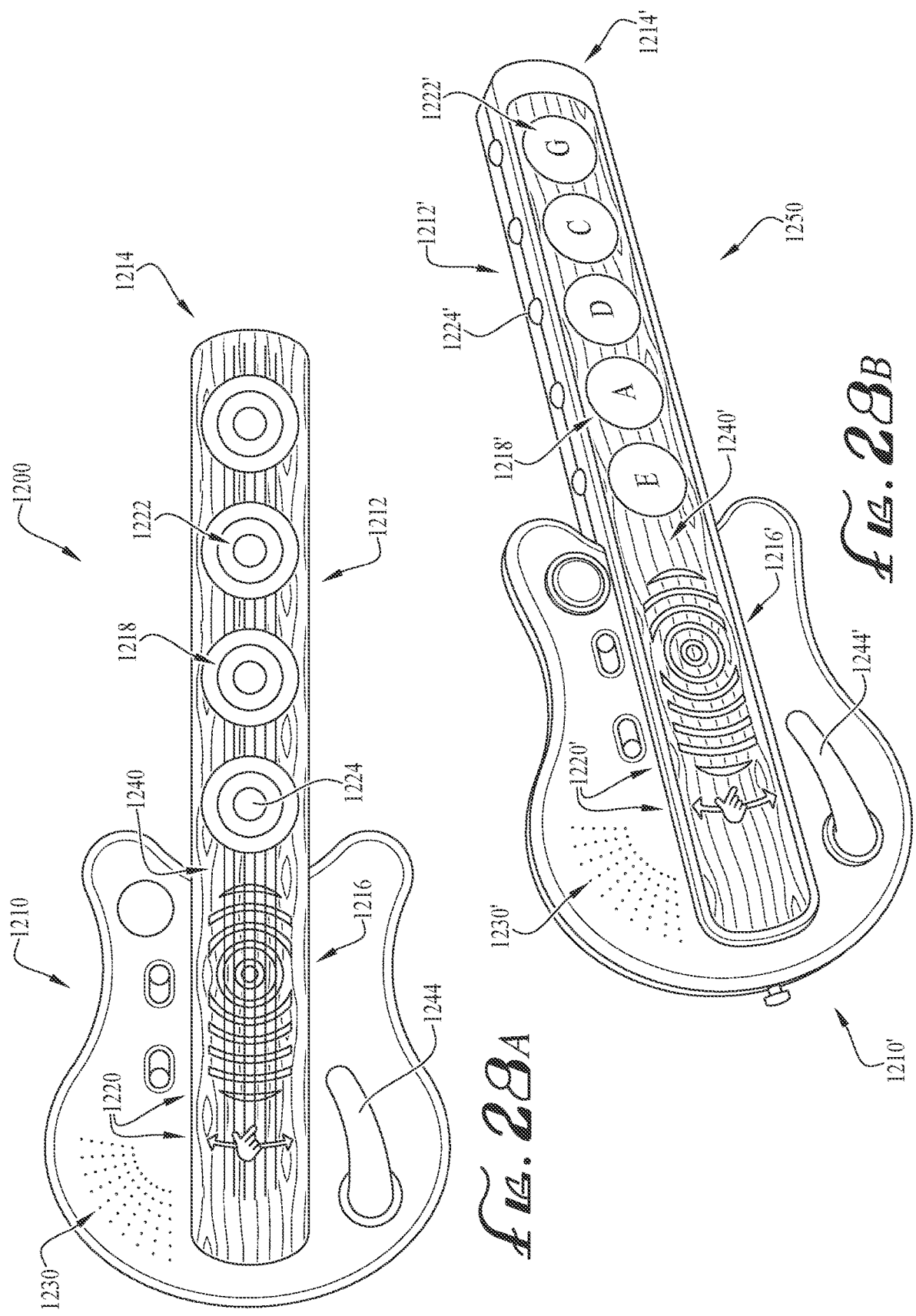

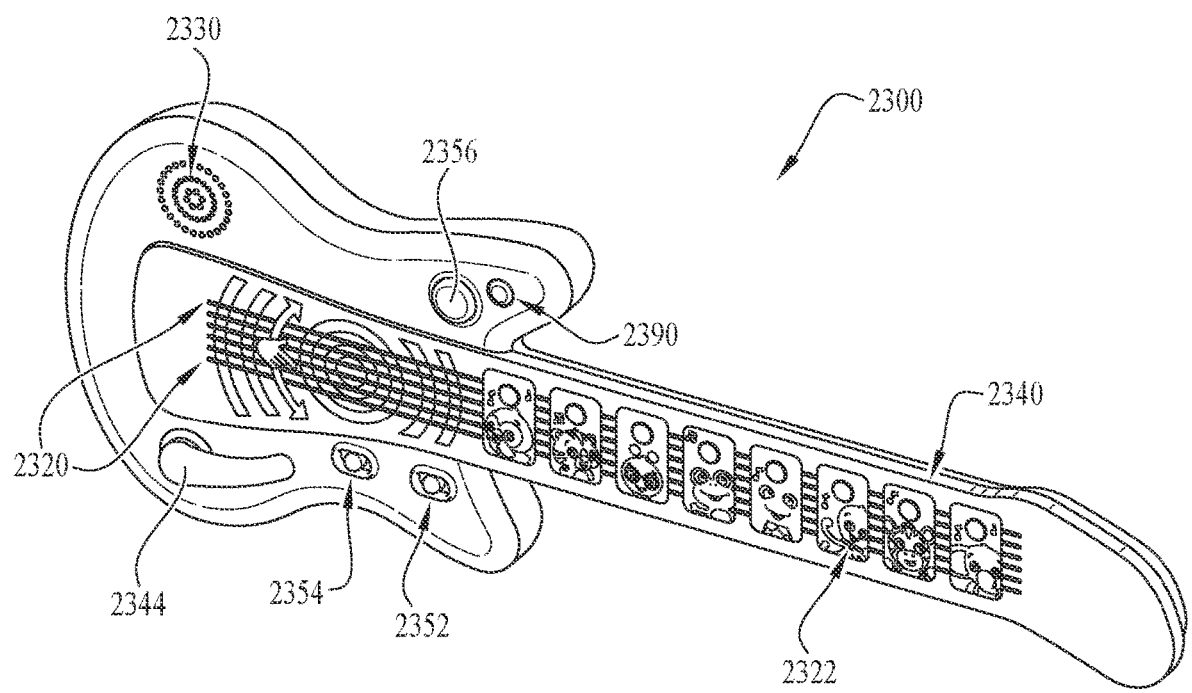

TOYS WITH CONNECTED PLAY

CROSS-REFERENCE TO RELATED APPLICATIONS

This application claims priority to U.S. Provisional Patent Application Ser. No. 63/192,224 filed May 24, 2021; this application is also a continuation-in-part of U.S. Non-Provisional patent application Ser. No. 17/106,899 filed Nov. 30, 2020, which is a continuation of U.S. Non-Provisional patent application Ser. No. 16/241,601 filed Jan. 7, 2019, now U.S. Pat. No. 10,901,560 issued Jan. 26, 2021, which claims priority to U.S. Provisional Patent Application Ser. No. 62/614,683 filed Jan. 8, 2018 and U.S. Provisional Patent Application Ser. No. 62/722,082 filed Aug. 23, 2018; this application is also a continuation-in-part of U.S. Non-Provisional patent application Ser. No. 17/687,862 filed Mar. 7, 2022, which is a continuation of U.S. Non-Provisional patent application Ser. No. 17/504,757 filed Oct. 19, 2021, which is a continuation of U.S. Non-Provisional patent application Ser. No. 16/906,485 filed Jun. 19, 2020, now U.S. Pat. No. 11,182,030 issued Nov. 23, 2021, which claims priority to U.S. Provisional Patent Application Ser. No. 62/864,985 filed Jun. 21, 2019; U.S. Non-Provisional patent application Ser. No. 17/687,862 filed Mar. 7, 2022 is also a continuation-in-part of U.S. Non-Provisional patent application Ser. No. 17/106,899 filed Nov. 30, 2020, which is a continuation of U.S. Non-Provisional patent application Ser. No. 16/241,601 filed Jan. 7, 2019, now U.S. Pat. No. 10,901,560 issued Jan. 26, 2021, which claims priority to U.S. Provisional Patent Application Ser. No. 62/614,683 filed Jan. 8, 2018 and U.S. Provisional Patent Application Ser. No. 62/722,082 filed Aug. 23, 2018; U.S. Non-Provisional patent application Ser. No. 17/504,757 is also a continuation-in-part of U.S. Non-Provisional patent application Ser. No. 16/241,601 filed Jan. 7, 2019, now U.S. Pat. No. 10,901,560 issued Jan. 26, 2021, which claims priority to U.S. Provisional Patent Application Ser. No. 62/614,683 filed Jan. 8, 2018 and U.S. Provisional Patent Application Ser. No. 62/722,082 filed Aug. 23, 2018; U.S. Non-Provisional patent application Ser. No. 16/906,485 is also a continuation-in-part of U.S. Non-Provisional patent application Ser. No. 16/241,601 filed Jan. 7, 2019, now U.S. Pat. No. 10,901,560 issued Jan. 26, 2021, which claims priority to U.S. Provisional Patent Application Ser. No. 62/614,683 filed Jan. 8, 2018 and U.S. Provisional Patent Application Ser. No. 62/722,082 filed Aug. 23, 2018.

TECHNICAL FIELD

The present disclosure relates generally to the field of interactive children's toys and connected methods of playing thereof, and more particularly to a set of electronic musical toys wirelessly synchronizing with one another to produce harmonic sounds or music therebetween.

BACKGROUND

Interactive musical toys stimulate and entertain children and contribute to childhood development. However, even the most pleasant-sounding musical toys or interactive products can result in a cacophony of dissonant noise if played out of sync, or otherwise out of harmony, with one another. While entertaining as it may be for children, a dissonant collection of sounds can be uncomfortable for others around. Therefore, continuing improvements to products in these fields are sought. It is to the provision of children's toys and other interactive products having new and improved methods of connection and synchronization therebetween the present disclosure is primarily directed.

SUMMARY

In example embodiments, the present disclosure relates to a set of interactive children's toys or other devices, capable of synchronizing with one another. The set of interactive children's toys or other devices generally includes at least two interactive children's toys or devices. Each of the interactive children's toys includes at least one capacitive touch sensor user input, coupled to an integrated circuit or other electronic processing device, and one or more output features or components for delivering entertaining, educational, and/or output or feedback to a user in response to the user input. In example embodiments, each of the interactive children's toys connects to one or more of the other toys and delivers output or feedback to the user in response to the user input from one or more of the other toys. In example embodiments, the output may be in the form of music or other sounds, color or light, electronic data, text display, motor operation, magnetic actuator operation and/or other output content or format. In example embodiments, the children's toys are interconnected wirelessly and synchronize the output from the at least two interactive children's toys.

In one aspect, the present disclosure relates to a children's toy having an input device, an output device, an external input signal receiver and a connectivity device to interconnect with one or more other children's toys having cooperative connectivity devices. Preferably, the connectivity device permits the children's toy to interconnect with the one or more other children's toys wirelessly. When interconnected, the children's toy generates a user-perceptible output in response to activation of the input device or when an external input signal is received by the external input signal receiver. Preferably, the user-perceivable output is a sound.

In another aspect, the present disclosure relates to a children's toy. The children's toy preferably includes a user input panel having a top surface and a bottom surface, the top surface defining at least one user input area for touch contact by a user. The user input panel is preferably formed from a natural wood material. The children's toy preferably also includes at least one capacitive touch sensor in operative contact with the bottom surface of the user input panel and in operative alignment with the at least one user input area. Touch contact by the user on the at least one user input area of the top surface of the user input panel is sensed by the at least one capacitive touch sensor to generate an input signal. The children's toy preferably also includes an electronic input-output control system configured to receive the input signal generated by the at least one capacitive touch sensor upon touch contact by the user on the at least one user input area, and to generate a primary responsive output signal. The children's toy preferably also includes an output device configured to receive the output signal from the control system and generate a user-perceptible output in response thereto.

The children's toy preferably also includes a connectivity device and a wireless signal receiver. The connectivity device is configured to interconnect the children's toy to one or more other children's toys wirelessly. Preferably, the connectivity device utilizes radio frequency, or more preferably radio frequency of 2.5 GHz. While wirelessly interconnected, the children's toy is configured to receive one or more wireless signals from one or more other children's toys and generate a secondary responsive output signal in response thereto. Preferably, the secondary responsive output signal is synchronized to the one or more wireless input signals. In example embodiments, the primary and/or secondary output signals are musical melodies and sounds. In other example embodiments, the primary and/or secondary output signals are sound effects.

In another aspect, the present disclosure relates to a children's toy drum including at least one simulated drum head having an exterior user input surface, and an interior surface opposite the exterior user input surface. The children's toy drum preferably also includes at least one capacitive touch sensor associated with each of the at least one simulated drum heads, and in operative contact with the interior surface thereof, and a sound output device for generating a simulated drum sound, or other sounds, responsive to user contact with the exterior user input surface of each of the at least one simulated drum heads. The children's toy drum preferably includes a wireless connectivity device to wirelessly interconnect the children's drum toy to one or more other children's musical toys and a wireless input signal receiver to receive wireless input signals from the one or more other children's musical toys connected thereto. The children's drum toy preferably generates synchronized drum and other sounds, responsive to the wireless input signals from the one or more other children's musical toys connected thereto.

In another aspect, the present disclosure relates to a children's toy piano including a user input panel in the form of a simulated keyboard. The user input panel preferably has an exterior surface and an opposite interior surface. The simulated keyboard preferably includes a plurality of user input areas on the exterior surface configured to resemble piano keys. The children's toy piano preferably also includes at least one capacitive touch sensor in operative contact with the interior surface of the user input panel, and configured to sense user contact with the plurality of user input areas, and a sound output device for generating a simulated piano sound responsive to user contact with the plurality of user input areas. The children's toy piano preferably also includes a wireless connectivity device to wirelessly interconnect the children's piano toy to one or more other children's musical toys and a wireless input signal receiver to receive wireless input signals from the one or more other children's musical toys connected thereto. The children's toy piano preferably generates synchronized piano or synthesizer sounds responsive to the wireless input signals from the one or more other children's musical toys connected thereto.

In another aspect, the present disclosure relates to a children's toy guitar including a simulated whammy bar and a user input panel in the form of a simulated fingerboard. The user input panel preferably has an exterior surface and an opposite interior surface. The simulated fingerboard preferably includes a plurality of user input areas on the exterior surface configured to resemble guitar sounds. The children's toy guitar preferably also includes at least one capacitive touch sensor in operative contact with the interior surface of the user input panel, and configured to sense user contact with the plurality of user input areas, and a sound output device for generating a simulated guitar sound responsive to user contact with the plurality of user input areas. The children's toy guitar preferably also includes a wireless connectivity device to wirelessly interconnect the children's guitar toy to one or more other children's musical toys and a wireless input signal receiver to receive wireless input signals from the one or more other children's musical toys connected thereto. The children's toy guitar preferably generates synchronized guitar sounds responsive to the wireless input signals from the one or more other children's musical toys connected thereto.

In another aspect, the present disclosure relates to a set of children's musical toys including a toy guitar, a toy drum and a toy piano. Each of the toy guitar, toy drum and toy piano includes a user input panel having an exterior surface and an opposite interior surface. The user input panels of the toy guitar, toy drum and toy piano include one or more capacitive user input areas and are configured to sense user contact with the one or more user input areas. The toy guitar, toy drum and toy piano also include a sound output device for generating musical content or sound effects responsive to user contact with the plurality of user input areas. Each of the children's musical toys also preferably include a wireless connectivity device to wirelessly connect the children's musical toys to one another. When connected, each of the children's musical toys is capable of generating musical content or sound effects responsive to user contact with the plurality of user input areas of the other children musical toys. Preferably, the children's musical toys are capable of generating synchronized output sounds responsive to user contact with at least one of the plurality of capacitive user input areas of one or more of the other children musical toys.

In another aspect, the present disclosure relates to a toy instrument ensemble comprising a lead toy instrument and one or more non-lead toy instruments. The one or more non-lead toy instruments are configured for wirelessly connecting to the lead toy instrument and one another. Preferably, the non-lead toy instruments generate synchronized sounds or riffs corresponding to lead sounds or riffs generated by the lead toy instrument. Optionally, the one or more non-lead toy instruments are configured to play a melody backer matching the melody backer of the lead toy instrument. Optionally, the one or more non-lead toy instruments are configured to play sounds or riffs synchronized or harmonized to the sounds or riffs generated by the lead toy instrument so as to produce a harmony.

In another aspect, the present disclosure relates to a method of synchronizing two or more interconnected children's toy instruments to generate a harmonized music and/or sounds. The method includes establishing a wireless interconnection between two or more children's toy instruments. Preferably, the wireless interconnection utilizes radio technology. Once the wireless interconnection is established, the method includes playing a common melody backer on at least two of the two or more children' toy instruments. The method further includes designating one of the two or more interconnected children's toy instruments as a lead (i.e., played) instrument and the remainder as a non-lead (i.e., non-played) instrument or instruments. A combination of harmonized sounds/instruments comprising a melody backer is generated from the lead and non-lead instrument or instruments when a melody is executing and no inputs are occurring. In response to an output signal from the lead instrument activated by user interaction with the lead instrument, the connected non-lead instruments will mirror the lead (i.e., sounds or motifs) generated from the lead instruments with their own unique leads (i.e., sounds or motifs) for the duration of play. Still further, other sounds could be played by other backer instruments. Optionally, the synchronized or harmonized melodies or sounds from the non-lead instruments are auto-tuned so as to create an ensemble effect.

These and other aspects, features and advantages of the disclosed example embodiments will be understood with reference to the drawing figures and detailed description herein, and will be realized by means of the various elements and combinations particularly pointed out in the appended claims. It is to be understood that both the foregoing general description and the following brief description of the drawings and detailed description of example embodiments are explanatory of example embodiments of the invention, and are not restrictive of the invention, as claimed.

BRIEF DESCRIPTION OF THE DRAWINGS

FIG. 1 is a top perspective view of a children's drum toy with capacitive touch sensor user input features, according to an example embodiment of the present disclosure.

FIG. 2 is a bottom perspective view of the user-input overlay layer or cover panel of the children's drum toy of FIG. 1.

FIG. 3 is a top perspective view of the capacitive touch sensor layer and the base layer of the children's drum toy of FIG. 1.

FIG. 4 shows a partially disassembled view of the base, showing internal components of the children's drum toy of FIG. 1.

FIG. 5 is a top perspective view of a children's xylophone toy with capacitive touch sensor user input features according to another example embodiment of the present disclosure.

FIG. 6 is a bottom perspective view of the children's xylophone toy of FIG. 5.

FIG. 8 is a bottom perspective view of the user-input overlay layer or cover panel of the children's xylophone toy of FIG. 5.

FIG. 9A shows a front perspective view of a children's keyboard toy with capacitive touch sensor user input features, according to an example embodiment.

FIG. 9B shows indexed song cards for the keyboard toy of FIG. 9A, according to an example embodiment.

FIG. 10 is a back perspective view of the children's keyboard toy of FIG. 9.

FIG. 17 is a front perspective view of a children's ukulele or guitar toy with capacitive touch sensor user input features according to another example embodiment of the present disclosure.

FIGS. 28A and 28B show example embodiments of a children's toy guitar with capacitive touch features according to the present disclosure.

FIG. 34 is perspective view of a children's toy guitar of the ensemble of FIG. 31.

DETAILED DESCRIPTION OF EXAMPLE EMBODIMENTS

Figure 7:
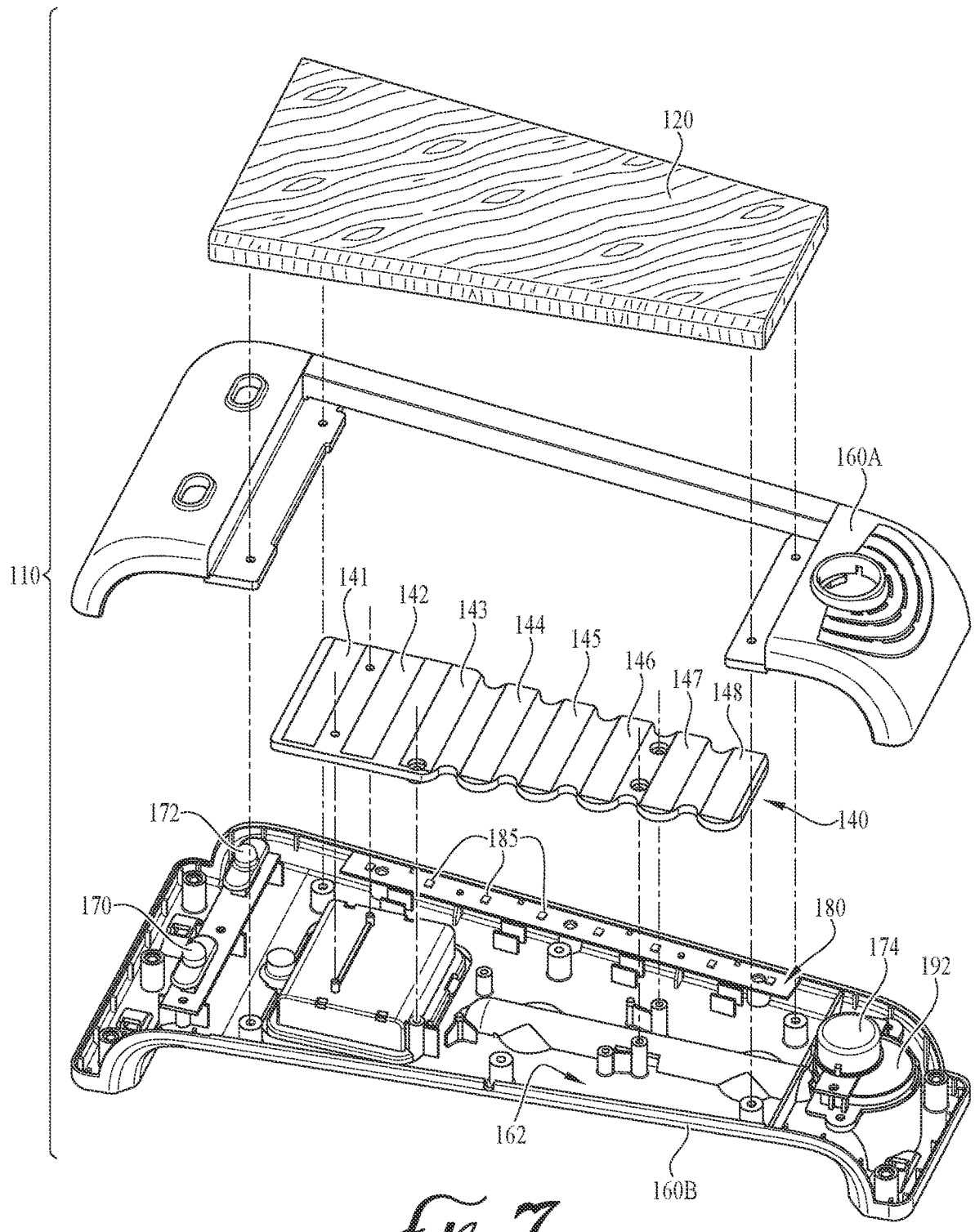
FIG. 7 is an assembly view of the children's xylophone toy of FIG. 5.
Figure 11:
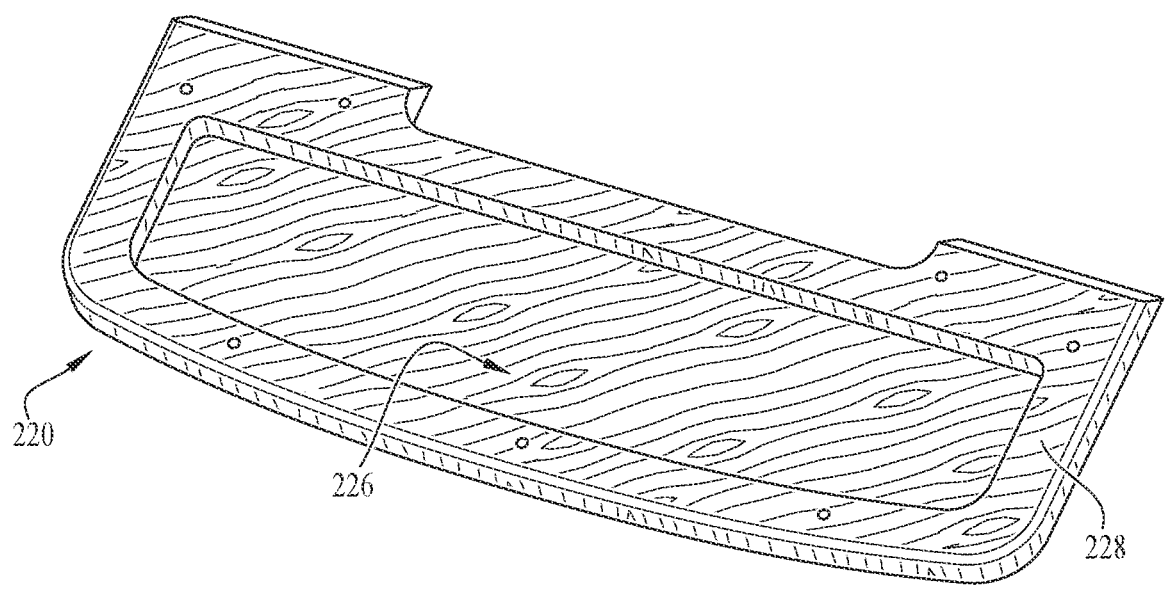
FIG. 11 is a bottom perspective view of the user-input overlay layer or cover panel of the children's keyboard toy of FIG. 9.
Figure 12:
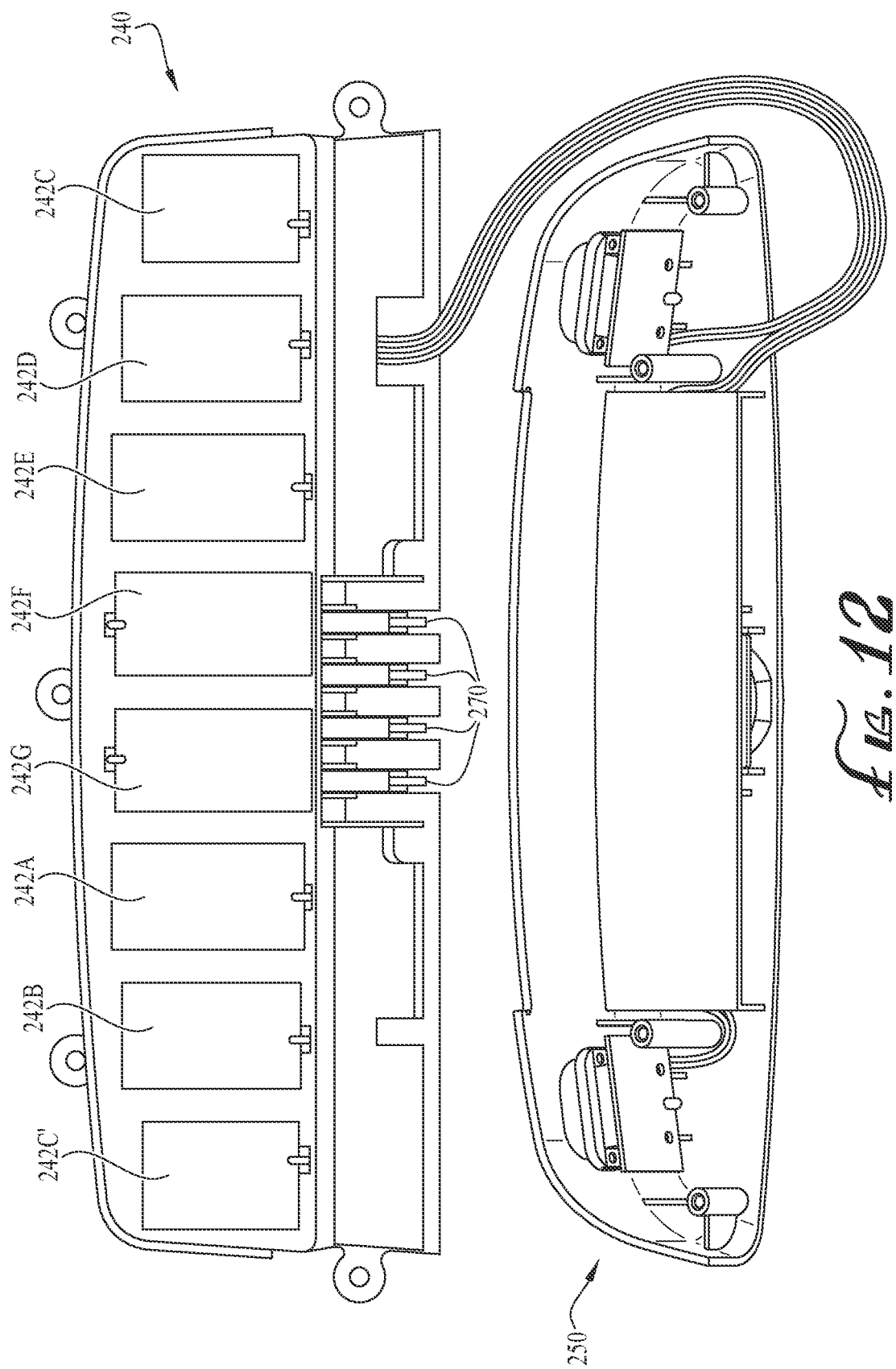
FIGS. 12 and 13 are partially disassembled views of an electronics housing portion of the children's keyboard toy of FIG. 9, showing internal components.
Figure 13:
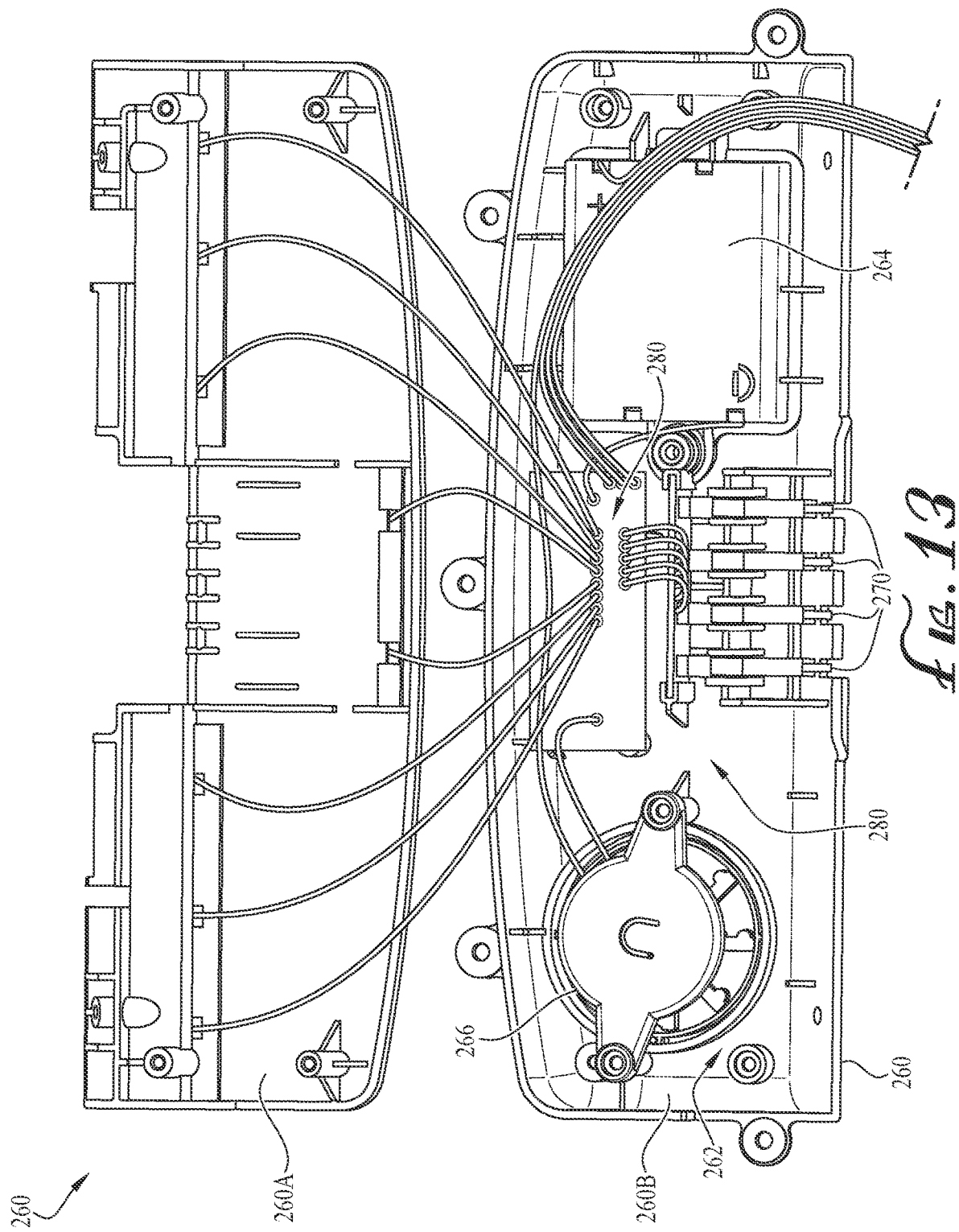

The present invention may be understood more readily by reference to the following detailed description of example embodiments taken in connection with the accompanying drawing figures, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention. Any and all patents and other publications identified in this specification are incorporated by reference as though fully set forth herein.

Also, as used in the specification including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

With reference now to the drawing figures, FIGS. 1-4 show an interactive children's toy drum 10 with capacitive touch user interface technology according to an example embodiment of the invention. The children's toy drum 10 generally includes a user interface cover layer or panel 20, a capacitive touch sensor system 40, a base or housing 60, and an electronic input-output control system 80. The user interface panel 20 comprises a top surface and an opposite bottom surface, with the top surface defining one or more user input surfaces or areas, such as user input areas 22, 24, 26, 28 in the depicted embodiment. In alternate embodiments, one, two, three, four or more user input areas may be provided. The user input areas 22, 24, 26, 28 are optionally configured to simulate the appearance of drum heads, and are optionally defined and indicated by one or more patterns, images, characters, text, delineations, or other markings, such as the animal characters within circular boundary markings shown in the depicted embodiment. The markings of the user input areas 22, 24, 26, 28 may be applied to the surface of the user interface panel 20, for example, by painting, stain, decals, inlay, or other visually and/or tactilely perceptible manner. In the depicted embodiment, the user interface panel 20 comprises an integral and unitary generally trapezoidal array of the four generally circular user input areas 22, 24, 26, 28 with continuous interconnecting webs of material extending seamlessly therebetween, with the outer user input areas 22, 28 extending at oblique angles (for example between about 30° to 45°, or about 40°) from the inner user input areas 24, 26.

In example embodiments, the user interface panel 20 comprises a smooth and continuous seamless exterior user input surface, without significant crevices or recesses in or around the user input areas, where dirt, food residue or other debris might collect, making it easier to clean the device, and preventing interference with internal electronics, switches or other components. In example embodiments, the user interface panel 20 comprises a unitary, integral component formed of a capacitive discharge conductive material, such as natural or synthetic wood, fabric, plastic, glass, or other material compatible with electronic capacitive touch sensor systems. In particular example embodiments, the user interface panel comprises a natural organic material such as wood or other plant-based materials. In the depicted example embodiment, the user interface panel 20 comprises a natural wood panel, such as a pine, maple, oak, beech, bamboo, Brazilian maple, walnut, mahogany, ash, birch, cherry, or other natural hardwood or softwood tree-based wood materials. In further embodiments, the user interface panel may comprise plywood, fiberboard, chipboard or other manufactured wood products. The user interface panel 20 preferably comprises a relatively thin material thickness in the user input areas 22, 24, 26, 28 for improved capacitive touch sensitivity, and optionally further comprises a relatively thicker material thickness in one or more surrounding or peripheral areas outside of the user input areas for improved durability and structural strength. For example, in the depicted embodiment, the user interface panel 20 comprises a hollowed-out or recessed inner region 32 underneath the user input areas 22, 24, 26, 28, leaving a thin cover layer of wood defining the user input areas, and a thicker peripheral rim 34 about the outer edge of the user interface panel.

In alternate embodiments, a thin wood veneer or other capacitive discharge conductive material forms the user input areas. In the depicted embodiment, as seen best in FIG. 2, the hollowed out or recessed inner region 32 comprises a continuous recess including four interconnected generally circular recesses or chambers positioned beneath each of the user input areas 22, 24, 26, 28, with connecting webs therebetween. In alternate embodiments, one or more separate recesses or chambers may be provided. In example embodiments, the overall thickness of the user interface panel 20 in the relatively thicker peripheral area(s) 34 is between about 6 mm-to about 50 mm, more preferably about 10 mm to about 25 mm, for example about 12 mm or about 18 mm thick. In example embodiments, the material thickness of the user interface panel 20 in the relatively thinner user input areas 22, 24, 26, 28 is between about 1 mm to about 10-15 mm, for example between about 1 mm to 5 mm, more preferably about 2 mm-4 mm, for example about 2.5 mm or about 3 mm thick. Optionally, one or more openings 36 are formed through the user interface panel 20 in locations corresponding to output features such as audio speakers, lights, actuators, etc., or corresponding to input features such as mechanical switches, buttons, actuators, etc.

The user interface panel 20 overlies the base or housing 60, with the capacitive touch sensor system 40 sandwiched between the bottom surface of the user interface panel and the top surface of the base. The capacitive touch sensor system 40 comprises one or more capacitive touch sensors in operative contact with the bottom surface of the user interface panel 20, such as the depicted array of four sensors 42, 44, 46, 48. In example embodiments, the capacitive touch sensors 42, 44, 46, 48 each comprise an electrically conductive material such as, for example a copper or other metallic foil, sheet, strip, panel, button, or other configuration, and are connected by wires or other electrical conductors to the electronic input-output control system 80. In the depicted embodiment, each of the capacitive touch sensors 42, 44, 46, 48 comprises a lattice of conductive foil strips including a central longitudinal strip and three generally perpendicular transverse strips crossing the central strip, all surrounded by a generally circular circumferential strip. In alternate embodiments, the capacitive touch sensor system 40 may comprise one, two, three, four or more capacitive touch sensors of varying sensor configuration(s). In the depicted embodiment, the capacitive touch sensors 42, 44, 46, 48 are arranged in a generally trapezoidal array substantially conforming to the shape of the user interface panel 20, with each capacitive touch sensor positioned for alignment with a respective cooperating one of the user input areas 22, 24, 26, 28 when the toy 10 is assembled.

In example embodiments, the base or housing 60 comprises a plastic panel or molding, for example having an upper shell and a lower shell configured for assembly together to define an internal housing chamber 62 therein. The housing 60 includes an upper support surface 64, upon which the capacitive touch sensors 42, 44, 46, 48 are affixed, for example by adhesive, fasteners, or other attachment means. The housing 60 optionally also incorporates a carrying handle 66 for use in moving or carrying the toy 10, and/or for supporting the toy in a desired position for use. The housing 60 optionally also includes a control panel portion 70, having one or more openings formed therein and/or one or more actuators mounted thereto for interfacing with one or more input and/or output components of the electronic input-output control system 80. In the depicted embodiment, the base or housing 60 comprises a generally trapezoidal body incorporating four interconnected generally circular portions positioned for alignment with a respective cooperating one of the user input areas 22, 24, 26, 28 of the user interface panel 20 when the toy 10 is assembled, with connecting webs between the generally circular portions, and with the control panel portion extending in a proximal direction from a medial or interior region of the body. In alternate embodiments, the base or housing may take any of a variety of shapes, sizes and/or configurations to suit the intended product configuration. Optionally, a channel or groove 72 is formed in the housing 60, configured to accommodate a corresponding portion of the peripheral rim 34 of the user interface panel upon assembly. One or more output openings, such as speaker openings 74 may optionally also be provided through the housing 60, configured to align with corresponding output features of the electronic input-output control system 80, for example at or near the center of the housing or otherwise positioned thereon.

The electronic input-output control system 80 is preferably mounted in or on the base or housing 60. In example embodiments, the input-output system 80 comprises one or more integrated circuits (ICs) 82, 84 such as application specific integrated circuits (ASICs) incorporating onboard microprocessor(s), digital memory, and application software, for carrying out capacitive user input touch sensing, interactive voice/melody output, light output, and/or other input/output features of the toy 10. Example IC components of the input-output control system 80 include, without limitation, any IC with embedded touch feature, such as for example, Nyqest NY9T series, Sonix SNC86 series, General Plus GPCD9T or GPCD9TC series integrated circuits, a voice IC, and/or an audio or sound processor. In example embodiments, the capacitive touch ("cap-touch") functionality can optionally be provided by an integrated cap-touch and sound processor IC, or by a dedicated cap-touch controller IC, for example using a single printed circuit board (PCB), copper foil, carbon, and/or other conductive components and/or material(s), etc., and/or other electronic processors. The electronic input-output control system 80 optionally comprises one or more printed circuit boards 86 carrying the IC(s) and associated electronic components, and providing electrically conductive connections with the capacitive touch sensors 42, 44, 46, 48, and other input devices 90 such as on-off switches, mode switches, input sensors, volume controls, enhanced RAM memory, and optionally also a wireless connectivity module (Bluetooth/Wi-Fi/near-field communication), etc., and with output devices 92 such as one or more speakers, lights, displays, vibration transducers, etc. Optionally, the IC or processor can provide light, sound, motorized activation, magnetic activation, camera, microphone, recording, projection, etc. features in response to receiving a capacitive touch (cap-touch) signal based on user input.

In example modes of use of the drum toy 10, a child or other user contacts the user input areas 22, 24, 26, 28 of the user interface panel 20 with their hands or with a conductive implement such as a conductive drumstick or mallet, for example comprising a conductive carbon (e.g., about 30%) impregnated high-density polyethylene (HDPE) material. The capacitive touch sensors 42, 44, 46, 48 beneath the user input areas 22, 24, 26, 28 sense the change in capacitance resulting from user contact with the wood or other capacitive discharge conductive material, and provide an electronic input signal to the capacitive touch IC 84 indicating a user contact input, which in turn signals the sound output IC 82 to output a sound signal to play a sound on the speaker 92. In example embodiments, user contact with each of the capacitive touch sensors 42, 44, 46, 48 generates a different sound output, for example, a base drum sound output, a snare drum sound output, a tom drum sound output, a cymbal sound output, and/or other synthesized sounds, etc. Optionally, the capacitive touch sensor system 40 senses the force or level of the contact as well as the contact itself, and the electronic input-output control system 80 generates sound outputs of varying volume, pitch or intensity corresponding to the input level. In further embodiments, the electronic input-output control system 80 optionally generates one or more melodies for the user to drum along with, and/or generates example drum beat patterns for the user to follow or play along with, or simply overlay drum or other instrument sounds on top of a playing melody.

FIGS. 5-8 show an interactive children's toy xylophone 110 according to another example embodiment of the invention. The children's toy xylophone 110 generally includes a user interface cover layer or panel 120, a capacitive touch sensor system 140, a base or housing 160 (comprising upper and lower half-shells 160, 160B), and an electronic input-output control system 180, in similar fashion to the above-described embodiment. The children's toy xylophone 110 optionally further comprises a mallet 195, for example comprising a conductive carbon (e.g., about 30%) impregnated high-density polyethylene (HDPE) material, which may be tethered to the base 160 by a cord 197.

In example embodiments, the user interface panel 120 comprises a smooth and continuous seamless exterior user input surface, without significant crevices or recesses in or around the user input areas, where dirt, food residue or other debris might collect. In substantially similar fashion to the above-described embodiment, the user interface panel 120 may comprise a unitary, integral component formed of a capacitive discharge conductive material, such as natural or synthetic wood, fabric, plastic, glass, or other material compatible with electronic capacitive touch sensor systems. In particular example embodiments, the user interface panel comprises a natural organic material such as wood or other plant-based materials. In the depicted example embodiment, the user interface panel 120 comprises a natural wood panel. The user interface panel 120 comprises a plurality of user input surfaces or areas, such as user input keys 121, 122, 123, 124, 125, 126, 127, and 128. The user input areas 121, 122, 123, 124, 125, 126, 127, 128 may be defined and indicated by painting, stain, decals, inlay, or other visually and/or tactilely perceptible manner. In example embodiments, the user input areas 121, 122, 123, 124, 125, 126, 127, 128 are marked by a plurality of different colors.

The user interface panel 120 preferably comprises a relatively thin material thickness in the user input areas 121, 122, 123, 124, 125, 126, 127, 128 for improved capacitive touch sensitivity, and optionally further comprises a relatively thicker material thickness in one or more surrounding or peripheral areas outside of the user input areas for improved durability and structural strength. For example, and as seen with reference to FIG. 8, in the depicted embodiment the user interface panel 120 comprises a hollowed-out or recessed inner region 132 underneath the user input areas, leaving a thin cover layer of wood defining the user input areas, and a thicker peripheral rim 134 about the outer edge of the user interface panel. In alternate embodiments, a thin wood veneer or other capacitive discharge conductive material forms the user input areas. In example embodiments, the overall thickness of the user interface panel 120 in the relatively thicker peripheral area(s) 134 is between about 6 mm-to about 50 mm, more preferably about 10 mm to about 25 mm, for example about 12 mm or about 18 mm thick. In example embodiments, the material thickness of the user interface panel 120 in the relatively thinner user input areas 121, 122, 123, 124, 125, 126, 127, 128 is between about 1 mm to about 5 mm, more preferably about 2 mm-4 mm, for example about 2.5 mm or about 3 mm thick. In example embodiments, the upper surface of the user interface panel 120 defines a generally trapezoidal profile, wider at one end and narrower at the other end, and having a length of about two times or more the width at the wider end. In example embodiments, the user input keys 121, 122, 123, 124, 125, 126, 127, 128 extend in a spaced array along the lengthwise direction, and are longer in their transverse dimension toward the wider end of the user interface panel 120 and become progressively shorter toward the narrower end of the user interface panel in a pattern generally matching the taper of the user interface panel.

The capacitive touch sensor system 140 is mounted between the base 160 and the user interface panel 120, and comprises a plurality of capacitive touch sensors 141, 142, 143, 144, 145, 146, 147, 148, corresponding to and aligned beneath the user input keys 121, 122, 123, 124, 125, 126, 127, 128, respectively. In example embodiments, the capacitive touch sensors 141, 142, 143, 144, 145, 146, 147, 148 each comprise an electrically conductive material such as, for example a conductive core, such as a conductive copper or conductive carbon mixed with high-density polyethylene (HDPE) or polyoxymethylene (POM), optionally overmolded with a thermoplastic rubber (TPR); and/or a copper or other metallic foil, sheet, strip, panel, button, or other configuration, and are connected by wires or other electrical conductors to the electronic input-output control system 180.

In example embodiments, the base or housing 160 comprises a plastic molding including an upper shell 160A and a lower shell 160B configured for assembly together to define an internal housing chamber 162 therein. The base 160 optionally further includes one or more manual inputs such as switches 170, 172, 174 in electronic communication with the electronic input-output control system 180, for selective user control of power on/off, volume control, mode switching, melody activation, and/or other features. The base 160 optionally further includes one or more output features in electronic communication with the electronic input-output control system 180, such as an audio speaker 192, lights, vibration transducers, and/or other outputs. The base 160 optionally further includes a battery compartment 194 for DC batteries to power the toy; and/or an AC power adaptor and electrical cord connection.

The electronic input-output control system 180 is preferably mounted in or on the base or housing 160. In example embodiments, the input-output system 180 comprises one or more integrated circuits (ICs), one or more printed circuit boards, and associated electronic components, in like manner as the above-described embodiment. In example embodiments, one or more light-emitting diode (LED) or other light sources 185 are provided in connection with the electronic input-output control system 180, for example positioned alongside the user input keys 121, 122, 123, 124, 125, 126, 127, 128 to illuminate in coordination with the sound output, for example in response to user input upon contact with the respective user input keys.

In example modes of use of the xylophone toy 110, a child or other user contacts the user input keys 121, 122, 123, 124, 125, 126, 127, 128 of the user interface panel 120 with their hands or with the conductive mallet 195. The capacitive touch sensors 141, 142, 143, 144, 145, 146, 147, 148 beneath the user input keys sense a change in capacitance through the thin portions of the wood user interface panel 120 upon user contact, providing an electronic input signal to the electronic input-output control system 180, which in turn outputs a sound signal to play a sound on the speaker 192 and/or to illuminate one or more corresponding LED lights 185. In example embodiments, user contact with each of the user input keys 121, 122, 123, 124, 125, 126, 127, 128 generates a different sound output, for example, a different musical note of an octave. Optionally, the capacitive touch sensor system 140 senses the force or level of the contact as well as the contact itself, and the electronic input-output control system 180 generates sound outputs of varying volume, pitch or intensity corresponding to the input level. In further embodiments, the electronic input-output control system 180 optionally generates one or more melodies for the user to play along with, and/or generates example melodies for the user to follow or play along with. In further example embodiments, a capacitive touch xylophone featuring indicating LEDs above each capacitive touch key can sequentially illuminate specific keys for the user to touch one-after-the-other, allowing the playback of a meaningful melodic sequence, note-by-note. In further embodiments, the system optionally also includes wireless connectivity peripherals, access to the personal cloud or open cloud for other services, social media inputs, etc. In example embodiments, the user input and output features may be located near to the electronic input-output control system 180.

FIGS. 9-13 show an interactive children's toy piano 210 according to another example embodiment of the invention. The children's toy piano 210 generally includes a user interface panel 220, a support structure 230, a capacitive touch sensor system 240, a control panel 250, a component housing 260, and an electronic input-output control system 280. The support structure 230 comprises an upright panel 232, and first and second support feet 234, 236. In example embodiments, the support feet 234, 236 have a wedge-shaped profile defining an angle of between about 30° to about 90°, more preferably about 50° to about 60°, and support the upright panel 232 at a corresponding angular position relative to a horizontal support surface. In example embodiments, the support feet 234, 236 comprise plastic moldings, and the upright panel 232 comprises a wood panel such as for example a 1 cm thick plywood panel.

In example embodiments, the user interface panel 220 comprises a smooth and continuous seamless exterior user input surface, without significant crevices or recesses in or around the user input areas, where dirt, food residue or other debris might collect. In substantially similar fashion to the above-described embodiments, the user interface panel 220 may comprise a unitary, integral component formed of a capacitive discharge conductive material, such as natural or synthetic wood, fabric, plastic, glass, or other material compatible with electronic capacitive touch sensor systems. In particular example embodiments, the user interface panel comprises a natural organic material such as wood or other plant-based materials. In the depicted example embodiment, the user interface panel 220 comprises a natural wood panel, such as for example a 1 cm thick plywood panel. The user interface panel 220 comprises a plurality of user input areas, such as user input keys 222, in a pattern generally corresponding to at least a portion of a piano keyboard and configured to simulate the appearance of piano keys, for example including keys for musical notes C, C #, D, D #, E, F, F #, G, G #, A, A #, B and C'. The user input keys 222 may be defined and indicated by painting, stain, decals, inlay, or other visually and/or tactilely perceptible manner. In example embodiments, the user input keys 222 are marked by a plurality of different colors, for example with corresponding musical notes of different octaves (C, C') in like colors.

The user interface panel 220 preferably comprises a relatively thin material thickness in the user input areas 222 for improved capacitive touch sensitivity, and optionally further comprises a relatively thicker material thickness in one or more surrounding or peripheral areas outside of the user input areas for improved durability and structural strength. For example, and as seen with reference to FIG. 11, in the depicted embodiment the user interface panel 220 comprises a hollowed-out or recessed inner region 226 underneath the user input areas, leaving a thin cover layer of wood defining the user input areas, and a thicker peripheral rim 228 about the outer edge of the user interface panel. In alternate embodiments, a thin wood veneer or other capacitive discharge conductive material forms the user input areas. In example embodiments, the overall thickness of the user interface panel 220 in the relatively thicker peripheral area(s) 228 is between about 6 mm-to about 30 mm, more preferably about 8 mm to about 12 mm, for example about 10 mm thick. In example embodiments, the material thickness of the user interface panel 220 in the relatively thinner user input areas 222 overlying the hollowed-out region 226 is between about 1 mm to about 5 mm, more preferably about 2 mm-4 mm, for example about 2.5 mm or about 3 mm thick.

The capacitive touch sensor system 240 is mounted between the component housing 260 and the user interface panel 220, and comprises a plurality of capacitive touch sensors 242, for example sensors 242C, 242D, 242E, 242F, 242G, 242A, 242B and 242C', corresponding to and aligned beneath the user input keys 222 of corresponding musical notes on the upper surface of the user interface panel 220, respectively. In example embodiments, the capacitive touch sensors 242 each comprise an electrically conductive material such as, for example a copper or other metallic foil, sheet, strip, panel, button, or other configuration, and are connected by wires or other electrical conductors to the electronic input-output control system 280.

In example embodiments, the control panel 250 is mounted between the top surface of the user interface panel 220 and the front surface of the upright panel 232, and optionally includes one or more manual inputs such as switches 252, 254 and 256 in electronic communication with the electronic input-output control system 280, for selective user control of power on/off, volume control, mode switching, melody activation, and/or other features. The control panel 250 optionally also includes a play slot or receiver 257 for receiving an active song card 258 selected from one or more interchangeable indexed song cards 258, 258', 258", to engage with cooperative indicators linked to the electronic input-output control system 280 (as described below) to generate a song, and a holder slot 259 for storing one or more inactive song cards 258' when not in active use.

In example embodiments, the component housing 260 is mounted between the bottom surface of the user interface panel 220 and the front surface of the upright panel 232, and comprises a plastic molding including an upper shell 260A and a lower shell 260B configured for assembly together to define an internal housing chamber 262 therein. The component housing 260 optionally includes a battery compartment 264 for housing one or more DC batteries and/or an AC power adaptor and electrical cord connection to power the toy, and an audio speaker 266 for outputting sound in response to user input and/or from the electronic input-output control system 280. The component housing 260 optionally also includes a plurality of mechanical indicator fingers 270 linked to switches coupled to the electronic input-output control system 280. Differently indexed indicator tabs or cut-outs 272, 272', 272" on the interchangeable song cards 258, 258', 258" interact with different finger(s) 270 when an active card 258 selected by the user is inserted into the play slot 257 of the control panel 250, actuating the switches to signal the electronic input-output control system 280 to play a song corresponding to the active card from the system's onboard digital memory. In example embodiments, the card sensing is accomplished with mechanical switches. In alternative embodiments, capacitive touch technology can optionally be utilized to sense and identify an active song card with an integrated capacitive circuit.

In example embodiments, the electronic input-output control system 280 is preferably mounted in or on the component housing 260. In example embodiments, the input-output system 280 comprises one or more integrated circuits (ICs), one or more printed circuit boards, and associated electronic components, in like manner as the above-described embodiments. In example modes of use of the piano toy 210, a child or other user contacts the user input keys 222 of the user interface panel 220 with their fingers. The capacitive touch sensors 242 beneath the user input keys sense a change of capacitance through the thin portions of the wood user interface panel 220 upon user contact, providing an electronic input signal to the electronic input-output control system 280, which in turn outputs a sound signal to play a sound on the speaker 266. In example embodiments, user contact with each of the user input keys 222 generates a different sound output, for example, a different musical note, corresponding to that key. Optionally, the capacitive touch sensor system 240 senses the force or level of the contact as well as the contact itself, and the electronic input-output control system 280 generates sound outputs of varying volume, pitch or intensity corresponding to the input level. In further embodiments, the electronic input-output control system 280 optionally generates one or more melodies for the user to play along with, and/or generates example melodies for the user to follow or play along with. For example, the user may select a song card 258 corresponding to a desired melody or song to be played. In further embodiments, the electronic input-output control system 280 optionally further comprises access to AI (artificial Intelligence agents via IoT (Internet of Things) devices and services.

Figure 14:
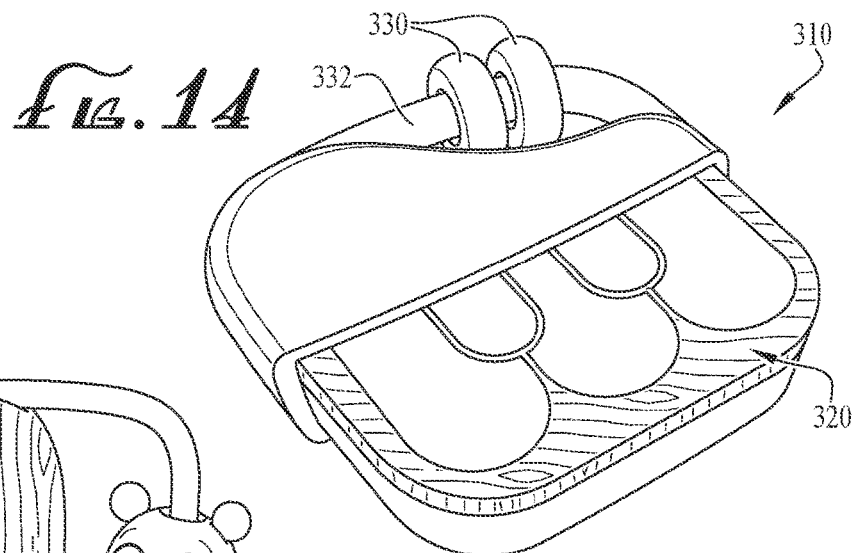
FIG. 14 shows a children's toy with capacitive touch sensor user inputs according to another example embodiment of the present disclosure.
Figure 15A:
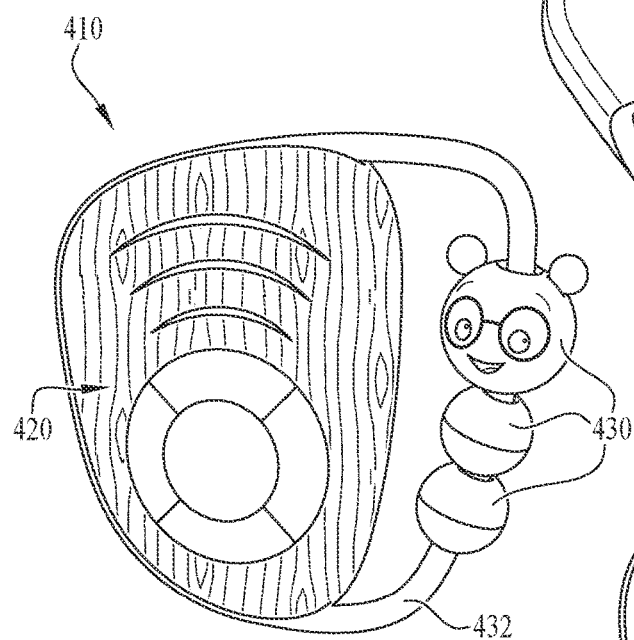
FIGS. 15A, 15B and 15C show children's toys with capacitive touch sensor user inputs according to additional example embodiments of the present disclosure.
Figure 15B:
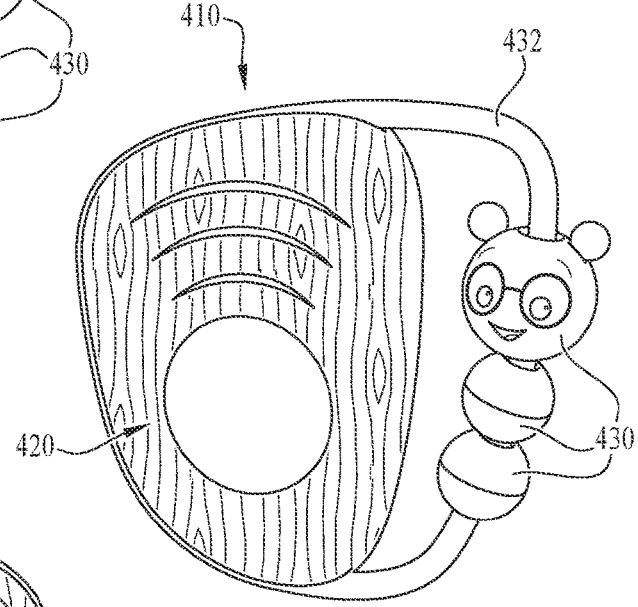
Figure 15C:
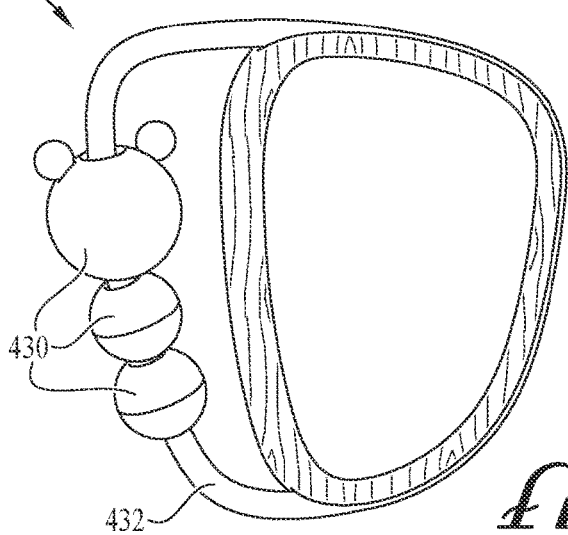

FIGS. 14-15 show additional forms of interactive children's toys according to further example embodiments of the invention. The toy 310 of FIG. 14 includes a user interface panel 320 having five user input keys which operate in connection with internal capacitive touch sensors to generate sound or other output in response to user touch input in substantially similar fashion to the above described embodiments. Additional toy features such as movable elements 330 may be mounted to a handle 332 of the toy. Similarly, the toy 410 of FIGS. 15A-15C also includes a user interface panel 420 having user input keys which operate in connection with internal capacitive touch sensors to generate sound or other output in response to user touch input, and movable character elements 430 mounted to a handle 432 of the toy.

Figure 16A:
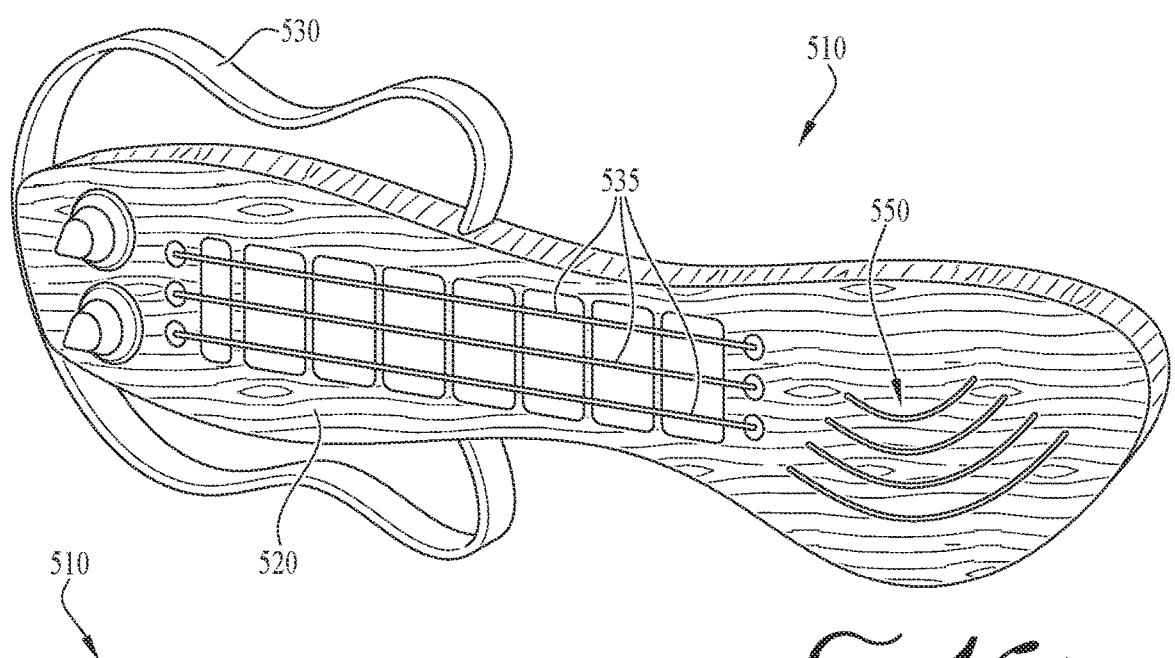
FIGS. 16A, 16B, and 16C show children's toys with capacitive touch sensor user inputs according to additional example embodiments of the present disclosure.
Figure 16B:
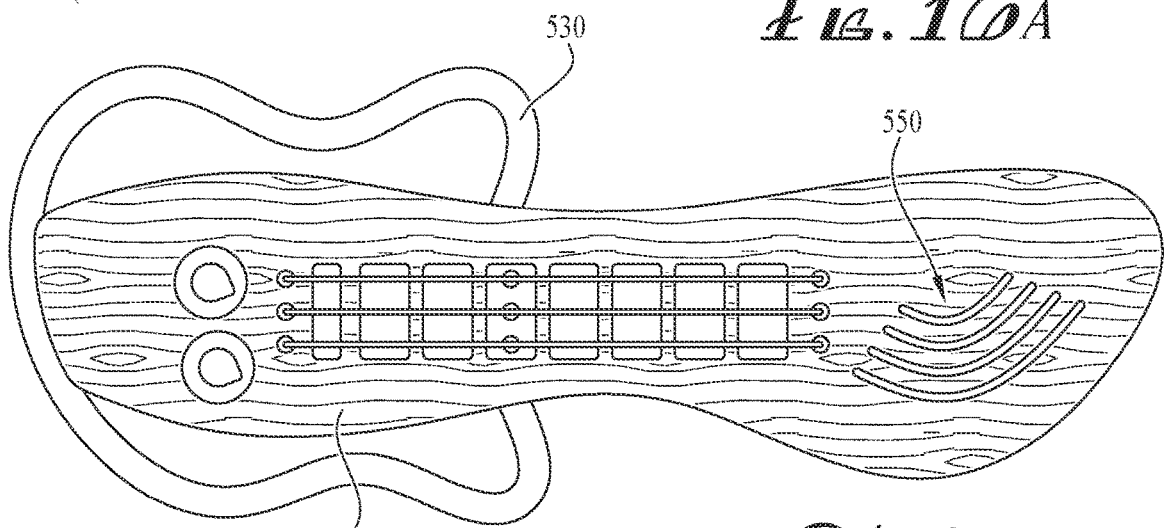
Figure 16C:
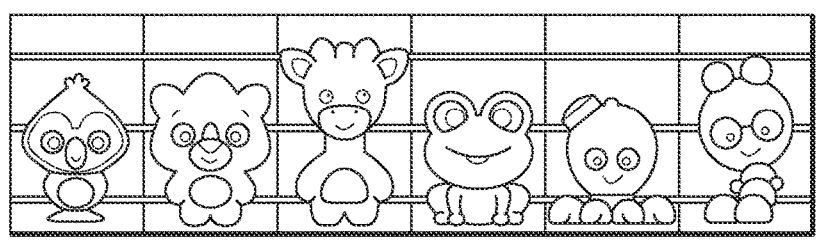

FIG. 16 shows an interactive children's toy guitar 510 according to another example embodiment of the invention. The guitar toy includes a user interface panel 520 in the shape of the guitar's neck and string area, and an outer body frame 530. Actual or simulated strings 535 extend along at least a portion of the user interface panel 520. Simulated frets 522 along the user interface panel define a plurality of user input areas. As shown in FIG. 16C, the simulated fret user inputs 522 may optionally include one or more characters 525 or other markings. Capacitive sensors mounted beneath the simulated fret user inputs 522 sense user touch input and generate sound output from an audio speaker 550, in similar fashion to the above-described embodiments. In example embodiments, one or more of the rectangular pads beneath the strings 535 comprise capacitive touch user interface surfaces, in operative communication with a capacitive sensor within the user interface panel 520 in similar fashion to the above described embodiments. In some embodiments, the strings 535 do not provide capacitive touch sensing in addition to the user interface surfaces. In alternate embodiments, the strings 535 optionally do provide separate or additional capacitive touch sensing.

Figure 18:
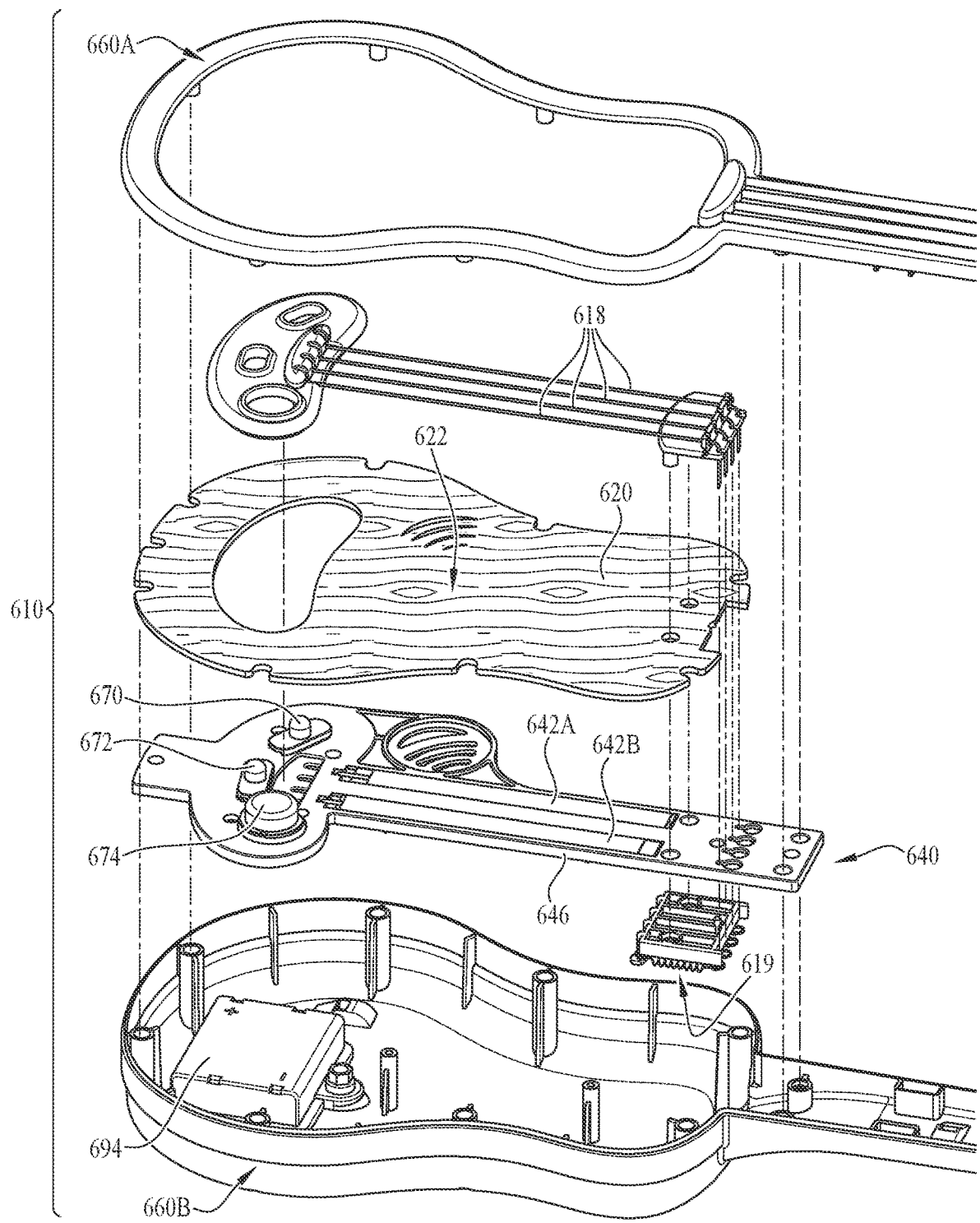
FIG. 18 is an assembly view of the children's ukulele or guitar toy of FIG. 17.
Figure 19:
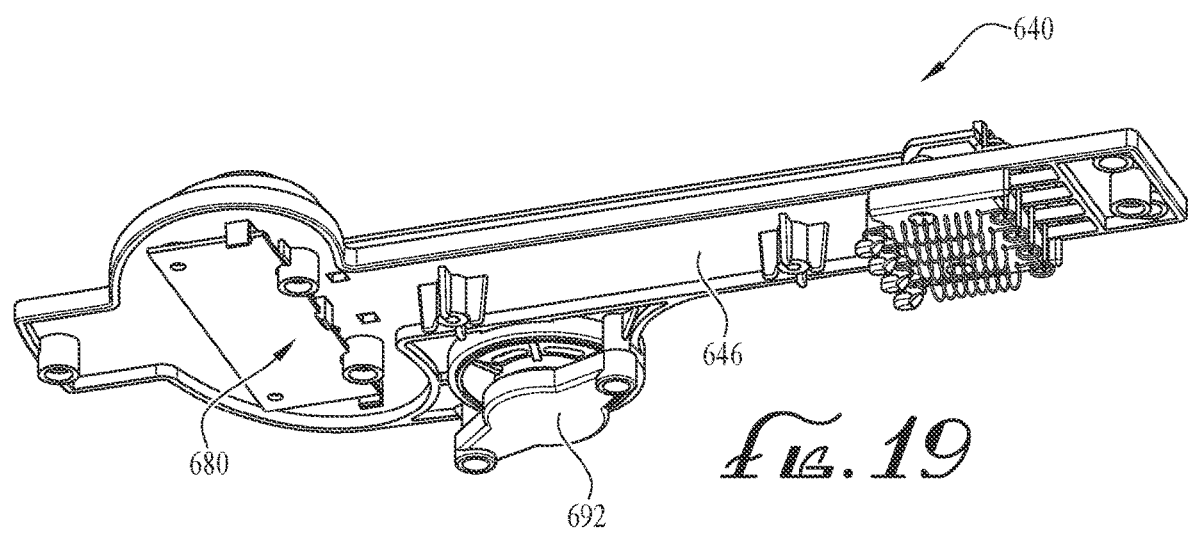
FIG. 19 is a lower perspective view of a capacitive touch sensor and base assembly portion of the children's ukulele or guitar toy of FIG. 17.
Figure 20:
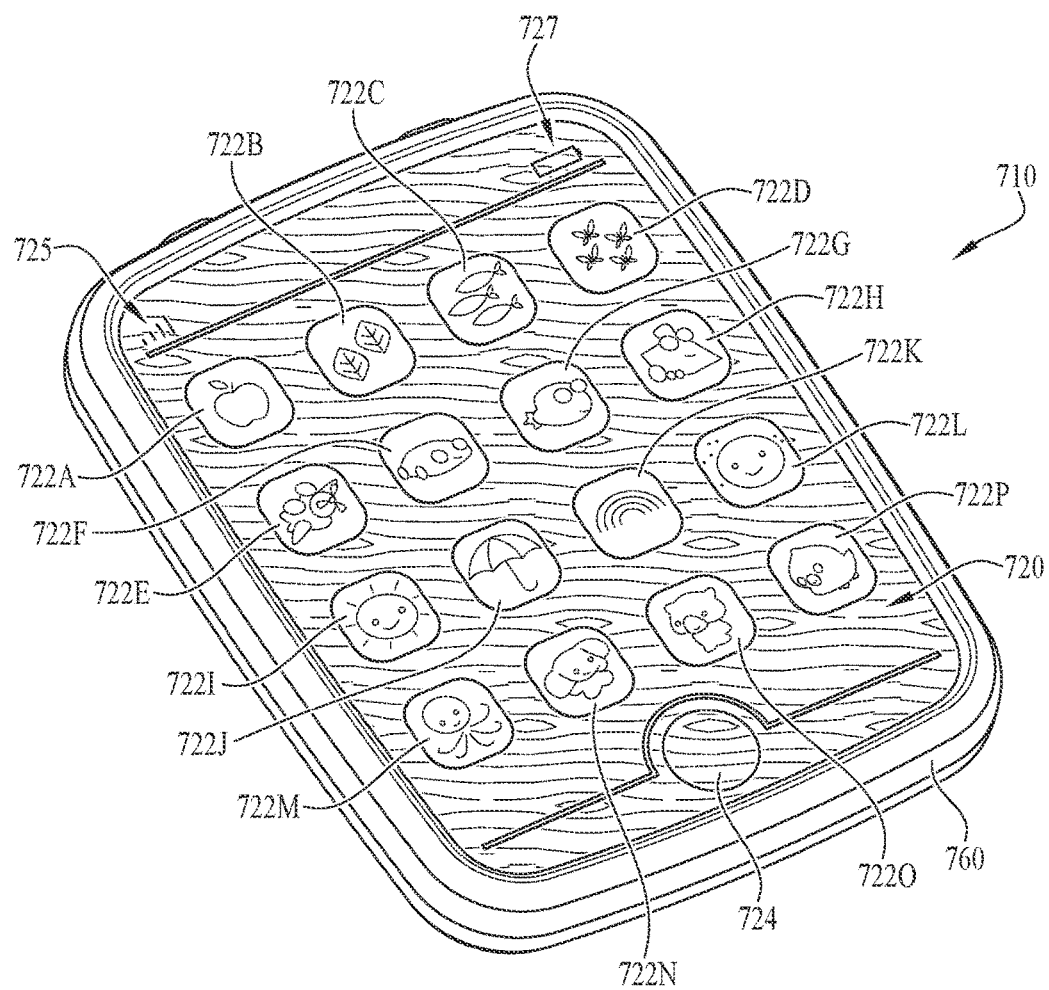
FIG. 20 is a top perspective view of a children's tablet toy with capacitive touch sensor user input features according to another example embodiment of the present disclosure.
Figure 21:
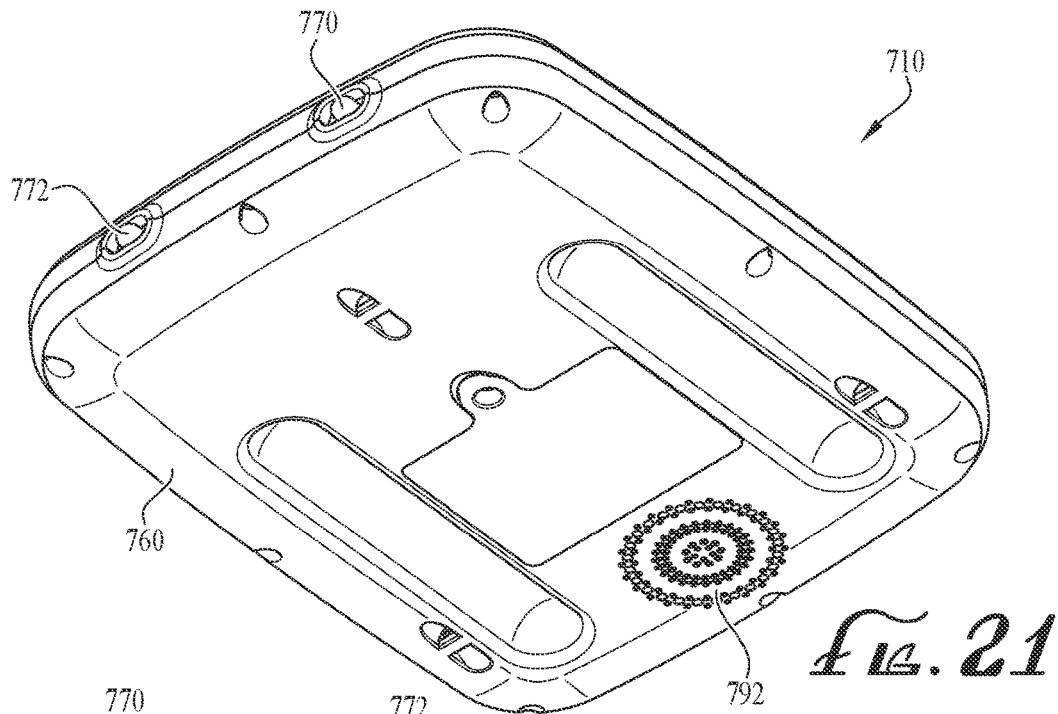
FIG. 21 is a bottom perspective view of the children's tablet toy of FIG. 20.
Figure 22:
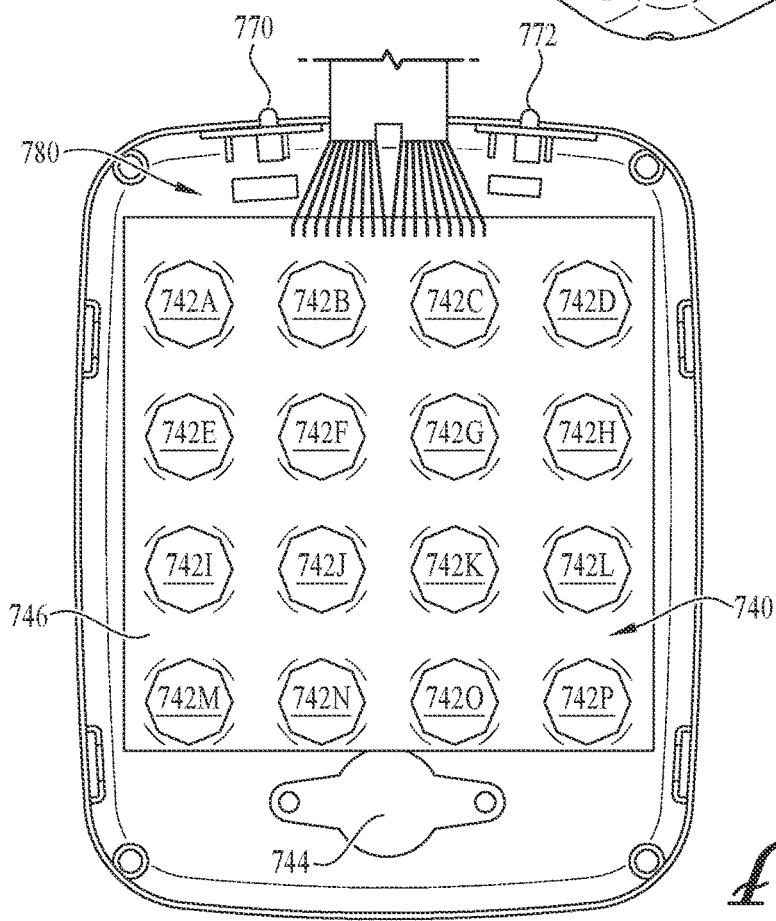
FIG. 22 shows a capacitive touch sensor and electronic circuit board assembly of the children's tablet toy of FIG. 20.
Figure 23:
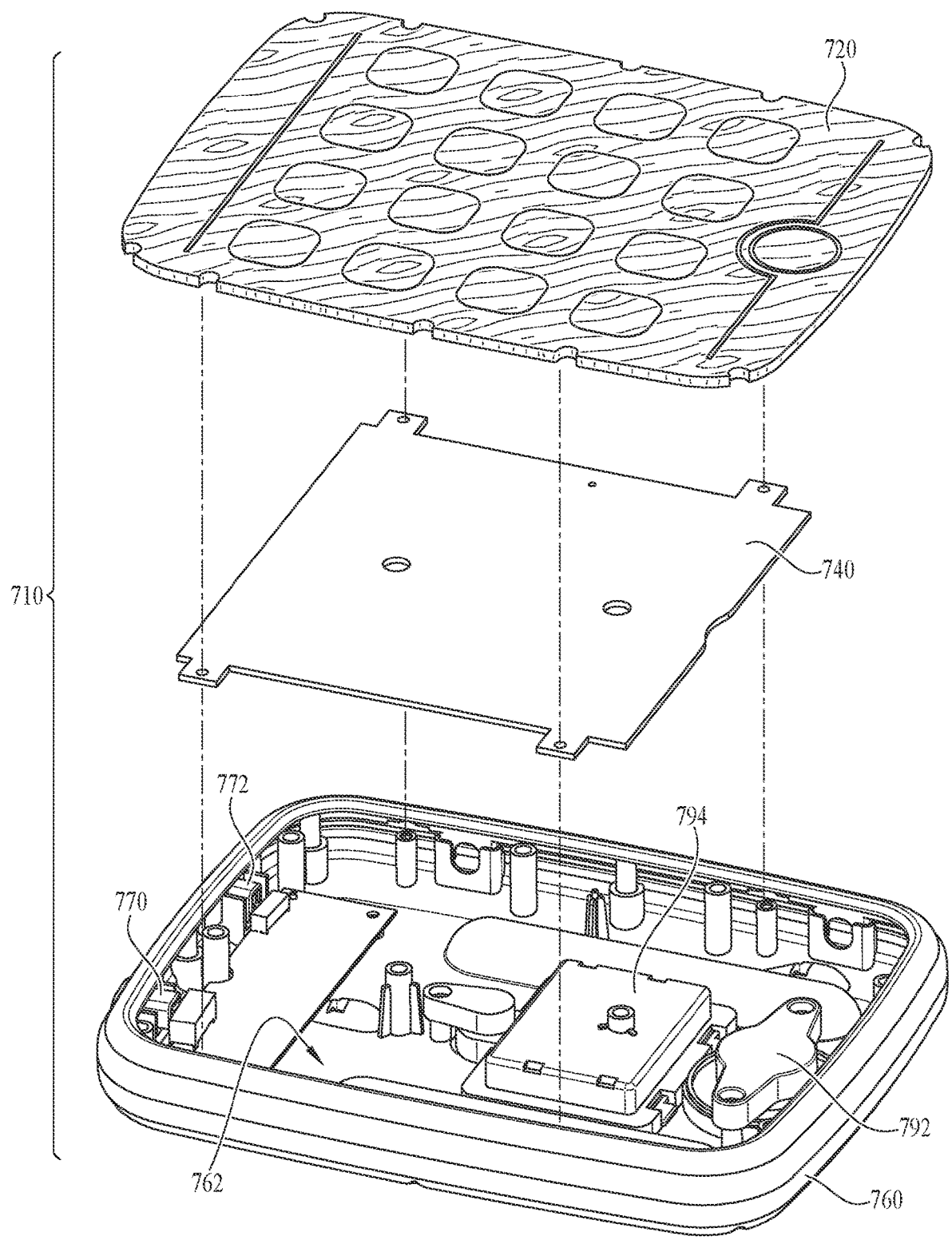
FIG. 23 is an assembly view of the children's tablet toy of FIG. 20.

FIGS. 17-19 show an interactive children's toy ukulele 610 according to another example embodiment of the invention. The ukulele toy 610 generally comprises a body section 612, a neck 614, a head 616, and a plurality of strings 618. The ukulele toy 610 further comprises a user interface cover layer or panel 620, a capacitive touch sensor system 640, a base or housing 660 (formed by an upper shell portion 660A and a lower shell portion 660B), and an electronic input-output control system 680. The user interface panel 620 comprises one or more user input surfaces or areas 622, 622' positioned beneath the strings 618 and/or along the neck 614 of the ukulele toy 610.

In example embodiments, the user interface panel 620 comprises a smooth and continuous seamless exterior user input surface, without significant crevices or recesses in or around the user input areas, where dirt, food residue or other debris might collect. In substantially similar fashion to the above-described embodiments, the user interface panel 620 may comprise a unitary, integral component formed of a capacitive discharge conductive material, such as natural or synthetic wood, fabric, plastic, glass, or other material compatible with electronic capacitive touch sensor systems. In particular example embodiments, the user interface panel comprises a natural organic material such as wood or other plant-based materials. In the depicted example embodiment, the user interface panel 620 comprises a natural wood panel, such as for example a wood veneer panel having a material thickness of between about 1 mm to about 5 mm, more preferably about 2 mm-4 mm, for example about 2.5 mm or about 3 mm thick. One or more openings are optionally provided through the user interface panel 620 aligned with input and/or output components such as an audio speaker and user input controls.

The capacitive touch sensor system 640 comprises one or more capacitive touch sensors 642A, 642B. In example embodiments, the capacitive touch sensors 642A, 642B comprise an electrically conductive material such as, for example a copper or other metallic foil, sheet, strip, panel, button, or other configuration, and are connected by wires or other electrical conductors to the electronic input-output control system 680. In the depicted example embodiment, the capacitive touch sensor system 640 comprises a plastic panel 646, upon which the capacitive touch sensors 642A, 642B and the strings 618 of the ukulele toy are mounted, with a capacitive touch sensor printed circuit board mounted in contact with the underside of the panel 646, and one or more metallic foil or other capacitive touch sensors corresponding to the user input areas 622 of the user interface panel 620.

The electronic input-output control system 680 may also be mounted on the panel 646. In example embodiments, the input-output system 680 comprises one or more integrated circuits (ICs), one or more printed circuit boards, and associated electronic components, in like manner as the above-described embodiments. One or more manual inputs such as switches 670, 672, 674 may be provided in electronic communication with the electronic input-output control system 680, for selective user control of power on/off, volume control, mode switching, melody activation, and/or other features. One or more output features may also be provided in electronic communication with the electronic input-output control system 680, such as an audio speaker 692, lights, vibration transducers, and/or other outputs. The housing 660 optionally further includes a battery compartment 694 for DC batteries to power the toy; and/or an AC power adaptor and electrical cord connection. In example embodiments, one or more springs 619 mounted to the panel 646 keep the strings 618 in tension.

In example modes of use of the ukulele toy 610, capacitive touch sensors under the wood surface detect the child's touch inputs. In a "Guided Play" Mode, the melodies are broken into short fragments (i.e. 1 measure) and sequential inputs to the capacitive touch sensors drive the melody playback fragment-by-fragment, measure-by-measure. Each fragment leads off with a powerful strum and the short duration of the sequences creates the illusion that the infant is playing the Ukulele in a meaningful way. Because any touch will interrupt the playing fragment and immediately play the next fragment in the sequence, the toy remains responsive throughout Guided Play. In a "Free Play" Mode, successive touch inputs sequentially play a defined sequence of strums that make musical sense, thus reducing cacophonous playback. If a melody is already playing, the capacitive touch inputs play a Ukulele chord that aligns with the current key of the playing melody at any given moment, again to reduce cacophony; overlay ukulele sounds are optionally dynamically pitched to match the underlying melody.

FIGS. 20-23 show an interactive children's toy tablet 710 according to another example embodiment of the invention. The tablet 710 generally comprises a user interface cover layer or panel 720, a capacitive touch sensor system 740, a base or housing 760, and an electronic input-output control system 780. The user interface panel 720 comprises one or more, and preferably a plurality of user input surfaces or areas 722A-722P, for example in the form of simulated buttons or icons. In example embodiments, each of the user input surfaces 722A-722P comprises a different character, image, symbol or other indicator. The user interface panel 720 optionally also includes a start button user input area 724 and other features such as a simulated signal strength indicator 725, a simulated battery strength indicator 727, and/or other features configured to present the appearance of an actual electronic computer tablet device. In example embodiments, the user interface panel 720 comprises a smooth and continuous seamless exterior user input surface, without significant crevices or recesses in or around the user input areas, where dirt, food residue or other debris might collect. In substantially similar fashion to the above-described embodiments, the user interface panel 720 may comprise a unitary, integral component formed of a capacitive discharge conductive material, such as natural or synthetic wood, fabric, plastic, glass, or other material compatible with electronic capacitive touch sensor systems. In particular example embodiments, the user interface panel comprises a natural organic material such as wood or other plant-based materials. In the depicted example embodiment, the user interface panel 720 comprises a natural wood panel, such as for example a wood veneer panel having a material thickness of between about 1 mm to about 5 mm, more preferably about 2 mm-4 mm, for example about 2.5 mm or about 3 mm thick.

The capacitive touch sensor system 740 comprises one or more, and preferably a plurality of capacitive touch sensors 742A-742P, corresponding to and aligned beneath respective user input surfaces 722A-722P. Optionally, an additional capacitive touch sensor 744 is provided, aligned beneath the start button user input area 724. In example embodiments, the capacitive touch sensors 742, 744 comprise an electrically conductive material such as, for example a copper or other metallic foil, sheet, strip, panel, button, or other configuration, and are connected by wires or other electrical conductors to the electronic input-output control system 780. In the depicted example embodiment, the capacitive touch sensor system 740 comprises a printed circuit board 746 incorporating the capacitive touch sensors 742, 744 and associated electronic components and capacitive touch sensor circuitry. In some example embodiments, the capacitive touch sensor system may further comprise Mylar® circuits and/or wires.

In example embodiments, the base or housing 760 comprises a plastic molding having an internal housing chamber 762 therein. The base 760 optionally further includes one or more manual inputs such as switches 770, 772 in electronic communication with the electronic input-output control system 780, for selective user control of power on/off, volume control, mode switching, language selection, melody activation, and/or other features. The base 760 optionally further includes one or more output features in electronic communication with the electronic input-output control system 780, such as an audio speaker 792, lights, vibration transducers, and/or other outputs. The base 760 optionally further includes a battery compartment 794 for DC batteries to power the toy; and/or an AC power adaptor and electrical cord connection.

The electronic input-output control system 780 is preferably mounted in or on the base or housing 760. In example embodiments, the input-output system 780 comprises one or more integrated circuits (ICs), one or more printed circuit boards, and associated electronic components, in like manner as the above-described embodiments. In example modes of use of the tablet toy 710, a child or other user contacts the user input icons 722 of the user interface panel 720 with their fingers or with a conductive stylus. The capacitive touch sensors 742 beneath the user input keys sense a change in capacitance through the thin portions of the wood user interface panel 720 upon user contact, providing an electronic input signal to the electronic input-output control system 780, which in turn outputs a sound or other output signal to play a voice or other sound on the speaker 792 and/or to activate one or more other output features. In example embodiments, user contact with each of the user input icons 722A-722P generates a different output. In further embodiments, the electronic input-output control system 780 optionally generates one or more queries or instructions to prompt the user to contact a specified user input icon 722, which in turn generates a predetermined response for interactive feedback with the user. For example, the system may prompt a user to touch the icon showing an apple, and upon sensing user input contact with the apple icon may generate a confirmatory response (or may generate a corrective response indicating an incorrect user input contact with a different icon). Alternatively or additionally, a user-directed mode of use may allow the user to contact any icon, and generate a system response identifying that particular icon or a characteristic associated with that icon.

Figure 24:
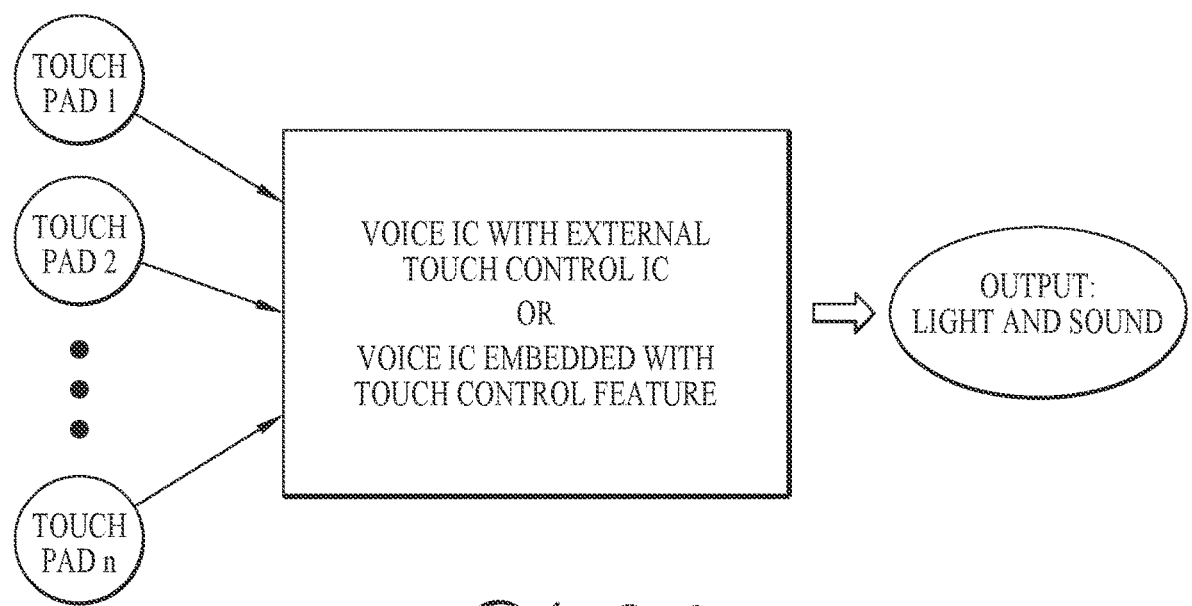
FIG. 24 is a schematic diagram showing user inputs, touch control and sound output integrated circuit electronic processors, and output feature(s) of a device or apparatus according to an example embodiment of the present disclosure.

FIG. 24 shows a block diagram of a user input system according to an example embodiment of the present disclosure. One or more user input points, such as touch pads 1-*n* provide user input to a touch control integrated circuit. In example embodiments, the touch control integrated circuit may be selected from, without limitation, any IC with embedded touch feature, such as for example, Nyqest NY9T series, Sonix SNC86 series, General Plus GPCD9T or GPCD9TC series integrated circuits, a voice IC, and/or an audio or sound processor. The touch control integrated circuit then signals a separate or integrated voice/melody integrated circuit or audio or sound processor to generate an output responsive to the particular user input received. The output optionally prompts additional input from the user for repeated interactive play, entertainment, and/or educational purposes. In example embodiments, the capacitive touch ("cap-touch") functionality can optionally be provided by an integrated cap-touch and sound processor IC, or by a dedicated cap-touch controller IC, for example using a single printed circuit board (PCB), copper foil, carbon, and/or other conductive components and/or material(s), etc. Optionally, the IC or processor can provide light, sound, motorized activation, magnetic activation, camera, microphone, recording, projection, etc. features in response to receiving a capacitive touch (cap-touch) signal based on user input.

Figure 25:
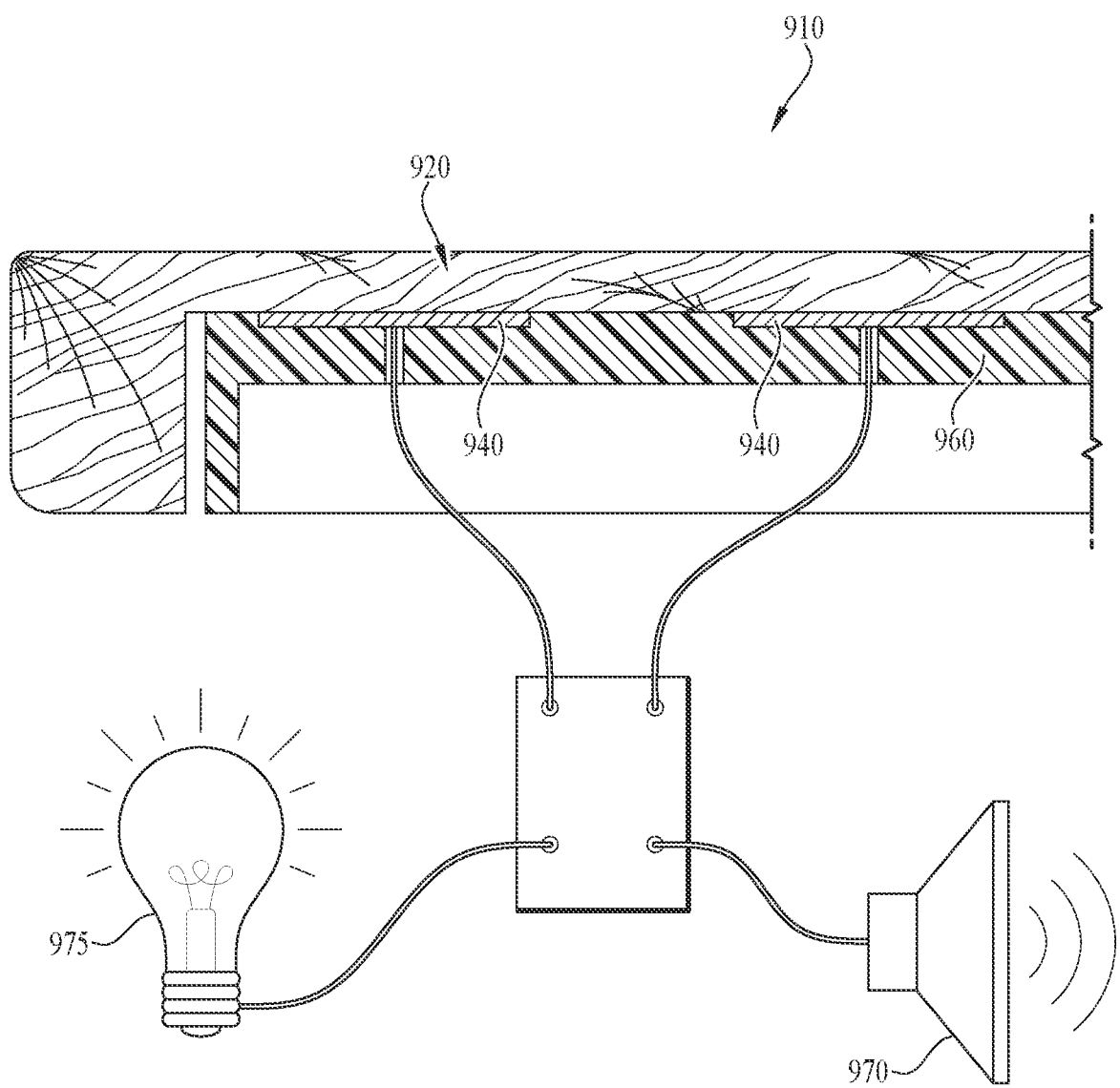
FIG. 25 is a partial cross-sectional view schematically showing a device or apparatus having a wood cover panel user input surface overlying capacitive touch input sensors, in electronic communication with an electronic processer coupled to output devices, according to an example embodiment of the present disclosure.
Figure 26A:
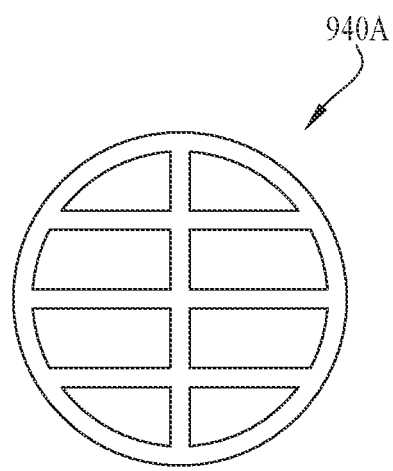
FIGS. 26A, 26B, 26C and 26D show different capacitive touch sensor formats according to example embodiments of the present disclosure.
Figure 26B:
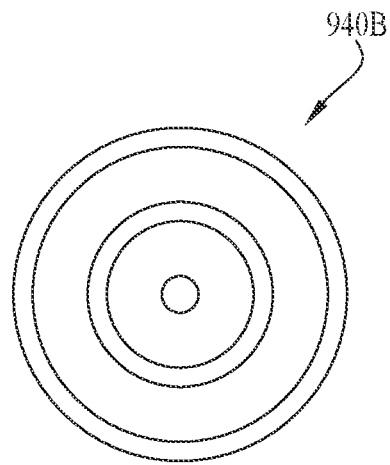
Figure 26C:
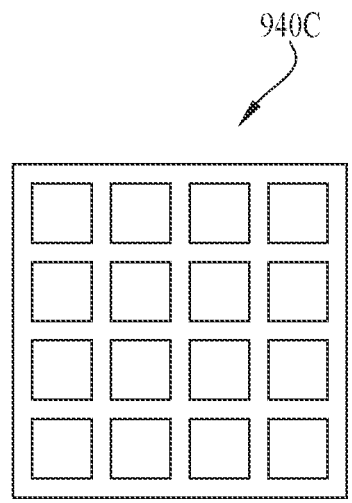
Figure 26D:
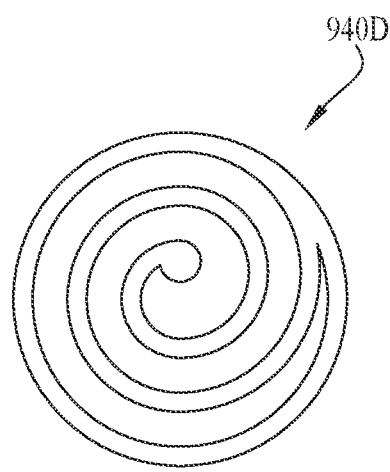

In various example embodiments, and with reference to the general schematic diagram of FIG. 25, a capacitive touch device 910 includes an overlay layer 920, a sensor layer 940 beneath the bottom surface of the overlay layer, and optionally a base 960 supporting the sensor layer. In alternate embodiments, the sensor layer may be integrated into the base. One or more of the overlay layer, sensor layer, and base layer can be manufactured from a flexible substrate, enabling the capacitive touch device to be installed in various arrangements tailored to the shape of the device in which the capacitive touch device 910 is implemented. In example embodiments, the overlay layer 920 is formed from a capacitive touch conductive organic material such as wood. The wood overlay layer can be shaped and ornamented to resemble a musical instrument or other device. The top surface of the overlay layer may receive a user input (e.g., a touch, swipe, or other contact). The user input can be made by contact with skin, such as a finger touch, or contact with an implement or tool of capacitive touch conductive material, such as a conductive silicone or acrylonitrile butadiene styrene (ABS). The top surface of the overlay layer can be painted or otherwise styled to indicate one or more user touch input areas. In example embodiments, the wood overlay layer material is moisture-controlled for neutral capacitance so as to not trigger the sensors unintentionally. The thickness of the wood overlay layer is selected to ensure the underlying sensor layer beneath the overlay layer will be triggered through the overlay layer upon user contact with the user touch input areas on the top surface of the overlay layer. In alternate embodiments, the overlay layer can include glass, plastic, or another capacitive touch conductive material, which has a rigidity sufficient to protect the underlying sensor layer from damage due to repeated use cycles. Alternatively or additionally, the overlay layer can comprise a natural or synthetic fabric covering, such as for example a cotton, canvas, wool, nylon or other woven or non-woven fabric or sheet material.

The sensor layer 940 includes one or more capacitive touch sensors, which generate a sensor signal based on and responsive to the user input. The sensor signal can optionally include an indication of a location at which the user input was received by the overlay layer. The sensor signal can correspond to a change in capacitance of the sensor layer (or electrical components thereof) resulting from the user input. The sensor layer can generate the sensor signal based on capacitive coupling between the object contacting the overlay layer and the sensor layer. The sensor layer can generate the sensor signal using surface capacitance or projected capacitance. The sensor layer can include a conductor which acts as a capacitive layer. Example conductors include copper foil, polychlorinated biphenyl (PCB), and indium tinoxide (ITO). In other embodiments, other conductors can be used. The sensor layer can include a plurality of capacitive layers (which may be separated by corresponding insulating layers). The capacitive sensors can be provided in a variety of configurations including linear, grid, spiral, or radial, as shown in example embodiments 940A-940D in FIGS. 26A-26D. The sensor layer may optionally comprise one or more compressible layers or strata, whereby user input pressing harder or further into the material is sensed and processed to generate different types or levels of system output responsive to the type or level of user input. In some example embodiments, the sensor layer may further comprise Mylar® circuits and/or wires.

The base layer 960 serves as a mount for the sensor layer and the overlay layer. Generally, the sensor layer is mounted to a top surface of the base layer. The overlay layer is mounted to the base layer such that the bottom surface of the overlay layer contacts the sensor layer. The base layer can be formed of a conductive material such as for example conductive plastic (e.g., including conductive additives and/or fillers). Example conductive plastics may be made from polyethylene, polyurethane, and/or polypropylene. The base layer can also house one or more output devices such as a speaker or other audio device 970 that produces sound, and/or a light or other visually perceptible output device 975 based on inputs from the sensor layer. The base layer can also house a control circuit described below.

In example embodiments, the capacitive touch device includes an electronic control circuit or system 980. The control system 980 can include a processor and memory. The processor may be implemented as a specific purpose processor, an application specific integrated circuit (ASIC), one or more field programmable gate arrays (FPGAs), a group of processing components, or other suitable electronic processing components. The memory may comprise one or more devices (e.g., RAM, ROM, flash memory, hard disk storage) for storing data and computer software code for completing and facilitating the various user or client processes, layers, and modules described in the present disclosure. The memory may be or include volatile memory or non-volatile memory and may include database components, object code components, script components, or any other type of information structure for supporting the various activities and information structures of the inventive concepts disclosed herein. The memory is communicably connected to the processor and includes computer code or instruction modules for executing one or more processes described herein. The memory optionally includes various circuits, software engines, and/or modules that cause the processor to execute the systems and methods described herein, including controlling operation of output devices as described herein. The control circuit or system can control operation of the output device. For example, the control circuit or system can output a signal to the speaker to play a sound based on a particular area of the sensor layer being triggered. The control circuit or system can include a sound database. The control circuit or system can receive the sounds to be played from a remote source (e.g., via communications electronics such as Bluetooth®, Bluetooth® Low Energy, and/or other radio protocols). The control circuit or system can cause a visual output to display icons, animations, or other visual indicators corresponding to commands to be received by the capacitive touch device. The control circuit or system receives a sensor signal from the sensor layer. The control circuit or system can extract a location of the user input from the sensor signal. For example, the sensor signal may include the location of the user input (e.g., a two-dimensional coordinate location corresponding to the surface of the overlay layer). The control circuit or system can determine the location of the user input based on the sensor signal; for example, the sensor signal may include one or more voltage values which the control circuit can use to retrieve the location of the user input from a database (e.g., lookup table stored in a database) mapping voltage values to user input locations. The control circuit or system can determine a command indicated by the user input based on the location of the user input. For example, the control circuit or system can perform a lookup in a command database based on the location of the user input to determine the command. The control circuit or system can control operation of the output devices based on the command. In example embodiments, the toys can include adjustment knobs, pedals, and/or other operable actuators for adjusting volume, pitch, tempo, and/or other musical or rhythmic elements. The toys can also include lighted displays. The lighted displays can be activated to guide the child through a series of notes.

The control system optionally generates one or more output modes. For example, a startup mode may be initiated upon switching the device on, generating a sound output such as a wake-up melody or a voice greeting. One or more operational modes may be activated by actuation of a switch or by a sequence of one or more user input contacts upon the overlay panel to trigger the capacitive touch sensors. For example, the control system may generate a play-along mode which activates one or more system-generated melodies or songs, which the user can play along with or accompany by one or more user input contacts upon the overlay panel to trigger the capacitive touch sensors to play user-generated sounds and/or generate light outputs along with the system-generated melodies or songs. The control system may also generate a free-play mode, in which the user generates melodies, songs or other output based on one or more user input contacts upon the overlay panel. The control system may also generate a user-prompting mode, wherein after a predetermined period (for example 10 or 15 seconds) of inactivity, a sound or visual output is generated to catch the user's attention. The control system may also generate an indexed play mode, wherein the system sequentially indexes through a playlist or series of songs or melodies, based on a system-initiated and/or user-initiated sequence. The control system may also generate a shutdown mode based on user inactivity and/or switching the device off, generating a shut-down melody or voice farewell. The system may also include one or more language databases, and allow user selection of the operational language, for example to switch between English, Spanish, Chinese, and/or other languages. The system optionally also includes recordable memory, allowing a user to record their activity, for example a sound recording of music and/or voice, and to selectively play back the recording. In further embodiments, the system may connect or interface with one or more external databases, artificial intelligence (AI) engines, the Internet, or other sources of information, to relate user input to relevant system output and/or to prompt additional user input. The system optionally also may include one or more wired or wireless (e.g., Bluetooth, Wi-Fi, cellular, IR, RF, etc.) communication systems, allowing the system to communicate with one or more external devices. For example, one user may play on a toy drum device according to an example embodiment of the present disclosure, while another user plays on a toy guitar device according to an example embodiment of the present disclosure, and another user plays on a toy piano device according to an example embodiment of the present disclosure, either in the same or remote locations, and the devices communicate with one another to coordinate multiple users' inputs and generate a combined multi-user output.

In example embodiments, the system of the present disclosure can be implemented in any of a variety of particular applications, in the form of different devices, systems and apparatus, enabling various modes and methods of use. For example, the system can be configured in the form of a children's toy, to resemble a range of devices such as musical instruments including a xylophone, a piano, a shaker or speaker, a guitar or ukulele, or other instrument, to generate musical sounds and/or other output. In other embodiments, the system may be configured in the form of a tablet or laptop computer, with sensor inputs generating voice, audio and/or visual outputs. The provision of a natural or simulated wood user input panel or surface may induce a perception of higher quality or improved performance among potential consumers, in comparison to products incorporating plastic or other synthetic user interface materials. In addition, the provision of a substantially continuous seamless exterior user input or interface surface, without significant crevices or recesses in or around the user input areas, prevents the accumulation of dirt, food residue or other debris, facilitates easy cleanup, and reduces the potential for debris to interfere with the product's operation. In alternative example embodiments, the provision of a wood user interface surface allows capacitive touch sensors to be incorporated into a variety of other product formats, within the scope of the present disclosure. For example, a desk, table, chair, workstation or other apparatus may comprise a wood work surface overlaying one or more capacitive touch sensors, and can function as a user interface with a computer, television, display screen, light source, audio device, or other output device, allowing the user to selectively control operation of the output device by contact with the wood user interface or user input surface. Similarly, a flooring panel or board may incorporate a wood contact surface overlaying one or more capacitive touch sensors in communication with a computer or other electronic control system, allowing the flooring material to identify the presence of one or more persons walking over an area and serving as an alarm system, personnel monitor, foot traffic counter, presence sensor, etc. In similar fashion, a customer display or informational sign may incorporate a wood display surface overlaying one or more capacitive touch sensors, and can function as an interactive customer display or informational sign.

Figure 27:
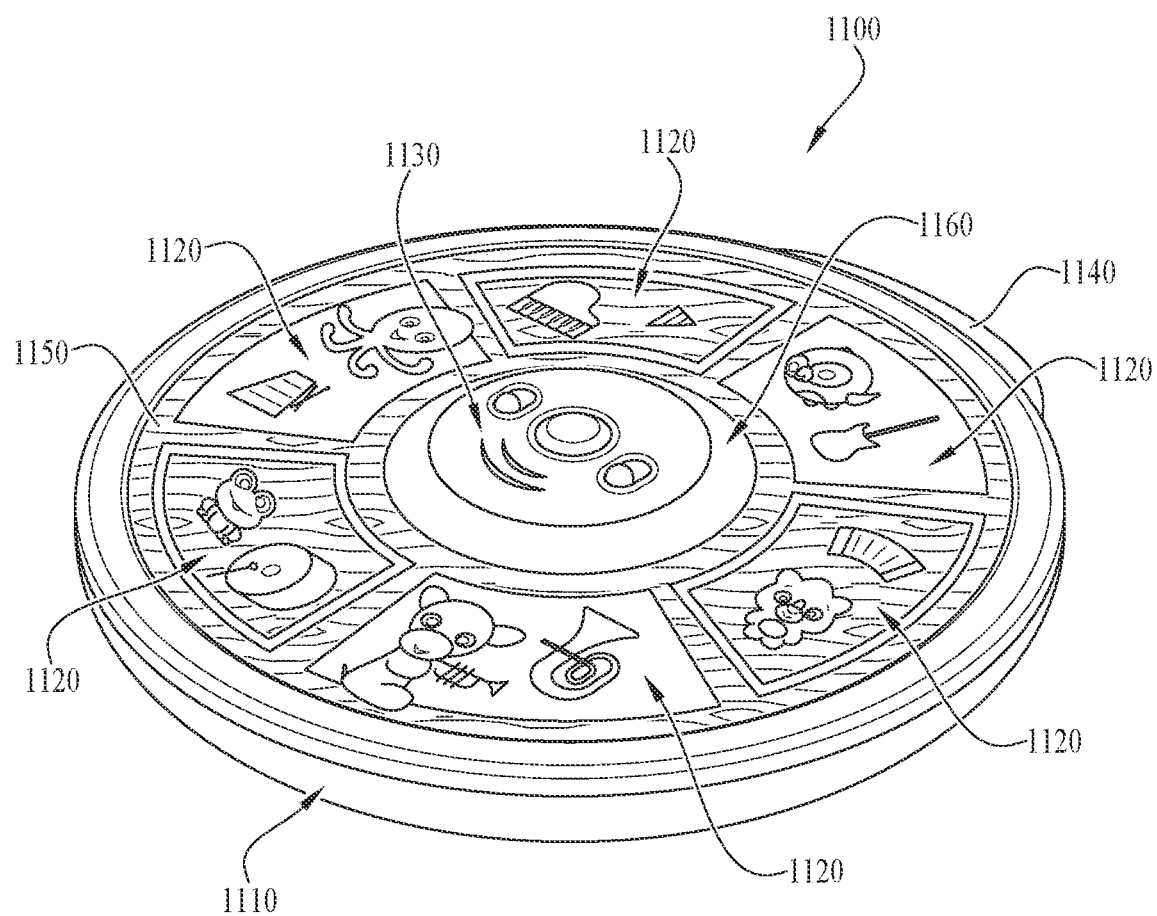
FIG. 27 shows a children's orchestra toy with capacitive touch features according to another example embodiment of the present disclosure.

FIG. 27 shows a children's orchestra toy 1100 with capacitive touch features according to another example embodiment. In example embodiments, the orchestra toy 1100 may include a circular body 1110, one or more (six are depicted) capacitive touch pads 1120 ("cap touch" or "cap pads"), a speaker or other audio input/output 1130, one or more batteries or other power source, and optionally a carrying or gripping handle 1140, and is positioned as a baby toy. A natural or synthetic wood veneer or other continuous seamless cover panel or touch surface 1150 may be painted, printed or otherwise marked to indicate the cap pad locations. In the depicted embodiment, the cover panel defines an annular panel surrounding a central hub 1160 with switches and controls, and a speaker 1130. Each cap touch pad 1120 optionally has a corresponding LED light source or other visual indicator. User interaction by touching a selected capacitive touch pad initiates an audio playback of sound over the speaker 1130, optionally corresponding to an image or other indicator on or near the selected touch pad, for example corresponding to the sound of a musical instrument, an animal, and/or other displayed item or object. The device may include one or more operational modes, for example including "Freestyle" and "Silly Play." In example modes of use, touching any capacitive touch sensing input area ("cap pad") initiates a melody riff, voice content or SFX, depending on mode and all supported by LED flashes. The center button or actuator typically activates a one of several backer genre melodies, although it activates the "Spin function" (or "quiz function") in Silly Play mode.

Example components of the orchestra toy 1100 may include:
Sonix SNC 86320B Sound Processor (16 channel).
1×NY9T008A for capacitive touch feature.
PCBs and discreet components as required.
3 position slide switch for Power-Volume Control (may be on the top of the toy).
3 position slide switch for Mode Control Freestyle/Explorer/Composer or Learn Mode.
1×Rubber Key for actuator button.
6×Cap Touch Pads for Loop/Channel triggers (PET, Mylar, Foil, PCB).
6×SB LEDs for Touch Pad visual feedback (e.g., Blue, Violet, Red, Orange, Yellow, Pure Green).
40 mm HQ Speaker in approx. 300-400 ml sealed or semi-sealed enclosure.
Contacts for 3×AA battery.
3×AA battery for Try-Me.

In "Freestyle" mode, pressing the center button activates a basic backer beat (percussive, and probably MIDI) in a specific genre—hip hop, rock, jazz, pop, world, etc. Each of the six cap touch graphics, when touched, overlays a genre-appropriate musical motif on top of the beat and the touched pad's corresponding LED flashes with the overlay for visual feedback. Most of the overlays are short instrumental loops (could be .wav or a sample) that support the underlying beat theme, but some pads may unmute a MIDI channel. When touched again, they may change the MIDI channel to something else, as opposed to muting the channel. Each backer beat theme optionally has a corresponding array of unique overlays. Pressing the center button again activates a new genre backbeat and all of the loop/MIDI overlays change to align with the theme of that particular backer beat. Loop overlays are the same for each character for each backer beat, or alternatively may be playlisted for depth. In "See N Say" mode, the center button press activates a "virtual spin" of the circular LED array, accompanied by SFX. When the "spinning" LED's stop, voice content and supporting sounds specific to the associated graphic pad will play. Touching the graphics over the cap pads will play similar content directly. Call outs may describe/reinforce a specific content suite (Animals!, Instruments!, etc.) on each spin. In "Silly" Mode, silly sounds supporting the graphics play when the cap pads are touched. This may optionally be extended to a Silly Composer mode, similar to Freestyle mode or even a traditional Composer Mode. Backing melody can be activated by the center button and may be nursery themed and supported with flashing LEDs.

FIGS. 28A and 28B show example embodiments of a children's guitar toy 1200, 1250 with capacitive touch features according to another example embodiment. The guitar may include simulated body 1210, 1210', neck 1212, 1212', head 1214, 1214', string 1216, 1216' and fret 1218, 1218' portions. In example embodiments the toy includes "magic strum" technology where different styles of playing produce different guitar sounds. In example embodiments the guitar toy has one or more (for example two) capacitive touch string trigger touch pads 1220, 1220' activating either bass or multi-string strums, and the direction and cadence of strumming may simulate different playing techniques (i.e. power chords, arpeggio, etc.). In example embodiments, the guitar includes one or more (for example, four or five) capacitive touch fret trigger touch pads 1222, 1222', each with an associated LED 1224, 1224', providing unique functions in each mode and broadly producing chord effects. User interaction by touching a selected capacitive touch pad initiates an audio playback of sound over the speaker 1230, 1230', optionally corresponding to the sound of a guitar or other stringed instrument being played. The fret trigger LEDs may visually prompt, support or correspond with any played melody/sounds, for example to indicate which keys to touch during guided play. The guitar toys 1200, 1250 preferably include a natural or synthetic wood veneer or other continuous seamless cover panel or touch surface 1240, 1240' overlying the neck, fret, string and/or other portions, which may be painted, printed or otherwise marked to indicate the capacitive touch locations. A whammy bar 1244, 1244' is optionally included and activates unique and iconic guitar sounds that play discreetly or overlay ongoing sounds. Example embodiments include one or more play modes, and in particular examples has three modes, including "Free Play," "Guided Play Mode" and "Sound Mode."

Example components of the guitar toy 1200, 1250 may include:
Sonix SNC86320A Sound Processor.
1×NY9T008A.
PCBs and discreet components as required.
3 position slide switch for Power-Volume Control.
3 position slide switch for Mode Control for Free Play, Guided Play or Sound Mode.
1×Rubber Key for Melody Button.
2×Cap Touch Pads for String triggers (PET, Mylar, Foil, PCB).
4×Cap Touch Pads for Chord triggers (PET, Mylar, Foil, PCB).
1 Mechanical key for Whammy Bar.
4 SB LEDs supporting Fret triggers (e.g., Red, Orange, Pure Green, Blue).
40 mm HQ Speaker in a 350 ml sealed enclosure.
Contacts for 3×AA battery.
3×AA Battery for Try-Me.

In Free Play mode, sounds played by the guitar 1200, 1250 vary depending on how it is played. In example embodiments, sounds played will integrate with a backer melody when activated by the actuator button. In example embodiments, there are two string triggers, with the upper trigger playing a bass note and the lower trigger the massed strum sound allowing variability when playing; down and up-strumming will produce different sounds, and the user can noodle either trigger to hear bass or strum/treble and a fast downward stroke will play a power chord. In example embodiments, normally, all sounds are in the key of G, but touching the fret triggers while strumming can change the played key to D, C, or E. Alternately, the fret keys can overlay different guitar styles loops when no backer melody is playing—Blues slide guitar, Rock arpeggio riffs, Van Halen tapping technique, whammy bar tremolo etc. In example embodiments, the whammy bar adds additional guitar effect overlays to the overall mix. In Guided Play Mode strumming will initiate a simple backer (autoplay) and the LEDs indicate which Fret keys to touch to create a melodic composition. If a backer melody is activated, the guitar will indicate via LED which chords to touch and when, to promote the appearance that the user is playing guitar. If an incorrect chord is touched, the IC can immediately adjust key to play in-key with the backer melody. In example embodiments, the backer melodies run 20-30 seconds and are realized in different styles. The played guitar sound could also vary with each melody—electric, acoustic, banjo, etc. Sound Mode (optional) is intended for the youngest infants, where the two string triggers are bonded together into a single trigger that activates simple backing instrumentation and the fret triggers overlay different instrument loops. This approach is fundamentally different from un-muting pre-composed guitar MIDI tracks within the backer melody and should provide enhanced free form play. The blue actuator button can still play/index through simpler backers with fewer instruments and can attempt to match key by pitching the overlays. The intent is to make it very easy to play and achieve harmonious output.

Figures 29A, 29B:
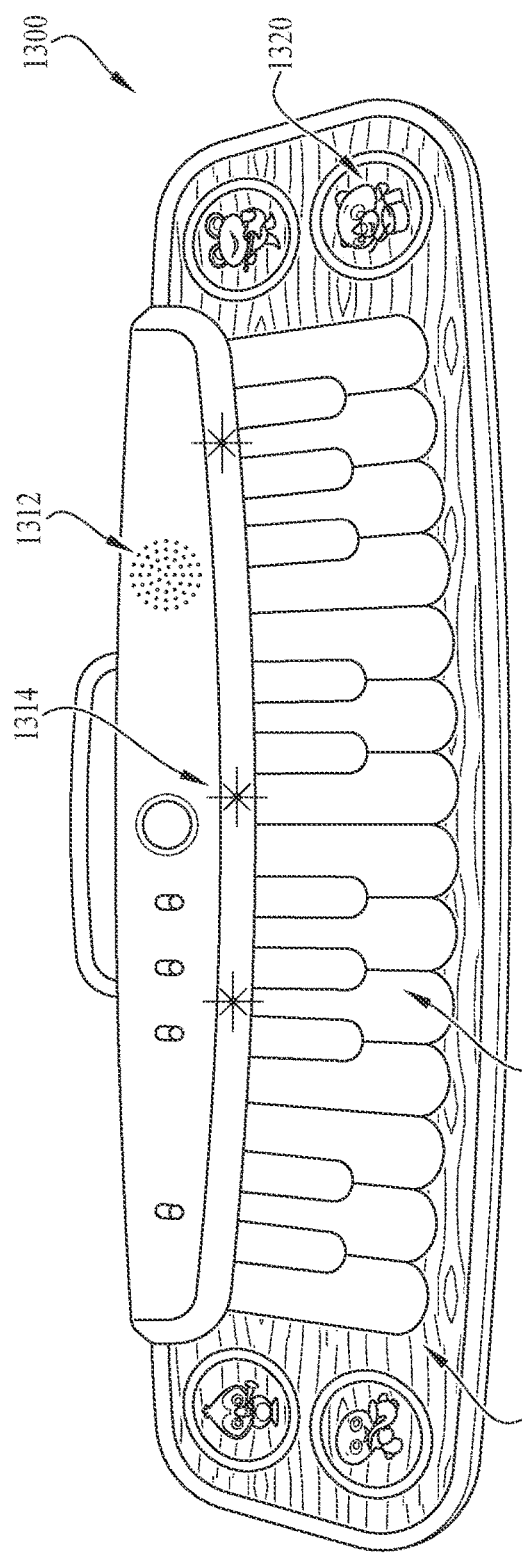
FIGS. 29A and 29B show example embodiments of a children's toy keyboard with capacitive touch features according to the present disclosure.

FIGS. 29A and 29B show example embodiments of children's keyboard toys 1300, 1350, with capacitive touch features. In example embodiments the keyboard toy includes a larger simulated 2-octave piano keyboard 1310, 1310' with one or more play modes, for example three modes: "Freeform Play," "Guided Play" and "Silly Play." User interaction by touching a selected capacitive touch pad on the keyboard initiates audio playback of sound over the speaker 1312, 1312', optionally corresponding to the sound of a piano or other keyboard instrument being played. In example embodiments, the piano 1300, 1350 may have capacitive touch pads corresponding to 14 major keys but optionally no minor keys, and each major key is supported by an adjacent LED 1314, 1314'. One or more (four are shown) character icons 1320, 1320' on either side of the keyboard are cap touch enabled and change the instrument voice or promote a specific music construct in Guided Play Mode. A Play Assist feature may auto correct off-key inputs when the infant is playing along with a backer melody. A natural or synthetic wood veneer or other continuous seamless cover panel or touch surface 1330, 1330' may be painted, printed or otherwise marked in a simulated piano keyboard pattern to indicate key positions corresponding to capacitive touch pad locations.

Example components of keyboard toys 1300, 1350 may include:
1 Sonix SNC8600B series −16 channel part for full polyphony
Sonix SNC8600C series −24 channel part (optionally) for full polyphony playing over a complex musical backer (Musical IQ).
External Flash memory (16 Mbit for example).
N55P242 I/O Extender to drive the 14 LEDs.
Capacitive Touch Controllers:
1×NY9T016A
2×NY9T004A
PCBs and discreet components as required.
3 position slide switch for Power-Volume Control.

3 position slide switch for Mode Control for Free Play, Guided Play and Silly Play.

2 position slide switch for Play Assist mode.

1×Rubber Key for Blue Melody Button.

4×circular Capacitive Touch Pads for Instrument changes (PET, Mylar, Foil, PCB).

14×Capacitive Touch Pads for Piano key triggers (PET, Mylar, Foil, PCB).

40 mm HQ Speaker in 400 ml sealed enclosure.

Contacts for 3×AA battery.

3×AA Battery for Try-Me.

Freeform play mode allows the child or other user to experiment with a two-octave piano. The character/instrument touch pads flanking the sides of the keyboard will change the instrument voice. Instruments simulated by the keyboards 1300, 1350 may include, for example, piano, synthesizer, Hammond Organ and Hip-Hop mode. Hip Hop mode may include a sound bank that plays iconic motifs from the Hip Hop genre on part of the keyboard. In Learn to Play mode, the Piano can play rudimentary, pre-defined sequences that prompt the toddler or other user to play the sequences back in similar fashion to a musical Simon toy, supported by LEDs and possibly supported by voice. The character pads may also change instrument or change the voice in Learn to Play mode. Teaching applications or modes of use, optionally termed musical IQ, may call out musical concepts (scale, motif, chord, pitch, arpeggio, etc), followed by quick demonstration of the musical concept. In example embodiments, engaging the Play Assist function may automatically and quickly correct any key input to the "correct" key input, with corresponding LED flashes and sounds. In Silly Mode, the Cap Touch Character pads that change the Piano's voice may change the keyboard's voice to unique silly sound banks of animal sounds, supporting SFX and instrument sounds. Key presses are reinforced with associated LEDs and the played sounds. Backer melodies activated by the blue actuator button may be traditional nursery songs or other content. Play Assist functionality may optionally be provided.

Figure 30:
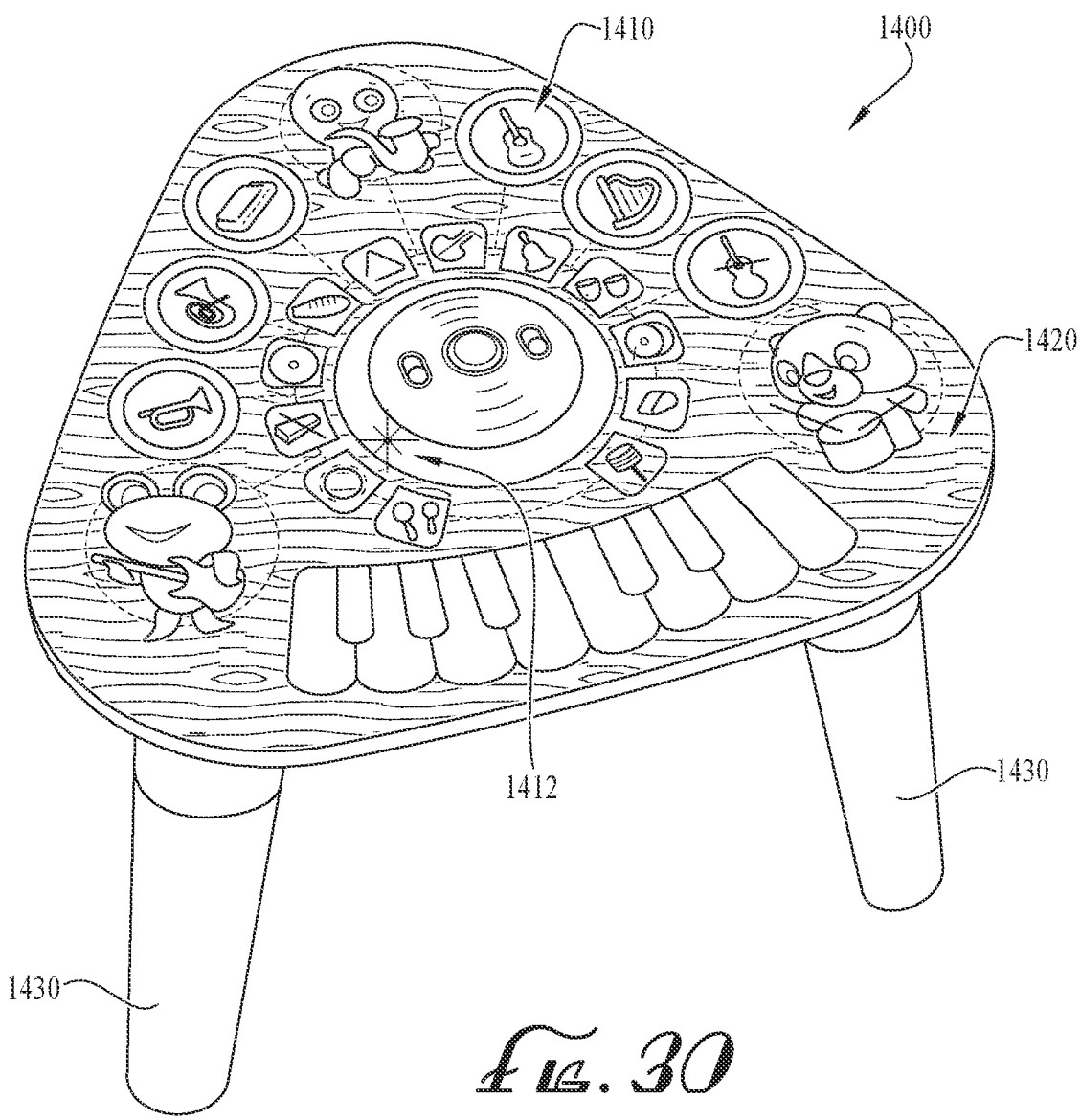
FIG. 30 shows a children's toy table with capacitive touch features according to another example embodiment of the present disclosure.

FIG. 30 shows a children's table toy 1400 with capacitive touch features according to another example embodiment. In an example embodiment the toy includes capacitive touch pads 1410 corresponding to a plurality of different types of instruments, which upon contact by the user will play audio sounds through the speaker corresponding to the selected instrument type shown on the touch pad. For example, the toy may include touch pads having images of one or more keyboard instruments, percussion instruments, stringed instruments, wind instruments, horns, etc. In the depicted example, the toy includes touch pads indicating a marquee 1-octave keyboard and 21 different instrument-themed touch points, including an inner circular array of 12 drum instruments and an outer circular array of 9 larger conventional instruments. Each of the 12 drum instruments has a corresponding LED 1412. The table 1400 preferably includes a top surface comprising a natural or synthetic wood veneer or other continuous seamless cover panel or touch surface 1420, painted, printed or otherwise marked with a simulated piano keyboard pattern and/or one or more additional musical instrument types corresponding to capacitive touch pad locations. The table top with the cover panel or touch surface 1420 is supported by a plurality of legs 1430, configured to support the table top a distance above the ground, a floor or other support surface.

Example components of the table toy 1400 may include:

Sonix SNC86320C 24 channel MIDI integrated circuit.

External Flash memory as required (16 Mbit for example).

LDO for Flash if required by SNC86k.

1-2 Capacitive Touch Controller(s).

PCBs and discreet components as required.

3 position slide switch for Power-Volume Control.

3 position slide switch for Mode Control for Melody Mode, Loop Mode and Mood Mode.

1×Rubber Key for Blue Melody Actuator Button.

6×Circular Capacitive Touch Pads for Instrument changes.

3×Character Capacitive Touch Pads.

12×Square capacitive touch pads for Percussion Instruments.

7-12×Capacitive Touch Pads Piano keyboard Triggers (7 without minor keys).

40 mm HQ Speaker in 300 ml sealed enclosure.

Contacts for 3×AA battery.

3×AA Battery for Try-Me.

Melody or Composer Mode allows the infant or other user to sequentially deconstruct and reconstruct melodies in various styles by activating subsets of instruments in the mix for short durations. In example embodiments, pressing the center melody actuator button will play individual melodies spanning multiple musical genres, and as the melody plays, LEDs corresponding to each constituent instrument playing in the melody will flash when the instruments play notes. In example embodiments, touching one or more different instrument icons when a melody is playing will mute those playing instruments as the un-touched instruments continue to execute the melody. Subsequently, touching, or otherwise actuating, the muted instruments will un-mute those instrument sounds as the melody continues playing and looping until it times out. The children's table toy's Composer Mode allows multiple instruments to play together, optionally with a limitation of only four instruments playing simultaneously and with each instrument track supported visually by the Instrument Icon's adjacent LED. The center melody actuator button changes the melody mix to match an alternate style—e.g., reggae, ska, jazz, country, blues, etc. The piano allows overlay play in key with the executing outer instruments (if active) again overlaying and supporting the playing beat style. The inner percussive instruments may or may not change key.

In other example embodiments, Mood Mode provides four mood themes, selected by the melody actuator button, for example including Energetic, Peaceful, Epic and Quirky modes. Pressing the melody actuator button optionally allows a user to hear an example of what the mood can sound like with a selection of instruments. For example, for each mood, instrument sounds are extrapolated to similar sounds, such as for example, wherein a maraca sounds like the sound of rain, a rattlesnake sounds like a salsa rhythm, a trumpet could be a car horn, siren, dinosaur roar, etc., including others similar to a sound effect board suitable for small children.

In yet another example embodiment, a Free Play mode optionally plays short example sections to demonstrate possibilities to the user.

In example embodiments, toys according to the present disclosure may help children develop both fine and gross motor skills and introduce child to color and musical note identification. The toys may optionally interact in multiple languages, for example, English, French, Spanish, etc. The toys may include visual (lights, display screen, etc.), audible (melodies and other sound effects), and/or tactile (buzzer, surface features, etc.) interactivity features. In some example embodiments, the toys may include one or more rubber keys, strings, mechanical buttons and/or switches, and/or other operable actuators.

Figure 31:
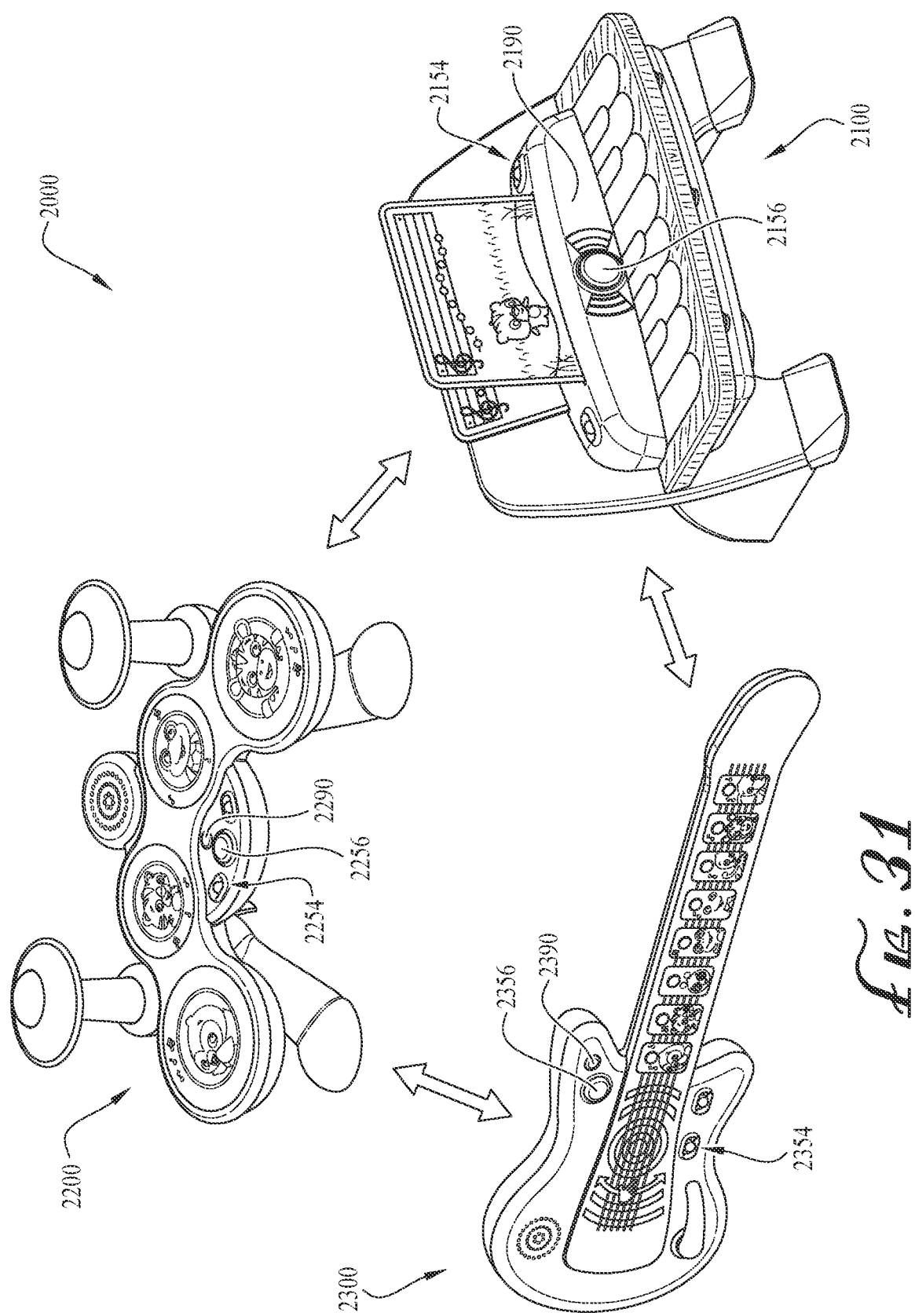
FIG. 31 shows an ensemble of wirelessly interconnected children's interactive toys, according to an example embodiment of the present disclosure.

FIG. 31 shows an ensemble of interconnected children's toy instruments 2000 including a children's toy piano 2100, a children's toy drum 2200 and a children's toy guitar 2300. In example embodiments, the toy piano 2100, toy drums 2200 and toy guitar 2300 each comprise a user interface panel, an input sensor system with at least one input sensor, an electronic input-output control system, as described in greater detail above. In example embodiments, the toy piano 2100, toy drums 2200 and toy guitar 2300 feature one or more operating modes between which a user can alternate. For example, in example embodiments, the toy instruments 2100, 2200 and 2300 each feature an operating mode slide switch 2154, 2254 and 2354 to choose between several operating or playing modes, including a Free (Discovery) Play mode, a Performer Play mode and a Silly Play mode. In example embodiments, toy instruments 2100, 2200 and 2300 further include wireless connectivity modules (for example, Bluetooth®, Bluetooth® Low Energy, Wi-Fi, near-field communication, and/or other proprietary and non-proprietary electronic communication or connectivity methods, systems, networks, signals or devices) enabling a fourth operating mode—a Connected Play mode. The Connect Play mode allows one or more of the toy instruments to connect wirelessly to one another and synchronize content therebetween. In example embodiments, the Connected Play mode can be activated by pressing a designated input device, such as for example a button or a toggle switch (i.e., Connected Play buttons 2190, 2290 and 2390).

In the Connected Mode, the toy instruments are configured to wirelessly connect to one another and provide a synchronized mode of play—for example, like an ensemble or a band. In example embodiments, the Connected Mode is derived from each toy's Performer Mode but further features the capability to connect and synchronize the sound from each connected toy instrument with one another in the form of a "networked play." While there are three different toy instruments in the depicted embodiment—the toy piano 2100, the toy drums 2200 and toy guitar 2300—the ensemble can include, for example, one or more of the same and/or different toy instruments or musical devices described herein, including various embodiments of the same toy instrument or musical device.

In example embodiments, the Connected Play mode is initiated by pressing the Connect Play button on any one of toy instruments, for example Connected Play button 2190 on toy piano 2100, Connected Play button 2290 on toy drum 2200 or Connected Play button 2390 on toy guitar 2300. For example, pressing the connectivity button 2190 on the toy piano 2100 initiates a radio or other wireless communication link or connection between the toy piano and other toy instruments or devices in proximity with the same corresponding connection functionality, for example the toy drum 2200 and/or toy guitar 2300. In example embodiments, the radio connection utilizes 2.5 GHz radio technology but other forms of telecommunication technology may be utilized, such as for example, 5.x GHz and 900 GHz radio Bluetooth technology, near-field communication and/or WiFi, etc.

Once the Connected Mode is initiated, a unique searching annunciator plays from the toy instrument initiating the connection (i.e., the lead or leading device). For example, if the networked play is initiated by the toy piano 2100, the searching annunciator plays on the toy piano to indicate that a search for other compatible toy instruments or musical devices has been initiated. The connectivity button 2190 may also feature a visual indicator when a connection is being made or is made for networked play. In example embodiments, for example, the connectivity button 2190 features a backlight which blinks during the search for near-by devices. Once connection between one or more toys is established, a melody backer is initiated on all connected toys and continues to play without further inputs until an outro marker is encountered. Once the outro marker is encountered, the body seamlessly transitions to the outro completing the melody and the radio link ends. If the instrument initiating the networked play does not receive any further input or connection from another instrument within a predefined window of time (for example, 15 seconds), the input-output control system plays a call-back audio. The call-back audio is only played after the third time-out to reduce frequency of activation. When the call-back audio finishes, the input-output control system enters stand-by. If any input is received during melody playback, the input-output control system begins the appropriate play pattern.

Once connection is established between two or more toys or devices, a "connected" annunciator automatically plays and the connectivity buttons illuminate solid across all connected devices providing both audible and visual indications of which devices connected successfully.

Once connection is established, each device's operating mode is superseded by the Connected Mode for the duration of connected play. For example, switching between different operating modes (e.g., Performer Play mode, Free Play mode and Silly Play mode) during the Connected Play mode has no effect. However, once the connection is terminated and the devices are disconnected from each other, each device reverts to the user selected operating mode.

In example embodiments, once connection is established, the next melody in the playlist of the leading device will begin playing automatically from the remaining connected devices, or the receiving devices, simultaneously. In the Connected Mode, the sound of each connected toy instrument or device can be played on top of the melody for the duration of the connection. The melody is a simplified embodiment of a Performer Mode melody with one or more, or for example most, of the instrument channels muted. For example, playing the toy piano in the Connected Play mode plays the same sounds from the Performer Play mode, for example, the piano rolls and chords, as described further below. Additionally, a common background drum-and-bass instrument track may be played and synchronized between all connected devices. In example embodiments, the background drum-and-bass tracks, or drum-and-bass backers, are automatically activated by default when a melody begins to play in the Connected Play mode. However, the background drum-and-bass track can be manually muted or unmuted by pressing the melody trigger button (e.g., 2156, 2256 or 2356) on any of the connected devices during Connected Play. For example, if the melody trigger button is pressed during Connected Play, the drum-and-bass backer may be muted and the melody paused for the duration of continued Connected Play. Hereafter, any inputs will step through segments of the paused melody and the other connected toys will mirror their leads accordingly.

In the Connected Play mode, the instrument actively being played by the user is referred to as the lead or leading instrument and the other connected instruments are referred to as the non-lead, follower or receiving devices. In example embodiments, when the leading instrument is played, the lead channels of the leading instrument are un-muted and the receiving instruments mirror the lead channels of the leading instrument in their own unique voices. Otherwise, if there are no further user inputs or no toy is played, the lead channels remain muted on all toys and the drum and bass backer continues to play until an outro marker is reached and the melody concludes. In other words, the lead instrument track is first un-muted on only the toy or device being played at the time. For example, if the toy piano is played in the Connected Play mode, a single lead instrument track is un-muted on the toy piano and the complimentary lead instrument tracks are un-muted, or mirrored, on the other connected non-leading or receiving devices. Receiving devices "mirror" the leading instrument's inputs, for example piano notes and rolls, using their own Performer Play mode instrument voices and further support the un-muted segments played on the leading toy. This way, a key played on the toy piano, for example, is mirrored immediately by the receiving toys along with short snippets of un-muted instrument tracks supporting the melody in the receiving toys' native voices.

In example embodiments, transitioning play between the connected toys and devices is seamless in the Connected Play mode. For example, if the user moves from playing a first toy instrument to a second toy instrument, the lead instrument track is immediately muted on the first instrument and the lead instrument track on the second toy instrument is immediately un-muted and remains un-muted for as long as the user continues to play on the second instrument. The lead instrument tracks on the other receiving toys remain muted. For example, in example embodiments, transitioning play from the toy piano 2100 to the toy drums 2200 mutes the toy piano's lead instrument track (but not the background drum-and-bass track or drum-and-bass backer) and the lead instrument track is unmuted on the toy drum 2200 as the drum-and-bass backer continues to play in the background on all the connected toys.

In example embodiments, unmuted leads are specific to each instrument. When more than one instrument is played at the same time, the lead is mirrored but the lead is adapted to the mirroring instrument, as described in greater detail below.

In example embodiments, once a melody activated in the Connected Play mode, the connection between the toys is maintained by continually playing any one of the connected toys. Doing so keeps the body of the melody looping indefinitely (as further described below). The markers that initiate the transition of a melody from the melody body to the melody outro are unique to each MIDI melody, and the user's position in the melody when the user stops playing determines the time to reach the fixed marker that transitions the melody from the body to the outro. Once transitioned from the melody body to the outro, the radio connection terminates automatically on all connected toys at the end of the outro.

According to example embodiments, if the melody trigger button is pressed during the Connected Play mode, the drum-and-bass backer is muted for the duration of the melody playing at the time or until the end of the Connected Play mode session. Further inputs from any toy while the drum-and-bass backer is muted will play the key-mapped sounds from the toy's Performer Play mode and the other toys will mirror the key press by playing synchronized single sounds and unmuted segments of a MIDI instrument track (as further described below). In other words, the leading toy and the other receiving toys connected to the leading toy do not play additional backing, but rather only mirror the inputs on the leading toy and trail briefly muted tracks in each toy instrument's native voice.

In example embodiments, if the melody is muted during Connected Play, the melody trigger button on any one of the connected toys can be pressed again to index to the next melody in the pre-stored melody playlist. In example embodiments, the radio connection will continue to sustain and synchronize the new melody across all the connected toys as described above.

In example embodiments, pressing the Connected Play button 2190, 2290 or 2390 at any time during the Connected Play mode terminates the Connected Play mode and reverts each toy to the operating mode selected at the time. In example embodiments, the user is made aware of the disconnection both visually and orally. For example, once the Connected Play mode is terminated, the backlighting around the Connected Play button is turned off and a distinct sound is played to alert the user of the termination.

In example embodiments, selecting any other operating or playing mode during execution of any melody, chord, motif and/or sound interrupts all sounds playing at the time and the new operating mode is initiated.

Figure 32:
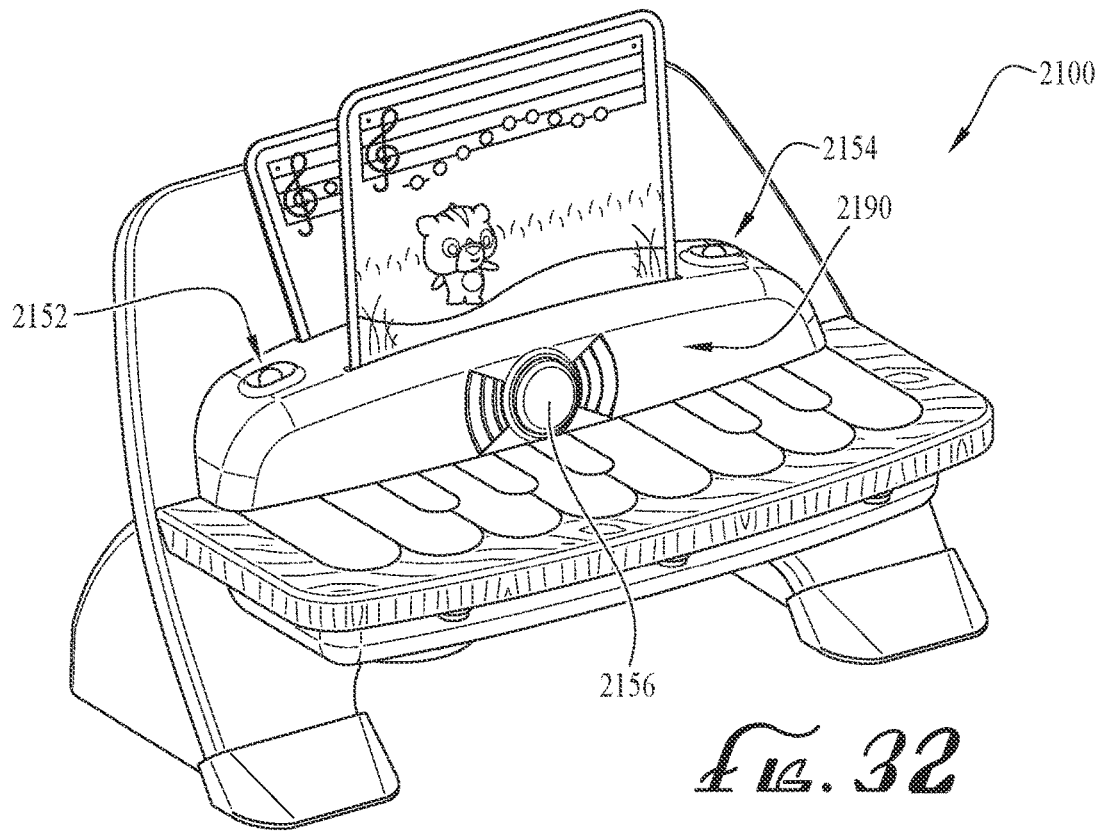
FIG. 32 is perspective view of a children's toy piano of the ensemble of FIG. 31.

FIG. 32 shows a children's toy piano 2100, according to a particular example embodiment of the present disclosure. In substantially similar fashion to the above-described embodiments, the toy piano 2100 features a wooden panel printed with 11 major piano keys. Each major piano key has an associated capacitive touch sensor mounted therebeneath wherein touching the printed keys activates one or more piano notes and other sounds with full polyphony.

In substantially similar fashion to the above-described embodiments, the children's toy piano 2100 generally includes a user interface panel, a support structure, a capacitive touch sensor system, a control panel, a component housing, and an electronic input-output control system. In particular example embodiments, the toy piano includes one or more manual inputs, such as for example toggle switches, multi-position slide switches, and/or push buttons, in electronic communication with the electronic input-output control system for selective user control of power on/off, volume control, mode switching, melody activation, and/or other features. For example, toy piano 2100 includes a first 3-position slide switch 2152 and a second 3-position slide switch 2154. The first slide switch 2152 enables the user to control the power state and choose between two volume levels (i.e., low and high volumes). The second switch 2154 allows the user to select between one of three operating modes, including Free (or Discovery) Play, Performer Play and Silly Play modes. In example embodiments, a fourth operating mode—Connected Play mode—can be activated by a push button (i.e., Connected Play toggle button 2190).

In example embodiments, the toy piano 2100 also includes a manual input device (i.e., melody toggle button 2156) to allow the user to toggle on or off the playing of background melodies. The control panel optionally includes a play slot or receiver 2157 for receiving an active song card 2158 selected from one or more interchangeable indexed song cards, to engage with cooperative indicators linked to the electronic input-output control system (as described in greater detail above) to generate a specific melody or song corresponding to the active song card. With the active song card inserted, the toy piano functions as described below for Free Play, Performer Play and Silly Play, but the electronic input-output control system will only play the melody printed on the active song card facing the user. The melody toggle button 2156 can be used to pause the playing melody, but pressing the melody toggle button 2156 after pausing will restart the corresponding melody.

Free (Discovery) Play mode allows the child or other user to experiment with a one and a half octave piano wherein each major piano key is sequentially mapped to a corresponding piano note, for example ranging from the notes C4 to F5, with full polyphony. Background melody playback can be activated in the Free Play mode to further enhance the musical experience. In example embodiments, the melody is composed of three parts—an intro, body and outro—and the transition between the parts is seamless and inaudible. If the user touches any piano key during melody playback, the corresponding piano note is overlayed on the playing melody with full polyphony. In example embodiments, the body of the playing melody will continue to loop as long as the user interacts with the piano keys and the input-output control receives input signals from the piano key touch sensors. However, after a prespecified period of time, for example 8 seconds, without any piano key inputs, the melody body stops looping and the melody transitions to the outro and end thereafter. If a song card is inserted, the melody will be locked to the melody corresponding to the active song card. If a song card is not inserted, the input-output control system cycles through a playlist of pre-stored melodies.

In the Performer Play mode, the keyboard is divided in half with the lower six major keys mapped to identical lower pitched piano notes and/or rolls and the upper five major keys mapped to identical higher pitched piano notes and/or rolls. As the piano keys are played or otherwise activated, the two groups of higher and lower major keys change pitch according to specific markers within the muted, but active and time-indexed, background melodies stored as MIDI files. In example embodiments, the background melodies are fully paused and muted until the melody trigger button is activated. In example embodiments, if a song card is inserted into the play slot, the active background melody is dictated by the active song card. On the other hand, if a song card is not present in the play slot, the input-output control system cycles through a playlist of pre-stored melodies, restarting from the first melody in the playlist once the last melody is finished.

In the Performer Play mode, according to example embodiments, each piano key plays MIDI-indexed piano notes or, for example, solo piano notes and/or rolls/motifs. For example, when a first single piano key is played on the lowest six keys, the toy piano plays a first piano note followed after a brief pause by a second piano roll motif. When a second single piano key is touched, a second piano note plays with polyphony over the first note, followed by a second piano roll motif mapped to the second piano key that prevents the first piano motif from playing if it has not begun yet. However, all sounds play gracefully and the transition between the first and second note and trailing rolls/motifs is blended and done subtly. When two or more piano keys are played together, the toy piano plays single piano notes for each of the keys played which is realized by the user as chords. Further, playing pairs or multiplicity of notes in rapid succession will layer the chords, although the input-output control system steps through the current melody's chord progression. The solo piano notes and/or rolls/motifs are hard coded into the input-output control system and are discreet from the background melodies. In example embodiments, the solo piano rolls/motifs are approximately 1,500 ms in length.

In example embodiments, the first group of six lower major piano keys and the second group five major upper piano keys can be played simultaneously. For example, each successive single input from the same key group will overlay the one before, and each successive input blends subtly with the latter key playing a note and a bookended roll/motif. In other words, successive single inputs from the first group and the second group will mix or overlay one another without interruptions.

When no melody is playing, the initial input plays the mapped sample free form. If the melody trigger button 2156 is subsequently activated in the Performer Play mode, playing motifs/rolling notes (i.e., single key played) and note chords (i.e., two or more keys played) will overlay the melody playing from the pre-stored playlist of melodies. In example embodiments, the pitch of the rolling notes and chords will be subtly auto-tuned to support or match with the key of the melody playing at the time. In example embodiments, if a song card is inserted into the play slot, the active background melody is dictated by the active song card. On the other hand, if a song card is not present in the play slot, the input-output control system cycles through a playlist of pre-stored melodies, restarting from the first melody in the playlist once the last melody is finished.

If the melody trigger button is pressed while a melody is playing in the Performer Play mode, the input-output control system mutes the melody playback at the position in the MIDI file when the melody trigger button is pressed. Each subsequent input (i.e., by playing a piano key) results in stepping or playing through the MIDI sequence's lead one note at a time per each user input. If the melody trigger button is pressed again thereafter without an active song card inserted in the song card slot, the input-output control system indexes to the next melody in the pre-stored playlist and begins playback of the next melody. However, if the melody trigger button is pressed after the melody playback had been muted and there is an active song card in the song card slot, the input-output control system restarts the melody associated with the active song card. In example embodiments, even if the melody is paused during playback, the piano rolls and chords are constrained or locked to the paused melody's progression and the pitch of the rolling notes and chords will continue to be auto-tuned to match the key of the melody, step by step, when sequenced play resumes with additional inputs until melody time-out.

In the Silly Play mode, according to example embodiments, each piano key is mapped with a unique silly or whimsical sound effect. When played, each silly sound effect is auto-tuned to match the pitch of the active melody, whether or not the backer melody is muted. For example, in the Silly Play mode, a first piano key may be mapped with a sound of a dog's bark and a second piano key may be mapped with a sound of a cat's meow. If the first and second piano keys are played in succession, the pitch of the dog's bark is auto-tuned to match the pitch of the first note in the active playback melody and the pitch of the cat's meow is auto-tuned to match the pitch of the second note in the active playback melody. In general, any sound effect mapped to each of the piano key is auto-tuned to match the pitch of the next note in the active melody. If an active song card is inserted into the song card slot, the active melody is dictated by the melody associated with the active song card. If an active song card is not inserted into the song card slot, the input-output control system increments through a Silly Melody playlist on successive activations and loops back to the beginning after the last melody plays.

In the Silly Play mode, according to example embodiments, the initial touch of a piano key, when no melody is playing, plays or activates a unique key-mapped sample that adjusts pitch to that of a multi-channel MIDI file's lead instrument with all other channels muted. The touched piano key's unique sample is step sequenced and pitched as dictated by the MIDI lead track on successive touches. In example embodiments, multiple unique instrument sounds can play simultaneously by touching multiple keys, and all sounds are pitched according to the MIDI file's lead note sequence. In example embodiments, the melody is composed of three parts—an intro, body and outro—and the body of any melody being played will continue to loop as long as the user interacts with the piano keys and the input-output control receives input signals from the piano key touch sensors. However, after a prespecified period of time, for example 8 seconds, without any piano key inputs, the melody body stops looping and the melody transitions to the outro and ends thereafter.

In the Silly Play mode, if any background melody is active, all sound effects mapped to the piano keys are laid over the active melody and each successive sound effect is auto-tuned to match the successive lead note in the playing background melody. If an active song card is inserted into the song card slot, the active melody is dictated by the melody associated with the active song card. If an active song card is not inserted into the song card slot, the input-output control system increments through a Silly Melody playlist on successive activations and loops back to the beginning after the last melody plays.

Figure 33:
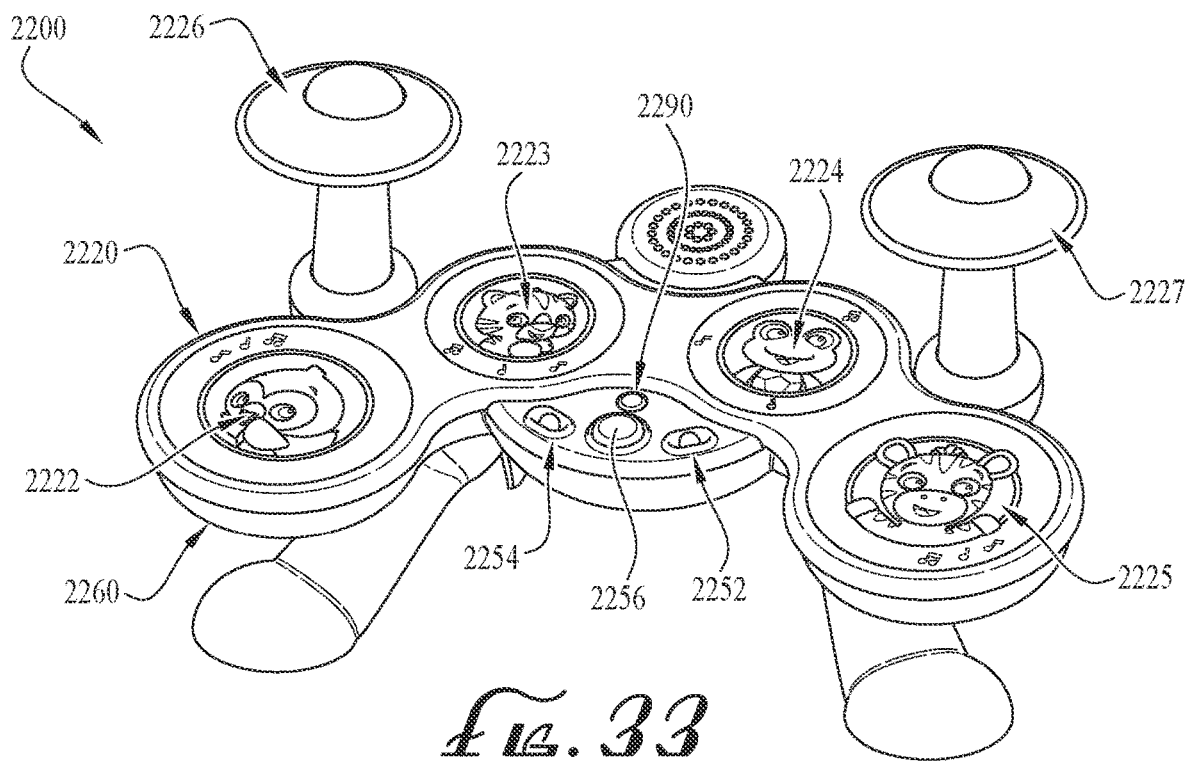
FIG. 33 is perspective view of a children's toy drum set of the ensemble of FIG. 31.

FIG. 33 shows a children's toy drum 2200, according to a particular example embodiment of the present disclosure. In substantially similar fashion to the above-described embodiments, the toy drum 2200 generally includes a user interface cover layer or panel 2220, a capacitive touch sensor system (not shown), a base or housing 2260, and an electronic input-output control system (not shown). The user interface panel 2220 comprises a top surface and an opposite bottom surface, with the top surface defining one or more user input surfaces or areas, such as user input areas 2222-2227 in the depicted embodiment. The user input areas 2222-2227 are optionally configured to simulate the appearance of drum heads and cymbals, and are optionally defined and indicated by one or more patterns, images, characters, text, delineations, or other markings, such as the animal characters within circular boundary markings shown in the depicted embodiment.

In particular example embodiments, the toy drum 2200 also includes one or more manual inputs, such as for example toggle switches, multi-position slide switches, and/or push buttons, in electronic communication with the electronic input-output control system for selective user control of power on/off, volume control, mode switching, melody activation, and/or other features. For example, toy drum 2200 includes a first 3-position slide switch 2252 and a second 3-position slide switch 2254. The first slide switch enables the user to control the power state and choose between two volume levels (i.e., low and high volumes). The second switch allows the user to select between one of three operating modes, including Free (or Discovery) Play, Performer Play and Silly Play modes. In particular example embodiments, a fourth operating mode—Connected Play mode—can be activated by a push button (i.e., Connected Play toggle button 2290).

In Free Play mode, the four capacitive touch inputs 2222-2225 under the drum heads activate drum or other sounds, augmented by mechanical switches that play or activate cymbal crashes (or other sounds) and/or backer melodies (or other synthesized samples/sounds/sequences). In example embodiments, each of the four capacitive touch inputs 2222-2225 are mapped with a unique drum (or other) sound and the left and right cymbals 2226, 2227 feature mechanical switches and LEDs. In example embodiments, hitting either of the two cymbals 2226 and 2227 plays a uniquely mapped cymbal (or other) sound effect with corresponding LED flashes. In some example embodiments, the drum and cymbal sounds are not auto-tuned in the Free Play mode (whereas the respective outputs are auto-tuned in the Performer Play and Silly Play Modes).

In example embodiments, toy drum 2200 further includes a melody trigger button 2256 which controls the playing of a melody backer from a Free Play Melody Playlist. Each melody in the Free Play Melody Playlist is broken into several melody segments (i.e., an intro, body and an finale/outro). In example embodiments, each melody is configured to transition seamlessly between its melody segments via digital markers embedded therein and by monitoring drumhead and/or cymbal inputs. For example, once a melody is activated by pressing the melody trigger button 2256, the melody intro plays and seamlessly transitions to the melody body. The melody body continues to play in loop for as long as at least one of the drum or cymbal inputs is activated within a predefined window of time (for example 5 seconds) between each trigger. If no drum or cymbal inputs are triggered within the predefined window of time, the melody body proceeds to an outro marker and the melody transitions to the outro segment which concludes the melody.

In example embodiments, if the melody trigger button is pressed while a backing melody is already active, the input-output control system will mute the melody. With the melody muted, any subsequent instrument input plays the instrument's sample with the pitch of each corresponding output sound adapted to the pitch progression of the melody active at the time. Pressing the melody trigger button again when the melody has stopped indexes to the next melody in the Free Play Melody Playlist and begins playback of the next melody. In example embodiments, the input-output control system automatically cycles back to the beginning of the playlist once the last melody in the playlist is completed.

In the Performer Play mode, the drum's four capacitive touch sensors 2222-2225 activate uniquely-mapped drum/percussive or other sounds, which are auto-tuned with successive inputs to match a pre-programmed melody lead as long as the pre-programmed melody continues to loop. For example, maintaining the step-through cadence to some extent (e.g., matching the tempo or cadence of the melody as the user steps through the melody) recreates the pre-programmed melody. In example embodiments, the left and right cymbals feature mechanical switches and LEDs, and hitting either of the two cymbals 2226, 2227 plays one of several uniquely-mapped cymbal sound effects with the associated LED flashing. For example, the LED flashes correspond to the cymbal sounds. In some example embodiments, the cymbal sounds are not auto-tuned with each subsequent input but rather are configured to change once the uniquely-mapped cymbal sound effects finish. In example embodiments, in the Performer Mode, the drum includes six mapped samples, including a sample of a drum (e.g., a steel drum) and five other instruments and/or sound effects.

According to example embodiments, pressing the melody trigger button 2256 in the Performer Play mode while no melody backer is active activates one melody from the Free Play Melody Playlist with the appropriate channels unmuted. In example embodiments, each melody features an intro, a body and an outro. Once a backing melody is active, each capacitive touch input plays drum sounds that are auto-tuned and semi-quantized to the executing melody's lead. This creates drum sounds that flesh out and support the backing melody with adjusted key and timing. In example embodiments, the cymbal inputs overlay a set of sound effects that are not auto-tuned. According to example embodiments, the LEDs flash with the melody but cymbal hits can interrupt those flash patterns and provide an immediate flash supporting the cymbal sound effect ("flash with level").

In example embodiments, pressing the melody trigger button 2256 during melody playback mutes and pauses the melody playing at the time. Pressing the melody trigger button once again while the melody is paused causes the input-output control system to index to the next melody in the pre-stored melody playlist and begins playback with all instruments un-muted. In example embodiments, the input-output control system automatically cycles back to the beginning of the playlist once the last melody in the playlist is completed.

Example drum sound playlist for the toy drum 2200 in the Performer Play mode may include:

| Performer Mode Drum Sound Playlist, Performer Mode | | |
|---|---|---|
| File Description | Sound Effect | Note |
| Drum Heas 1: Synth Bass | Synthgbass | Plays Root Chord |
| Drum Head 2: CowBell | Cowbell | Plays Melody Lead |
| Drum Head 3: Tom | Tom | Plays a Rhythm Sequence |
| Drum Head 4: Pizzacato Bass | Pizzicato string bass | Plays Root Chord |

In the Silly Play mode, with the melody unmuted, the drum and cymbal inputs activate silly sound effects which are auto-tuned. The silly sound effects are supported with flashing LEDs triggered by the cymbal hits. In example embodiments, the Silly Play mode for the toy drums 2200 functions the same as the Performer Play mode with some exceptions. For example, specific instruments and sound effects may be mapped to the drum and cymbal inputs as provided in the Drum Sound Playlist and Cymbal Sound Playlist below. In another example, with the melody muted, the input-output control system steps through a sequence of lead instrument notes within the MIDI Melody and, as such, pitch is sequentially adjusted for both drum and cymbal input sounds. Further, with no active melody backer, the drum hits are auto-tuned to sequentially play out the melody lead note-by-note. Accordingly, if the drums and/or cymbals are played at the correct melody cadence, a melody voiced by sound effects can be realized.

According to example embodiments, pressing the melody trigger button in the Silly Play mode activates one melody from the Silly Melody Playlist. Each of the melodies feature an intro, a body and an outro, and the melody transitions seamlessly through each segment through MIDI markers and by monitoring the drum and/or cymbal inputs. If a melody backer is active, all the drum and cymbal instrument channels are un-muted and the input-output control system automatically adjusts the pitch of the silly sound effects mapped to the drums and cymbals with each input. This is done to follow the lead progression in the melody while quantizing the inputs to fall closer to the notes and chord changes in the melody.

In example embodiments, pressing the melody trigger button during melody playback mutes the melody and activates step-through play. Pressing the melody trigger button once again while the melody is muted causes the input-output control system to index to the next melody in the pre-stored melody playlist and begins playback of the new melody. In example embodiments, the input-output control system automatically cycles back to the beginning of the playlist once the last melody in the playlist is completed.

Example samples for the toy drum 2200 in the Silly Play mode include:

| Silly Mode Drum Sound Playlist, Silly Mode | |
|---|---|
| File Description | Sound Effect |
| Drum Head 1: Dog | Cluck |
| Drum Head 2: Meow | Meow |
| Drum Head 3: Honk | Truck |
| Drum Head 4: Oink | Oink |

| Cymbal Sound Playlist, Silly Play Mode | |
|---|---|
| Input | Sound Effect |
| Left Cymbal (Yellow)/"Buh" | Bop |
| Right Cymbal (Blue)/"Baa" | Baa |

FIG. 34 shows a children's toy guitar 2300, according to a particular example embodiment of the present disclosure. In substantially similar fashion to the above-described embodiments, the toy guitar 2300 includes a simulated body, neck and head having a user interface panel with simulated strings and fret portions. In example embodiments, the toy guitar 2300 further includes a capacitive touch sensor system in electronic communication with an electronic input-output control system. In example embodiments the toy includes "magic strum" technology where different styles of playing produce different guitar sounds. In example embodiments the guitar toy has one or more (for example, two) capacitive touch string trigger touch pads 2320 activating either bass, treble, or multi-string strums, and the direction and cadence of strumming may simulate different playing techniques (i.e. power chords, arpeggio, etc.). In example embodiments, the guitar includes one or more (for example, eight) capacitive touch fret trigger touch pads 2322, each with an associated LED, providing unique functions in each mode and broadly producing chord effects. User interaction by touching a selected capacitive touch pad initiates an audio playback of sound over the speaker 2330, optionally corresponding to the sound of other toy instruments being played.

In example embodiments, the guitar toy 2300 preferably includes a natural or synthetic wood veneer or other continuous seamless cover panel or touch surface 2340 overlying the neck, fret, string and/or other portions, which may be painted, printed or otherwise marked to indicate the capacitive touch locations. A whammy bar 2344 is optionally included and activates unique and iconic guitar sounds that play discreetly or overlay ongoing sounds. Example embodiments include one or more play modes. In particular example embodiments, the toy guitar 2300 includes one or more manual inputs, such as for example toggle switches, multi-position slide switches, and/or push buttons, in electronic communication with the electronic input-output control system for selective user control of power on/off, volume control, mode switching, melody activation, and/or other features. For example, toy guitar 2300 includes a first 3-position slide switch 2352 and a second 3-position slide switch 2354. The first slide switch 2352 enables the user to control the power state and choose between two volume levels (i.e., low and high volumes). The second switch 2354 allows the user to select between one of three operating modes, including Free (or Discovery) Play, Performer Play and Silly Play modes. In particular example embodiments, a fourth operating mode—Connected Play mode—can be activated by a push button (i.e., Connected Play toggle button 2390).

In Free Play mode, sounds played by the guitar 2300 vary depending on how it is played. In example embodiments, there are two string triggers 2320, for example an upper and a lower string trigger. In example embodiments, the direction (i.e., up or down) and speed of strumming simulate different playing techniques and produce different sounds, for example two or three different sounds. In example embodiments, strumming slowly produces the different sounds as individual notes whereas strumming quickly produces the different sounds as a chord. In the Free Play mode, activating a fret 2322 adds an additional initiating deeper note, which is combined with the other sounds, all of which are aligned pitch-wise with the initial sound. In some example embodiments, strumming down (i.e., from top to bottom) slowly plays two individual sounds—a first sound from a first note playlist or lookup table and a second sound from a second note playlist or lookup table immediately following the first sound. On the other hand, if the two string inputs are triggered or strummed quickly in the order of upper trigger first and lower trigger second within a predefined window of time (for example, 35 ms), a down strum sound effect is activated from a down strum lookup table or playlist. Conversely, strumming up quickly on the string triggers—for example, triggering the lower string input first and the upper string input second within a predefined window of time (for example, 20 ms)—activates an up strum sound effect from a predetermined up strum look-up table or playlist. In other example embodiments, activating the frets 2322 may further change or modify the sound effects.

In example embodiments, touching or otherwise activating the lower string sensor 2320 only within a predefined window of time (for example, 20 ms) plays a solitary first note from a first lower string look-up table or playlist (e.g., a Treble String Touched Note Table). Similarly, activating the upper string sensor only within a predefined window of time (for example, 25 ms) plays a solitary second note from a second upper string look-up table (e.g., a Bass String Touched Note). In example embodiments, the pitch of the first and second notes can be modified or changed by activating one of the eight fret inputs 2322.

In example embodiments, touching or otherwise activating the fret inputs without strumming (i.e., without activating the string inputs) plays unique single notes from a third fret playlist or look-up table (e.g., a Touched "Fret" Note Table).

In example embodiments, guitar 2300 further includes a melody trigger button 2356 which controls the playing of a melody backer from a guitar melody playlist (e.g., a Free Play Melody Playlist). Each melody in the guitar melody playlist is broken into several melody segments (i.e., an intro, a body and a finale/outro). In example embodiments, each melody is configured to transition seamlessly between its melody segments via digital markers embedded therein and by monitoring the string inputs. For example, once a melody is activated by pressing the melody trigger button 2356, the melody intro plays and seamlessly transitions to the melody body. The melody body continues to play in loop for as long as at least one of the string triggers or fret triggers is activated within a predefined window of time (for example 5 seconds) between each trigger. If no string or fret inputs are triggered within the predefined window of time, the melody body proceeds to an outro marker and the melody transitions to the outro segment which concludes the melody. In example embodiments, if the strums continue after the predefined window of time or during the outro, the melody concludes automatically.

In example embodiments, if the melody trigger button 2356 is activated while a melody is already playing, the input-output control system mutes the melody at the position in the MIDI file when the melody trigger button was activated. Pressing the melody trigger button 2356 once more begins the next melody in the Melody Playlist. In example embodiments, the input-output control system automatically cycles back to the beginning of the playlist once the last melody in the playlist is completed.

According to example embodiments, if the user strums the string triggers 2320 while a melody is active, the input-output control system plays free form note/strum samples and their pitch can be influenced by touching the fret triggers. In example embodiments, while a melody is active, the fret LEDs may be configured to flash to indicate to the user the chord to hold while the user strums. The fret LEDs illuminate as the melody plays to indicate which fret will play the most musically correct sounds that harmonize with the backer melody. In other words, if the user strums the string triggers 2320 while a melody is playing and plays the LED-indicated frets, the resulting sound effects or chords will support the backing melody. In example embodiments, the LED associated with the fret trigger representing the recommended auto-tuned chord (i.e., the fret trigger matching the auto-tuned chord) also illuminates to indicate the best chord progression visually regardless of whether or not the illuminated fret trigger is actually touched. Therefore, while touching the fret triggers plays individual string sounds associated with the touched fret trigger, the LEDs associated with the touched fret triggers do not flash with touch while a melody backer is active. In example embodiments, the touched fret may produce a sound that is out of key or sometimes complimentary to the melody backing. In some example embodiments, the correct fret may not be illuminated to indicate the correct fret trigger in Performer and Silly Play Modes.

Example playlists for guitar toy 2300 in the Free Play mode include:

| Bass String Touched Note - when the Bass string trigger is touched | | |
|---|---|---|
| Strum Order | Instrument | Play Length |
| Bass String Input | 40 | 2 sec |

| Treble String Touched Note - when the Treble string trigger is touched | | |
|---|---|---|
| Strum Order | Instrument | Play Length |
| Treble String Input | 53 | 2 sec |

Free Play Mode "Touched" Fret Note Mapping and Range (no strum)

| Activation Key | Patch Numbers | Note Name |
| --- | --- | --- |
| Fret 01 (red) | 60 | C2 |
| Fret 02 (orange) | 58 | B Minor |
| Fret 03 (yellow) | 57 | A |
| Fret 04 (green) | 55 | G |
| Fret 05 (lt. blue) | 53 | F |
| Fret 06 (blue) | 52 | E |
| Fret 07 (violet) | 50 | D |
| Fret 08 (red) | 48 | C |

Free Play Mode "Held" Fret Chord Mapping and Range

| Activation Key | Note Name |
| --- | --- |
| Fret 01 (red) | A Sharp |
| Fret 02 (orange) | F Minor |
| Fret 03 (yellow) | B Major |
| Fret 04 (green) | A Minor |
| Fret 05 (lt. blue) | G Major |
| Fret 06 (blue) | F Major |
| Fret 07 (violet) | E Major |
| Fret 08 (red) | D Minor |

Melody Playlist for FreePlay Mode

| Melody Name | File Name |
| --- | --- |
| Melody 01 "Happy Birthday" | HappyIntro1.mid HappyLoop1.mid HappyOutro1.mid |
| Melody 02 "Brahms Lullaby" | BrahmsINTRO1.mid BrahmsLoop1.mid BrahmsOutro1.mid |
| Melody 03 "If You're Happy and You know It" | HappyIntro1.mid HappyLoop1.mid HappyOutro1.mid |
| Melody 04 "Humpty Dumpty" | HumptyIntro1.mid HumptyLoop1.mid HumptyOutro1.mid |
| Melody 05 "Old MacDonald" | OldmacIntro1.mid OldmacLoop1.mid OldmacOutro1.mid |
| Melody 06 "Row, Row, Row Your Boat" | RowINTRO1.mid RowLoop1.mid RowOutro1.mid |
| Melody 07 "Teddy Bear's Picnic" | TeddyIntro1.mid TeddyLoop1.mid TeddyOutro1.mid |
| Melody 08 "Welcome Home" | WelcomeIntro1.mid WelcomeLoop.mid WelcomeOutro1.mid |
| Melody 09 "Wheels on the Bus" | WHEELSIntro1.mid WHEELSLoop1.mid WHEELSOutro1.mid |
| Melody 10 "Baa Baa Blacksheep" | BaaBaaIntro1.mid BaaBaaLoop1.mid BaaBaaOutro1.mid |

In the Performer Play mode, the fret triggers 2322 and the string inputs 2320 are configured so that they generate different sound effects depending on whether or not a melody backer is active. For example, if a melody backer is active, the fret and string inputs behave the same as described under Free Play as described above, but the pitch of the output sounds are auto-tuned and semi-quantized to match the key of the playing melody backer. If no melody backer is active, the capacitive touch strum inputs are configured to play sequential guitar sounds, along with flashing of the fret LEDs, corresponding to one of the pre-composed melodies pre-stored in the toy guitar's input-output control system. For example, as the user strums, the pitch of each successive strum is changed automatically to recreate a melody with successive strums. Accordingly, if the user strums on cadence, the user can recreate popular melodies without having to trigger any fret inputs correctly. Accordingly, the user must play on beat or close to the original beat of the melody to realize the actual melody accurately. In example embodiments, the strumming progresses sequentially through the entire melody and will continue to loop as long as the user continues to strum. However, if the user stops strumming for a predefined period of time, the input-output control system will automatically index to the next melody in the prestored playlist.

In example embodiments, pressing the melody trigger button 2356 in the Performer Play mode, while no melody backer is active, activates one melody from the Free Play Melody Playlist with all channels un-muted. The input-output control system automatically and seamlessly transitions from the intro to the body after a few seconds via a digital marker in the intro MIDI. Once string inputs are detected, the input-output control system continues to loop the body of the melody until string inputs stop for a predefined period of time (for example, 5 seconds). If no string inputs are detected for the predefined period of time, the melody automatically and seamlessly transitions from the body to the outro through a digital marker in the melody body. In example embodiments, if strums continue after the outro is initiated, the melody still concludes after the outro is finished.

In example embodiments when the toys are connected, pressing the melody trigger button 2356 during melody playback pauses the backer on all melodies. Playing the guitar, or another instrument after the pause, plays the lead on the played instrument while the lead on the played instrument is mirrored with complimentary leads on the connected instruments. All leads comprise solo fragments and no melody backers or backings. In example embodiments, pressing the melody trigger button while a melody is paused causes the input-output control system to index to the next melody in the pre-stored melody playlist and begin playback with all instruments un-muted. In example embodiments, the input-output control system automatically cycles back to the beginning of the playlist once the last melody in the playlist is completed. If no instrument is played or no input is provided over a predetermined amount of time, for example 15 seconds, there is no sound output from the instruments and the melody times-out.

In example embodiments, in Performer or Connected Modes, the LEDs flash discreetly and directionally with the string inputs. For example, bass string inputs and strumming downwards produce flashing of the LEDs sequentially outward from the center of the guitar to the end of the guitar neck. On the other hand, treble string inputs and strumming upwards produce flashing of the LEDs sequentially inward from the end of the guitar neck to the string triggers near the center of the guitar.

In the Silly Play mode, capacitive touch strum inputs 2320 activate banjo sounds (or other instrumental sounds) and the fret inputs and whammy bar trigger short silly sound effects. In example embodiments, if a melody is active, the fret silly sounds effects are auto-tuned to remain in key with the melody backer playing at the time. According to example embodiments, different techniques or styles of strumming the guitar 2300 in the Silly Play mode produce different banjo sounds to simulate a real playing experience. Generally, the toy guitar's Silly Play mode functions the same as the Performer Play mode, with some exceptions. For example, the string triggers are mapped to sounds of a banjo rather than a guitar. In another example, with no melody playing, the input-output control system steps through a limited set of instrument notes within the MIDI Melody and, as such, pitch is sequentially adjusted for the string inputs (banjo) and the fret inputs (silly sound effects), both individually and together. Further, with no active melody backer, each string and fret triggers are auto-tuned to sequentially play out the melody note-by-note or motif-by-motif. Conversely, if a melody backer is active, all instrument channels are un-muted and the input-output control system automatically adjusts the pitch of the banjo and/or silly sound effects to the chord progression in the melody, while quantizing the inputs to support upcoming notes and chord changes in the melody.

In example embodiments, the melody trigger button in the Silly Play mode activates one melody at a time from a Silly Melody Playlist. The melodies in the Silly Melody Playlist are also constructed with an intro, body and finale/outro where transitions occur through digital markers embedded in the MIDI. Example playlists for the toy guitar 2300 in the Silly Play mode may include:

| Melody Playlist for Silly Mode | |
|---|---|
| Melody Name | File Name |
| Melody 01 | SillyHappyIntro1.mid |
| "Silly Happy Birthday" | SillyHappyLoop1.mid |
|  | SillyHappyOutro1.mid |
| Melody 02 | SillyBrahmsIntro1.mid |
| "Silly Brahms Lullaby" | SillyBrahmsLoop1.mid |
|  | SillyBrahmsOutro1.mid |
| Melody 03 | SillyHappyIntro1.mid |
| "Silly If You're Happy and You know It" | SillyHappyLoop1.mid |
|  | SillyHappyOutro1.mid |
| Melody 04 | SillyHumptyIntro1.mid |
| "Silly Humpty Dumpty" | SiullyHumptyLoop1.mid |
|  | SillyHumptyOutro1.mid |
| Melody 05 | SillyOldmacIntro1.mid |
| "Silly Old MacDonald" | SillyOldmacLoop1.mid |
|  | SillyOldmacOutro1.mid |
| Melody 06 | SillyRowIntro1.mid |
| "Silly Row, Row, Row Your Boat" | SillyRowLoop1.mid |
|  | SillyRowOutro1.mid |
| Melody 07 | SillyTeddyIntro1.mid |
| "Silly Teddy Bear's Picnic" | SillyTeddyLoop1.mid |
|  | SillyTeddyOutro1.mid |
| Melody 08 | WelcomeIntro1.mid |
| "Silly Welcome Home" | WelcomeLoop.mid |
|  | WelcomeOutro1.mid |
| Melody 09 | SillyWheelsIntro1.mid |
| "Silly Wheels on the Bus" | SillyWheelsLoop1.mid |
|  | SillyWheelsOutro1.mid |
| Melody 10 | SillyBaaBaaIntro1.mid |
| "Silly Baa Baa Blacksheep" | SillyBaaBaaLoop1.mid |
|  | SillyBaaBaaOutro1.mid |

| Silly Overlay Playlist (Fret Triggers/Silly Mode) | |
|---|---|
| File Description | Sound Effect |
| Fret Trigger 1: Police Siren | police siren |
| Fret Trigger 2: Drip | drip |
| Fret Trigger 3: Squeak | squeak |
| Fret Trigger 4: Burp | burp |
| Fret Trigger 5: Chicken | chicken |
| Fret Trigger 6: Water Splash | watersplash |
| Fret Trigger 7: Horn | horn |
| Fret Trigger 8: Fart | fart |

In all Play modes, if the lead/played instrument (i.e., instrument initiating the network play connection) does not receive any input before encountering the outro transition marker in the MIDI file, the melody will transition to the outro section and conclude. If the lead instrument (i.e., instrument initiating the network play connection) does not receive any further inputs within a predefined window of time (for example, 15 seconds), the input-output control system plays a call-back audio. The call-back audio is only played after the third time-out to reduce frequency of activation. When the call-back audio finishes, the input-output control system enters stand-by. If any input is received during melody playback, the input-output control system begins the appropriate play pattern.

Further example embodiments include systems and methods comprising two or more children's toys in the form of simulated musical instruments. Each of the simulated musical instruments includes an input means for receiving user input from a child or other user, for example in the form of simulated play of the instrument by pressing actual or simulated keys or buttons, strumming actual or real strings, tapping actual or simulated drumheads or other percussion devices, or the like. Each of the simulated musical instruments further includes a sound output means for generating and playing an audible sound, for example musical output sounds corresponding to the sound of an actual musical instrument of the same type as the simulated musical instrument. Each of the simulated musical instruments further includes electronic processing means, for example a computer processor or integrated circuit implemented electronic processor, electronic memory, and computer readable/implementable software code resident on a transitory or non-transitory computer-readable medium or media, for receiving and processing the user input to generate the sound output. Each of the simulated musical instruments further includes electronic communication means, for example wireless or wired electronic communication components or systems for electronically linking one of the simulated musical instruments to other(s) of the simulated musical instruments in the system, via an electronic communication system such as for example, radio, Wi-Fi, Bluetooth or other electronic communications protocol. One or more of the simulated musical instruments further includes an actuator, switch or other means for allowing selective user input to connect or link two or more of the simulated musical instruments for connected play, to generate coherent or complementary sound outputs from two or more of the simulated musical instruments.

While the invention has been described with reference to example embodiments, it will be understood by those skilled in the art that a variety of modifications, additions, and deletions are within the scope of the invention, as defined by the following claims.

What is claimed is:

1. A children's toy, comprising:
   a user input panel comprising a substantially continuous cover portion comprising a natural or synthetic wood touch surface and further comprising at least one capacitive touch pad;
   a processor configured to receive an input signal corresponding to a user interaction with the at least one capacitive touch pad;
   an audio speaker configured to receive an output signal from the processor and to output a sound corresponding to the user interaction with the at least one capacitive touch pad, and
   a connectivity device to wirelessly connect the children's toy to other children's toys, and
   an actuator configured to allow selective user input to select connected play or to generate coherent or complementary sound outputs when the children's toy is wirelessly connected to one or more of the other children's toys,
   wherein the children's toy is configured to receive one or more wireless signals from the one or more other children's toys and generate a secondary responsive output signal in response thereto.

2. The children's toy of claim 1, wherein the touch surface of the user input panel comprises a wood veneer material and comprises markings applied thereon to present the appearance of a musical instrument.

3. The children's toy of claim 1, further comprising a plurality of different play modes corresponding to different output signals from the processor and configured to produce a plurality of different output sounds from the audio speaker responsive to the user interaction with the at least one capacitive touch pad.

4. The children's toy of claim 3, wherein the different output sounds corresponding to the different play modes comprise sounds selected from a melody riff, a voice, a backer beat, an instrumental loop, a guitar riff, a musical scale, a sound effect, and an animal sound.

5. The children's toy of claim 3, wherein the plurality of different play modes comprises a first mode wherein the children's toy produces a first set of sounds or riffs corresponding to user inputs.

6. The children's toy of claim 5, wherein the plurality of different play modes comprises a second mode wherein the children's toy produces a second set of sounds or riffs corresponding to user inputs, wherein the second set of sounds or riffs are different from the first set of sounds or riffs.

7. The children's toy of claim 6, wherein the plurality of different play modes comprises a third mode wherein the children's toy produces a third set of sounds or riffs corresponding to user inputs and auto-tuned to a melody backer.

8. The children's toy of claim 7, wherein the plurality of different play modes comprises a fourth mode wherein the children's toy is wirelessly connected to the other children's toys and the children's toy produces a leading sound or riff mirrored by the other children's toys.

9. The children's toy of claim 1, wherein the children's toy is a toy guitar, wherein the touch surface corresponds to a simulated fret area and a simulated strum area, and wherein the at least one capacitive touch pad comprises at least one capacitive fret trigger positioned in the simulated fret area, and at least one capacitive string trigger positioned in the simulated strum area.

10. The children's toy of claim 1, wherein the toy is a toy piano, wherein the touch surface corresponds to a simulated piano keyboard having a plurality of keys, each key associated with a corresponding capacitive touch pad.

11. The children's toy of claim 1, wherein the toy is a toy drum set, wherein the touch surface corresponds to simulated drum heads, each drum head associated with a corresponding capacitive touch pad.

12. The children's toy of claim 1, wherein the secondary responsive output signal is synchronized to the one or more wireless input signals.

13. A toy instrument ensemble comprising:
   a lead toy instrument; and
   one or more non-lead toy instruments configured for wirelessly connecting to the lead toy instrument and one another,
   wherein, in response to an output signal from the lead toy instrument, the non-lead toy instruments generate synchronized sounds or riffs corresponding to lead sounds or riffs generated by the lead toy instrument when the non-lead toy instruments are wirelessly connected to the lead toy.

14. The toy instrument ensemble of claim 13, wherein the one or more non-lead toy instruments are configured to play a melody backer matching the melody backer of the lead toy instrument.

15. The toy instrument ensemble of claim 14, wherein the one or more non-lead toy instruments are configured to play sounds or riffs synchronized or harmonized to the sounds or riffs generated by the lead toy instrument so as to produce a harmony.

16. The toy instrument ensemble of claim 13, wherein at least one of the toy instruments comprises a song card.

17. A method of synchronizing two or more interconnected children's toy instruments to generate harmonized music and sounds, the method comprising:
   selecting, via an actuator, a connected play mode to initiate a wireless interconnection between two or more children's toy instruments;
   establishing the wireless interconnection between the two or more children's toy instruments;
   playing one or more melody backers on the two or more children' toy instruments;
   designating one of the two or more interconnected children's toy instruments as a lead instrument and the remainder as a non-lead instrument or instruments;
   sending an output signal from the lead instrument, where the output signal is activated by user interaction with the lead instrument; and
   generating a combination of synchronized melodies or sounds from the non-lead instruments in response to receiving the output signal from the lead instrument.

18. The method of synchronizing two or more interconnected children's toy instruments of claim 17, wherein the wireless interconnection utilizes radio technology.

19. The method of synchronizing two or more interconnected children's toy instruments of claim 17, wherein at least two of the two or more interconnected children's toy instruments play a common melody backer.

20. The method of synchronizing two or more interconnected children's toy instruments of claim 17, wherein the synchronized melodies or sounds from the non-lead instruments are auto-tuned so as to create an ensemble effect.

* * * * *